(12) United States Patent
Kii et al.

(10) Patent No.: US 8,234,301 B2
(45) Date of Patent: *Jul. 31, 2012

(54) SERVICE OFFERING SYSTEM, MANAGEMENT SERVER, SERVICE PROVIDER, TERMINAL DEVICE, STORAGE MEDIUM ISSUING APPARATUS, SERVER OFFERING METHOD, AND STORAGE MEDIUM

(75) Inventors: Manabu Kii, Tokyo (JP); Takashi Kawakami, Tokyo (JP)

(73) Assignee: Sony Corporation, Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 12/353,533

(22) Filed: Jan. 14, 2009

(65) Prior Publication Data

US 2009/0157637 A1 Jun. 18, 2009

Related U.S. Application Data

(63) Continuation of application No. 10/027,194, filed on Dec. 20, 2001, now Pat. No. 7,739,299.

(30) Foreign Application Priority Data

Dec. 21, 2000 (JP) ................................. 2000-393286

(51) Int. Cl.
G06F 17/30 (2006.01)
(52) U.S. Cl. ........................................................ 707/781
(58) Field of Classification Search .................... 707/781
See application file for complete search history.

(56) References Cited

U.S. PATENT DOCUMENTS

| 5,805,699 A | * | 9/1998 | Akiyama et al. ................. 705/58 |
| 6,119,133 A | | 9/2000 | Nusbickel et al. |
| 6,134,201 A | | 10/2000 | Sako et al. |
| 6,330,593 B1 | | 12/2001 | Roberts et al. |
| 6,405,203 B1 | * | 6/2002 | Collart ............................ 382/205 |
| 6,832,318 B1 | * | 12/2004 | Yaegashi et al. ............... 713/193 |
| 2002/0010684 A1 | | 1/2002 | Moskowitz |

(Continued)

FOREIGN PATENT DOCUMENTS

EP 0 802 527 8/2001

(Continued)

OTHER PUBLICATIONS

Notice of Allowance in U.S. Appl. No. 10/027,194, mailed Feb. 4, 2010.

(Continued)

*Primary Examiner* — Sheree N. Brown
*Assistant Examiner* — Michael Le
(74) *Attorney, Agent, or Firm* — Finnegan, Henderson, Farabow, Garrett & Dunner, L.L.P.

(57) ABSTRACT

A system including a management server, a medium issuing apparatus, and a service provider is disclosed. The medium issuing apparatus includes recording means for recording right information and unique identifiers on a package storage medium. The right information denotes services available to the package storage medium, and includes a download authorization bit and an upload authorization bit. The management server includes receiving means for receiving the right information and the identifiers from the package storage medium. The management server also includes storing means for storing the right information corresponding to each of the identifiers and the identifiers in a database. In addition, the management server includes checking means for checking an identifier transmitted from a terminal device by way of the service provider against the identifiers stored in the database.

4 Claims, 31 Drawing Sheets

U.S. PATENT DOCUMENTS

2002/0174010 A1    11/2002    Rice

FOREIGN PATENT DOCUMENTS

WO    WO 96/29639    9/1996

OTHER PUBLICATIONS

Office Action in U.S. Appl. No. 10/027,194, mailed Aug. 17, 2009.
Office Action in U.S. Appl. No. 10/027,194, mailed Mar. 4, 2009.
Office Action in U.S. Appl. No. 10/027,194, mailed Sep. 15, 2008.
Decision of Board of Patent Appeals and Interferences in U.S. Appl. No. 10/027,194, mailed Jul. 29, 2008.
Examiner's Answer in U.S. Appl. No. 10/027,194, mailed Jun. 6, 2006.
Office Action in U.S. Appl. No. 10/027,194, mailed Sep. 15, 2005.
Office Action in U.S. Appl. No. 10/027,194, mailed May 3, 2005.
Office Action in U.S. Appl. No. 10/027,194, mailed Feb. 23, 2005.
Office Action in U.S. Appl. No. 10/027,194, mailed Jul. 12, 2004.

* cited by examiner

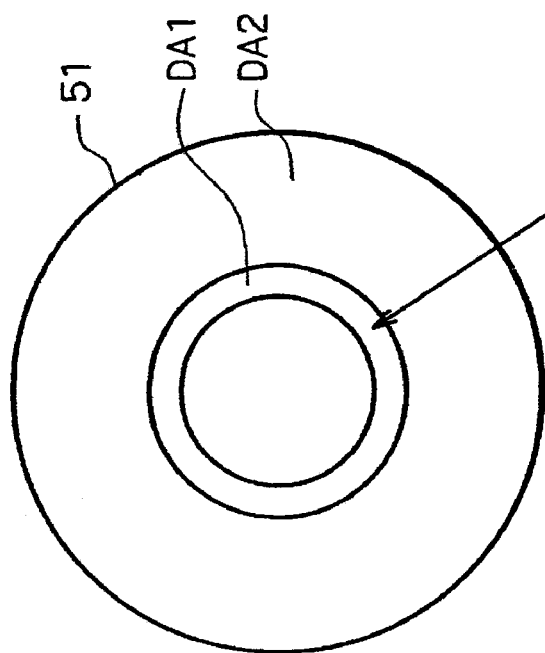

FIG.6

| MEDIUM ID | | ACCESS RIGHT INFORMATION | | |
|---|---|---|---|---|
| ID | PASSWORD | CONTENT | UPLOAD | DOWNLOAD |
| 10001A | qwerty | /media/id/1001A/access Key | 0 (AUTHORIZED) | 0 (AUTHORIZED) |
| 10002B | yuiop@ | /media/id/1002B/access Key | 1 (UNAUTHORIZED) | 0 (AUTHORIZED) |
| 10003C | asdfg | /media/id/1003C/access Key | 1 (UNAUTHORIZED) | 0 (AUTHORIZED) |
| 10004A | zxcvbn | /media/id/1004D/access Key | 1 (UNAUTHORIZED) | 0 (AUTHORIZED) |
| 90009X | !"#$%&' | /media/id/9009X/access Key | 1 (UNAUTHORIZED) | 0 (AUTHORIZED) |

FIG.11

| | MD-DATA2 | MD-DATA1 |
|---|---|---|
| TRACK PITCH | 0.95μm | 1.6μm |
| BIT LENGTH | 0.39μm/bit | 0.59μm/bit |
| λ·NA | 650nm · 0.52 | 780nm · 0.45 |
| RECORDING MODE | LAND RECORDING | GROOVE RECORDING |
| ADDRESS SYSTEM | INTERLACE ADDRESSING (DOUBLE-SPIRAL ONE-SIDE WOBBLE) | SINGLE-SPIRAL TWO-SIDE WOBBLE |
| MODULATION TECHNIQUE | RLL(1,7) | EFM |
| ERROR CORRECTING SYSTEM | RS-PC | ACIRC |
| INTERLEAVE | BLOCK CONTAINED | CONVOLUTION |
| REDUNDANCY | 19.7% | 46.3% |
| LINEAR VELOCITY | 2.0m/s | 1.2m/s |
| DATA RATE | 589kB/s | 133kB/s |
| STORAGE CAPACITY | 650MB | 140MB |

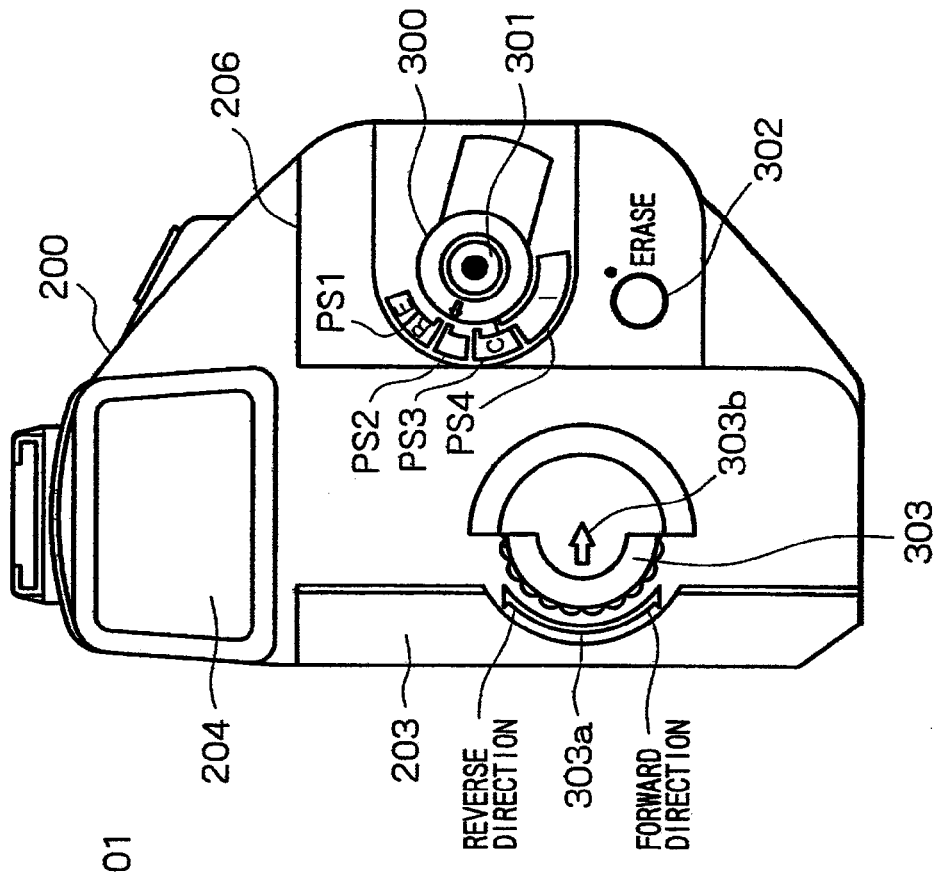
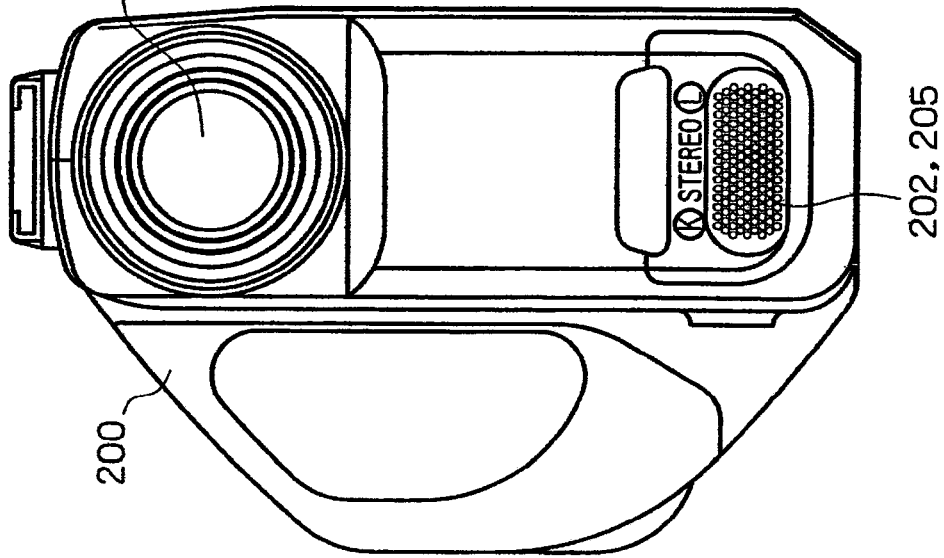

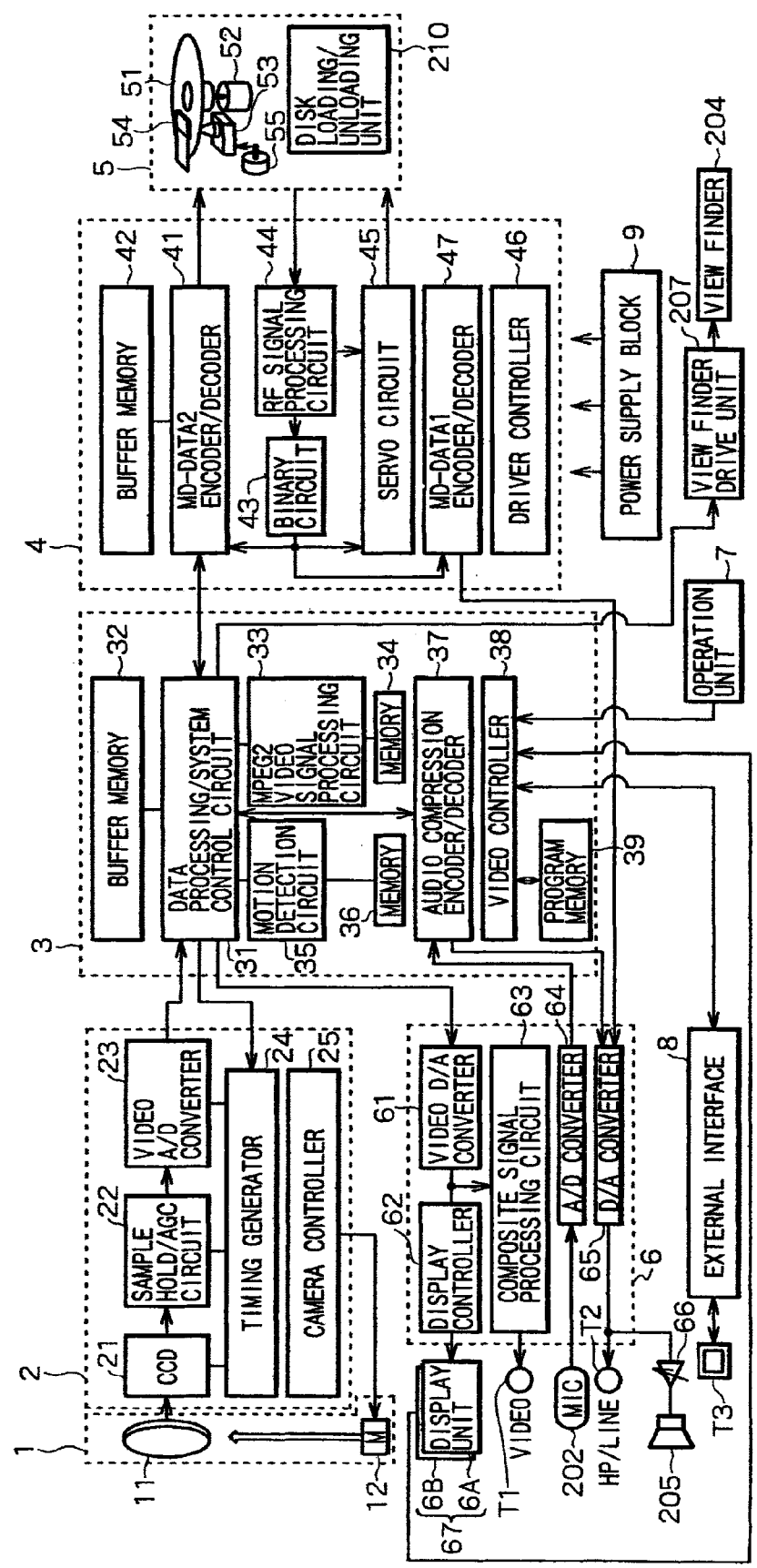

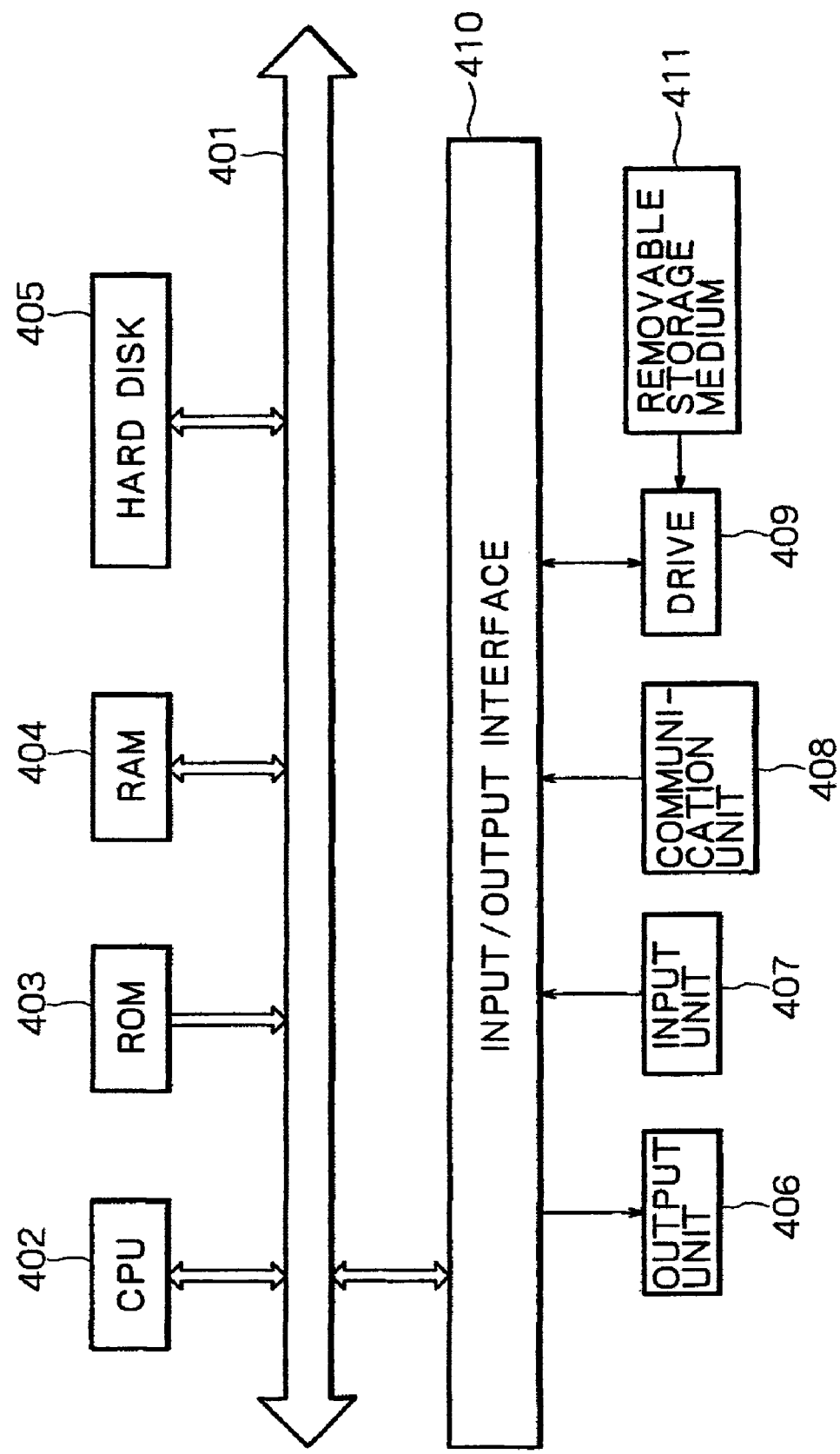

SERVICE OFFERING SYSTEM, MANAGEMENT SERVER, SERVICE PROVIDER, TERMINAL DEVICE, STORAGE MEDIUM ISSUING APPARATUS, SERVER OFFERING METHOD, AND STORAGE MEDIUM

CROSS-REFERENCE TO RELATED APPLICATIONS

This is a Continuation of application Ser. No. 10/027,194, filed on Dec. 20, 2001, now U.S. Pat. No. 7,739,299 which claims priority to JP 2000-393286, filed on Dec. 21, 2000, the contents of all of which are incorporated herein by reference.

BACKGROUND OF THE INVENTION

The present invention relates to a service offering system and, more particularly, to a service offering system designed to provide services relative to package media such as Mini-discs (trademark).

In recent years, network services offered illustratively by Internet service providers have rapidly become available, prompted by the widespread use of the Internet or similar networks. One of such services involves allowing content data such as digital audio data to be downloaded by customers for a fee.

Once disadvantage of that type of service is that preparatory to getting payable service offerings over the network, users must enter their credit card numbers for subsequent settlement of charges for the service rendered. The practice has inspired fears that personal information could be diverted off the network and abused.

A system proposed as a solution to the problem above requires that media, not the users who purchased them, be considered eligible for services offered by the system over the network. This system, however, is incapable of distinguishing between legitimately marketed media and their illegal copies; the system has no means of predicting the amount of services that are to be eventually offered over the network.

Other conventional systems have required that each user contract with a particular service provider before getting network services therefrom. In establishing a connection with the service provider, the user must make entries to complete such settings as a personal ID, a password and an access point. The process can often be a tedious, time-consuming chore.

The present invention has been made in view of the above circumstances and provides a service offering system that allows a service provider to offer diverse services with respect to media.

SUMMARY OF THE INVENTION

In carrying out the invention and according to a first aspect thereof, there is provided a service offering system including recording means for recording a unique identifier to each of a plurality of storage media issued, a database for storing and managing the identifiers, reading means for reading the recorded identifier from any of the storage media, checking means for checking the identifier read by the reading means against the identifiers managed in the database and service offering means for offering a service to the storage medium identified by the checked identifier depending on a result of the check by the checking means.

In carrying out the invention and according to a second aspect thereof, there is provided a service offering system including storage medium issuing means including recording means for recording a unique identifier to each of a plurality of storage media issued, a management server including a database for storing and managing the identifiers recorded to the storage media issued by the storage medium issuing means, a terminal device including reading means for reading the recorded identifier from any of the storage media, checking means for checking the identifier read by the terminal device against the identifiers managed in the database and a service provider including service offering means for offering a service to the terminal device depending on a result of the check by the checking means.

In carrying out the invention and according to a third aspect thereof, there is provided a service offering system including storage medium issuing means including recording means for recording a unique identifier to each of a plurality of storage media issued, a management server including a database which stores the identifiers and retains, in correspondence with the identifiers, right information which denotes services available to the storage media identified by the identifiers, a terminal device including reading means for reading the recorded identifier from any of the storage media and a service provider including service offering means for offering a service to the terminal device depending on a result of checking the identifier in question against the identifiers managed in the database and according to the right information stored in the database in correspondence with the checked identifier.

In carrying out the invention and according to a fourth aspect thereof, there is provided a management server including receiving means for receiving identifiers from a storage medium issuing party issuing a plurality of storage media identified by the identifiers which differ from one another and storing means for storing the identifiers in a database.

In carrying out the invention and according to a fifth aspect thereof, there is provided a service provider including receiving means for receiving an identifier from a terminal device and service offering means for offering a service to the terminal device depending on a result of checking the identifier against identifiers managed by a management server.

In carrying out the invention and according to a sixth aspect thereof, there is provided a terminal device including reading means for reading information from a storage medium, transmitting means for transmitting the information read by the reading means to a service provider, receiving means for receiving content data from the service provider and recording means for recording the received content data to the storage medium.

In carrying out the invention and according to a seventh aspect thereof, there is provided a storage medium issuing apparatus including recording means for recording a unique identifier to each of a plurality of storage media issued and transmitting means for transmitting the identifiers to a management server.

In carrying out the invention and according to a eighth aspect thereof, there is provided a service offering method for offering a service to a storage medium, the method including the steps of recording a unique identifier to each of a plurality of storage media issued, storing the identifiers into a database, reading the recorded identifier from any of the storage media, checking the identifier read from the storage medium against the identifiers stored in the database and offering a service to the storage medium identified by the checked identifier.

In carrying out the invention and according to a ninth aspect thereof, there is provided a service offering method for allowing a management server to offer a service to a storage medium, the method including the steps of receiving identifiers from a storage medium issuing party issuing a plurality of storage media identified by the identifiers which differ from one another and storing the identifiers.

In carrying out the invention and according to a tenth aspect thereof, there is provided a service offering method for allowing a service provider to offer a service to a storage medium, the method including the steps of receiving from a terminal device an identifier read by the device from a storage medium and offering a service to the terminal device depending on a result of checking the identifier read from the storage medium against identifiers managed by a management server.

In carrying out the invention and according to a eleventh aspect thereof, there is provided a storage medium for use with a service offering system which gets a service from a service provider, the storage medium including at least a first and a second storage area, wherein the first storage area stores an identifier that is unique to each storage medium, authentication information for authenticating the storage medium and program information for executing a process of establishing a connection with the service provider and wherein the second storage area stores content data received from the service provider.

In carrying out the invention and according to a twelfth aspect thereof, there is provided a storage medium which stores a processing program for allowing a management server to offer a service to a storage medium, the processing program including the steps of receiving identifiers from a storage medium issuing party issuing a plurality of storage media identified by the identifiers which differ from one another and storing the identifiers.

In carrying out the invention and according to a thirteenth aspect thereof, there is provided a storage medium which stores a processing program for allowing a service provider to offer a service to a storage medium, the processing program including the steps of receiving from a terminal device an identifier read by the device from a storage medium and offering a service to the terminal device depending on a result of checking the identifier sent from the terminal device against identifiers managed by a management server.

Other objects, features and advantages of the invention will become more apparent upon a reading of the following description and appended drawings.

BRIEF DESCRIPTION OF THE DRAWINGS

FIGS. 5A and 5B are a schematic and a tabular view, the schematic view illustrating a data area structure of a package medium according to the invention, the tabular view conceptually listing data contents held on the medium;

FIG. 6 is a tabular view conceptually indicating data contents stored in a medium ID database according to the invention;

FIG. 11 is a tabular view listing specifications of the disk compatible with the inventive video camera;

FIGS. 13A and 13B are a front and a back view of the inventive video camera;

FIG. 15 is a block diagram outlining an internal structure of the inventive video camera;

FIG. 33 is an explanatory view of a typical computer configuration embodying the invention.

DETAILED DESCRIPTION OF THE PREFERRED EMBODIMENTS

Figure 1:
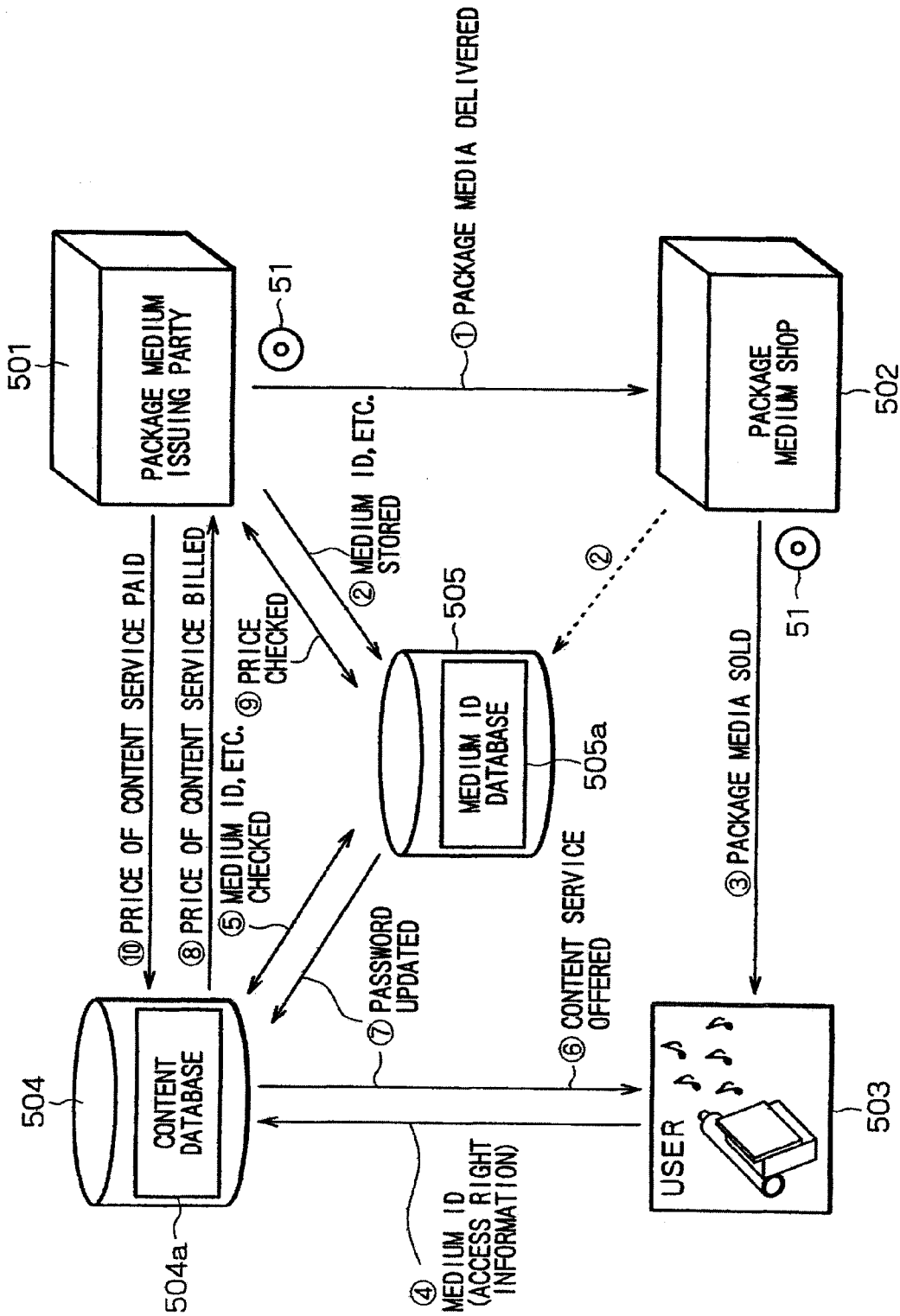
FIG. 1 is an explanatory view conceptually showing a typical structure of a service offering system according to the invention.

Preferred embodiments of this invention will now be described under the following headings:
1. System configuration
2. Server structure
2.1 Structure of medium ID management server
2.2 Structure of service provider
3. Medium ID and access right information
4. Storage of medium IDs and access right information
5. Steps for creating package media 6. User terminal device
6.1 Disk format
6.2 External structure of video camera
6.3 Internal structure of video camera
6.4 Structure of medium drive
6.5 Typical structure of disk compatible with video camera
6.6 Process for creating thumbnail images
6.7 Script
6.8 Operation screen displays
7. Typical content services
8. Processing operations
8.1 Starting process by user terminal device
8.2 Connecting processes
8.2.1 Connecting process by user terminal device
8.2.2 Process by management server
8.3 Download processes
8.3.1 Process by user terminal device (with access right held by disk)
8.3.2 Process by management server (with access right held by disk)
8.3.3 Process by user terminal device (with access right held by medium ID management server)
8.3.4 Process by management server (with access right held by medium ID management server)
8.4 Upload processes
8.4.1 Process by user terminal device
8.4.2 Process by management server
9. Replay process
10. Typical configuration of management server according to the invention 1. System Configuration FIG. 1 is an explanatory view conceptually showing a typical structure of a service offering system as whole according to the invention. How the system is illustratively run will now be described by referring to FIG. 1. Encircled numerals in FIG. 1 denote steps to be carried out in running the system. These steps are discussed below in ascending order.

Step 1: A package medium issuing party 501 produces package media containing recordings and offers (i.e., delivers) the media to a package medium shop 502. Each package medium 51 has a medium ID and a connection program recorded on it beforehand. The medium ID identifies the package medium in question and the connection program is used to establish a connection with a specific service provider 504. The package medium 51 may also contain access right information representing the right to receive a specific content service from the service provider 504. The medium ID, access right, and connection program recorded on the package medium 51 will be discussed later in more detail.

Step 2: When delivering the package media 51 to the package medium shop 502, the package medium issuing party 501 stores medium IDs written on the delivered package media 51 into a medium ID management server 505. The medium IDs are recorded to the server 505 illustratively from a medium issuing apparatus via a communication line. In granting access rights to the package media 51, the package medium issuing party 501 also stores relevant access right information to the medium ID management server 505 together with the medium IDs identifying the package media 51. The package media 51 may be any one of diverse types of media such as cards, disks and tapes. In the description that follows, the package media are assumed to be disks.

Step 3: The package medium shop 502 sells to users the package media 51 delivered by the package medium issuing party 501. The storing of medium IDs to the medium ID management server 505, described as executed in step 2 above, may be carried out alternatively by the package medium shop 502.

Step 4: Each user who bought a package medium 51 at the package medium shop 502 is assumed to possess a user terminal device 503. The purchased package medium 51 is loaded into the user terminal device 503 that is then suitably operated. The operation causes the user terminal device 503 to perform a connection process such as ID transmission using a connection program held on the loaded package medium 51, thereby connecting the terminal 503 automatically to a service provider 504.

With the connection to the service provider 504 established, the user terminal device 503 transmits to the service provider 504 a medium ID and access right information along with a service request regarding the package medium 51 in question. The user terminal device 503 may be any device capable of writing and reading data to and from the purchased package medium 51 and of connecting with the service provider 504 over a communication line. The presently preferred embodiment assumes the user terminal device 503 to be a video camera.

Step 5: Illustratively upon receipt of a connection request from the user terminal device 503, the service provider 504 checks the medium ID management server 505 to see whether the medium ID coming from the user terminal device 503 coincides with any one of the medium IDs stored in a medium ID database 505a of the medium ID management server 505. Given a service request from the user terminal device 503, the service provider 504 checks whether the access right specific to the medium ID from the user terminal device 503 is valid.

Step 6: Depending on the result of the check by the medium ID management server 505, the service provider 504 offers to the package medium 51 in the user terminal device a content service applicable to the access right information specific to the medium 51. The package medium 51 is thus provided with the content service for which it is eligible based on its previously granted access right. The content service offered to the user terminal device 503 will be discussed later in detail.

Step 7. When the service to the package medium 51 in the user terminal device 503 has been completed, the service provider 504 transmits to the user terminal device 503 update information such as a medium ID and access right information transferred from the medium ID management server 505. At the same time, the medium ID management server 505 also updates the applicable medium ID in the medium ID database 505a.

Step 8: After offering the content service to the package medium 51 in the user terminal device 503, the service provider 504 charges the package medium issuing party 501 a price for the content service rendered.

Step 9: When charged for the price of the content service by the service provider 504, the package medium issuing party 501 checks the charged content service price against the medium IDs held in the medium ID database 505a.

Step 10: If the price charged by the service provider 504 is judged appropriate, the package medium issuing party 501 pays the price of the content service to the service provider 504.

Figure 2:
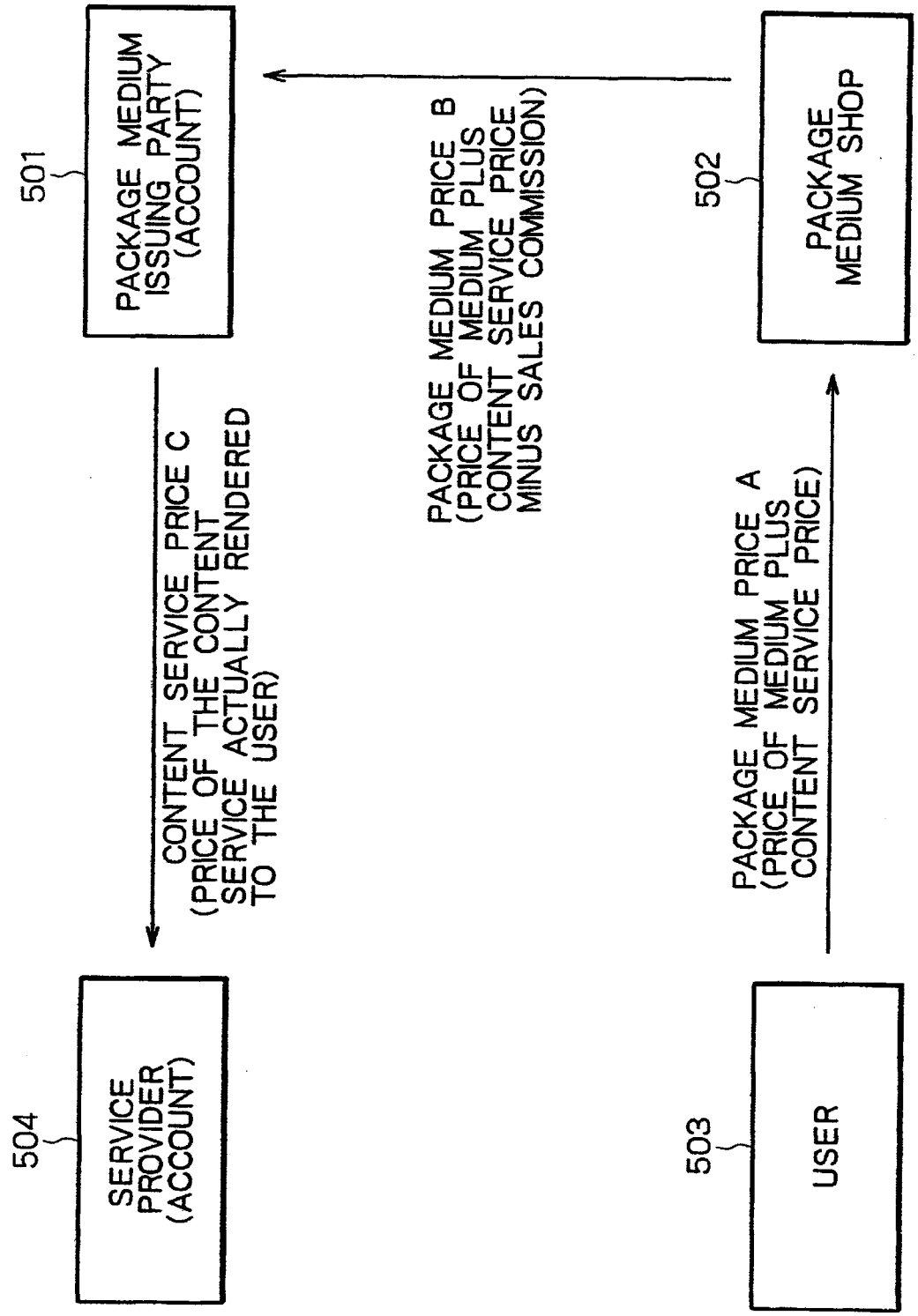
FIG. 2 is an explanatory view depicting a flow of content service payments according to the invention.

A typical flow of content service payments by the service offering system of this invention is described below with reference to FIG. 2. The price for the package media 51 is paid under a so-called prepaid scheme where an actual medium price is supplemented with a content service price. The content service payments collected in advance are managed by the package medium issuing party 501.

More specifically, a user buys at the package medium shop 501 a package medium 51 eligible for a particular content service. At this point, the user pays as a package medium price A the sum of the actual medium price plus the content service price.

The package medium shop 502 transfers to, say, a bank account of the package medium issuing party 501 the payment of a package medium price B given by subtracting a sales commission from the payment of the package medium price A by the user.

The package medium issuing party 501 then transfers to a bank account of the service provider 504 the payment of a content service price C charged by the service provider 504 (i.e., the price for the actual content service rendered to the user).

In the manner described, the user who purchased the package medium 51 need not settle content usage fees over the network as long as the content service offered by, say, a chargeable website falls within the range of a prepaid content service price. In other words, the inventive service offering system, unlike its conventional counterparts, does not require users who bought the package media 51 to enter personal information such as credit card numbers to settle payments over the network; there is no possibility of the personal information being diverted unscrupulously off the network.

2. Server Structure 2.1 Structure of Medium ID Management Server

Figure 3:
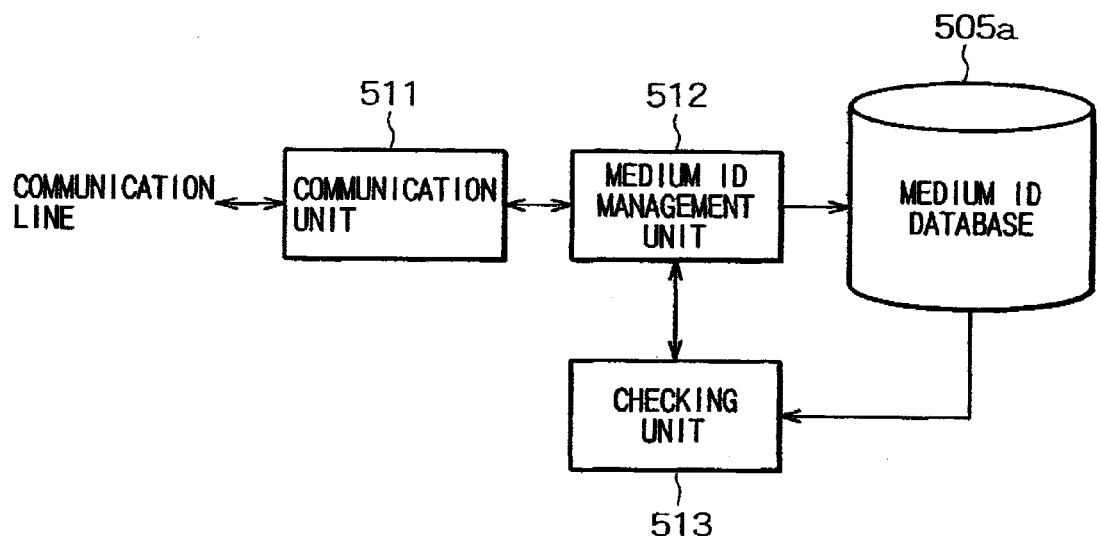
FIG. 3 is a schematic block diagram of a medium ID management server according to the invention.

FIG. 3 is a schematic block diagram of a typical medium ID management server according to the invention. In FIG. 3, a communication unit 511 communicates information with the package medium issuing party (having a medium issuing apparatus) and service provider 504 over communication lines. The communication lines may be a wired or wireless public line network or may be leased lines. Illustratively the Internet, satellite communication links, optical fiber networks or other communication lines may be used.

Data sent from the package medium issuing party 501 and service provider 504 are received by the communication unit 511 and forwarded to a medium ID management unit 512. When the medium ID management unit 512 generates data destined for the package medium issuing party 501 or for the service provider 504, the data are first transferred to the communication unit 511 and then transmitted from there to the package medium issuing party 501 or to the service provider 504.

On receiving medium ID data from the package medium issuing party 501 through the communication unit 511, the medium ID management unit 512 puts the received data into database format for storage into the medium ID database 505a. If a medium ID or access right information is sent from the service provider 504 via the communication unit 511, the medium ID management unit 512 transfers the ID or the information to a checking unit 513.

Given the medium ID from the medium ID management unit 512, the checking unit 513 checks the received data against the medium ID data stored in the medium ID database 505a. The result of the check is transferred to the medium ID management unit 512. If access right information has arrived through the medium ID management unit 512 together with the medium ID, the checking unit 513 also checks to see if the access right information is valid and transfers the result of the check to the medium ID management unit 512.

Given the result of the check from the checking unit 513, the medium ID management unit 512 generates accordingly data destined for the service provider 504 and transfers the generated data to the communication unit 511.

As a security measure, the checking unit 513 checks the medium ID coming from the service provider 504 against the medium IDs stored in the medium ID database 505a. In that case, the checking unit 513 generates update information for updating the password and other relevant data in the medium ID specific to the package medium 51 in question. The update information thus generated is transferred to the medium ID management unit 512.

The medium ID database 505a is a database that accommodates medium IDs entered by the package medium issuing party 501 (or by the package medium shop 502). Where access right information is stored along with medium IDs, the access right information is also put into database format and stored in association with the corresponding medium IDs.

2.2 Structure of Service Provider

Figure 4:
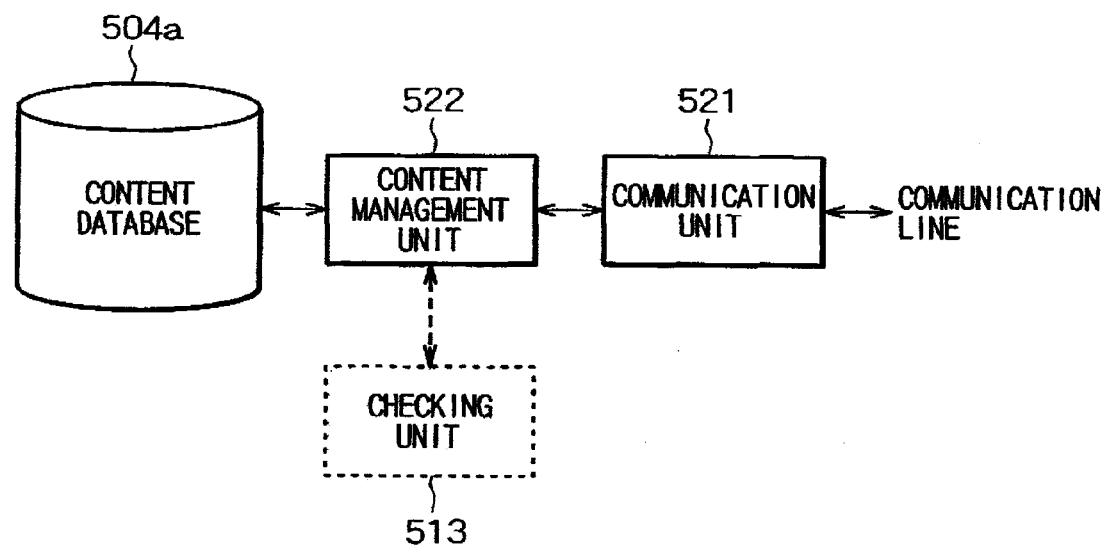
FIG. 4 is a schematic block diagram of a service provider according to the invention.

FIG. 4 is a schematic block diagram of the service provider 504 according to the invention. In FIG. 4, a communication unit 521 communicates information with the user terminal device 503 and medium ID management server 505 over communication lines. The communication lines may also be a wired or wireless public line network or may be leased lines. Illustratively the Internet, satellite communication links, optical fiber networks or other communication lines may be used.

Data sent from the user terminal device 503 and medium ID management server 505 are received by the communication unit 521 and forwarded to a management unit 522. When the management unit 522 generates data destined for the medium ID management server 505 or for the user terminal device 503, the data are first transferred to the communication unit 521 and then transmitted from there to the medium ID management server 505 or to the user terminal device 503.

Upon receipt of a connection request from the user terminal device 503 via the communication unit 521, the management unit 522 carries out a suitable authentication process before establishing a connection with the terminal device 503. More specifically, a connection request or a service request received from the user terminal device 503 through the communication unit 521 is transferred to the medium ID management server 505 together with the medium ID accompanying the request. Given the result of a check by the medium ID management server 505, the management unit 522 determines whether or not to authenticate the package medium 51 in the user terminal device 503.

Upon receipt of a service request (i.e., a content download request) from the user terminal device 503, the management unit 522 proceeds to offer the service on condition that the request be judged valid. Illustratively, the management unit 522 first transfers to the medium ID management server 505 the medium ID and access right information accompanying the service request from the user terminal device 503. Based on the result of checks by the medium ID management server 505 on the validity of the medium ID and access right information, the management unit 522 provides the relevant service to the package medium 51 in the user terminal device 503. It should be noted that the access right information is transferred from the service provider 504 to the medium ID management server 505 only if the package medium 51 in question has the access right information recorded on it.

Where the medium ID management server 505 transfers to the management unit 522 update information such as the medium ID written on the package medium 51 in the user terminal device 503, the management unit 522 transmits the update information illustratively when the service to the package medium 51 has been completed.

With the service offered to the user terminal device 503, the management unit 522 performs in a suitably timed manner a charge process for charging the package medium issuing party 501 a price of the content service rendered.

The content database 504a is a database where diverse content data are stored in upload-ready fashion.

A checking unit 513 indicated by broken lines in FIG. 4 is provided to check that medium ID of the package medium 51 which is sent from the user terminal device 503, against the medium IDs stored in the medium ID database 505a. More specifically, upon receipt of the medium ID from the user terminal device 503, the service provider 504 requests the medium ID management server 505 to transfer the corresponding medium ID stored therein, and checks the medium ID from the user terminal device 503 against the transferred medium ID. If access right information has arrived along with the medium ID, a check is also made to see if the information is valid. Based on the result of the check, the service provider 504 offers the relevant service to the package medium 51 in the user terminal device 503.

3. Medium ID and Access Right Information

What follows is a description of the medium ID and access right information recorded on each package medium 51 and stored in the medium ID database 505a. How a medium ID and access right information are recorded on a package medium 51 is discussed first with reference to FIGS. 5A and 5B.

FIGS. 5A and 5B conceptually show a typical data area structure of the package medium 51. In this example, the package medium 51 is assumed to be compatible with a Mini-disc (i.e., a magneto-optical disk). A detailed directory structure of the package medium 51 will be discussed later in 6.5, "Typical structure of disk compatible with video camera"; the description hereunder will deal with general aspects of the data area structure.

Where the package medium 51 is compatible with a Mini-disc, the radially inner side of the disk has a medium ID information recording area DA1 that accommodates a medium ID and access right information; the radially outer side of the disk has a content data recording area DA2 designed to store content data and other information acquired illustratively through download.

The medium ID recorded in the medium ID information recording area DA1 is illustratively made up of an ID and a password as shown in FIG. 5B. The ID stands for an identifier unique to each different package medium 51 for this embodiment. The IDs may be established as desired by the package medium issuing party 501. Illustratively, the IDs may be serial numbers given to the package media 51 in the order in which the latter have been produced. The IDs may be varied by country or by region in which the package medium 51 are marketed.

A password constitutes information for authentication of each package medium 51. Although authentication information is dealt with as the password in this example, public key information may be adopted alternatively as authentication information and written to the package media as needed. For purpose of security, each password may be changed upon a check of the medium ID from the package medium 51 against the medium IDs stored in the medium ID database 505a.

Furnishing different package media 51 with different identifiers as in this example offers the following major benefits: if the TOC (table of contents) data on the package medium 51 were used as a medium ID, then all package media 51 with the same TOC would have a common medium ID. That would make it difficult for the service provider 504 to grasp the number of package media 51 having been sold. There would be no way to distinguish the properly sold package media 51 from their illegal copies. Hence the inability of the service provider 504 to predict the number of times the service is to be offered.

By contrast, the package media 51 each furnished with a unique ID according to this invention make it possible for the service provider 504 to grasp a definite number of times the service is to be offered. Even if some package media 51 are illegally copied, the amount of the service which the service provider 504 is required to offer to the entire package media 51 remains unchanged. Since the number of the issued package media 51 is determined by referencing the medium IDs stored in the medium ID management server 505, it is easy for the service provider 504 to predict the amount of the service to be rendered.

Where the IDs are varied by country or by region where the package media 51 are marketed, the service provider 504 can also grasp easily the amount of the service to be rendered to users by country or by region.

Access right information recorded in the medium ID information recording area DA1 will now be described. The access right information represents the right of each package medium 51 to receive a content service from a specific service provider 504. The access right information written on the package media 51 varies in detail depending on the content service for which they are eligible. Illustratively, the access right information may comprise a URL for gaining access to a specific website through which the content service is provided to each package medium 51; a download authorization bit set either for 0 or for 1 granting or not granting the package medium 51 in question the right to receive a content download service from the specific website; or an upload authorization bit also set either for 0 or for 1 granting or not granting the package medium 51 the right to get a content upload service to the website.

Although not shown in FIG. 5A or 5B, the medium ID information recording area DA1 contains application programs such as a connection program for automatically establishing a network connection with a specific service provider 504 and a replay program for replaying downloaded content data. Also written in the area DA1 is information about the service provider 504 to be connected with.

The data downloaded from the service provider 504 on the network are recorded to the content data recording area DA2 of the package medium 51. The downloaded content data cannot be taken out of the user terminal device 503 as digital information. In other words, the content data are made unavailable for secondary use.

Medium IDs and access right information stored in the medium ID database 505a of the medium ID management server 505 will now be described with reference to FIG. 6. The medium IDs and the related access right information regarding the package media 51 issued by the package medium issuing party 501 (or by the package medium shop 502) are put into database format and stored in the medium ID database 505a as depicted in FIG. 6.

In the case above, of the medium IDs and access right information to be stored in the medium ID database 505a, a medium ID is stored whenever the package medium issuing party 501 (or the package medium shop 502) issues a package medium 51. That means the same information as that on the package media 51 is always stored in database format.

As with the access right information recorded on the package media 51, the access right information stored in the medium ID database 505a varies in detail depending on the content service granted to the package medium specific to each medium ID.

Although the access right information is recorded (i.e., stored) both onto the package media 51 and into the medium ID database 505a for this embodiment, this is not limitative of the invention. Alternatively, the access right information may be recorded (i.e., stored) at least either onto the package media 51 or into the medium ID database 505a. That is, there may be three cases in which access rights are granted to the package media 51: (i) access rights are recorded in the medium ID database 505a alone; (ii) access rights are written onto the package media 51 only; or (iii) access rights are recorded both in the medium ID database 505a and to the package media 51.

The access right granted to each package medium 51 may be accompanied by additional information supplementing the access right to upload or download, as shown in FIGS. 5A, 5B and 6. Such additional information may be used to permit uploading from or downloading to the package medium 51 under specific conditions.

The access right may be granted to the package medium 51 illustratively in any one of three cases.

Case 1: the package medium 51 is granted a predetermined amount of money information exchangeable for content data over the network.

Case 2: the package medium 51 is subject to a time limit on the service for which it is eligible.

Case 3: the package medium 51 is granted an access right if a specific condition or conditions have been met.

Each of these cases will be discussed below in more detail.

(Case 1)

A predetermined amount of money information may be recorded on each package medium 51 as access right information, the money information being exchangeable for content data over the network. In this case, the user of the package medium 51 receives a content service in exchange for the money information written on the package medium 51. The service is received illustratively from a website of the service provider 504. Upon receipt of the content service, the money information recorded on the package medium 51 as the access right information is reduced by the amount corresponding to the service rendered. When all money information specific to the package medium 51 has been exhausted in exchange for the content data, the right of the medium to access the website is nullified and all future attempts to get the service are denied. Illustratively, the access right information granting the package medium 51 the right to download may be nullified by changing the download authorization bit from 0 ("authorized") to 1 ("unauthorized").

Where the money information exchangeable for a service over the network is written to the medium as access right information permitting access to a chargeable website to receive the service therefrom, there is no need for users to settle payments online by entering their credit card information that could be abused off the network. Users not in possession of credit cards can thus receive payable services over the network as well. The arrangement of Case 1, as shown in FIGS. 5A, 5B and 6, is implemented by recording (i.e., storing money information along with access right information (e.g., a website URL, an upload authorization bit, a download authorization bit) at least either onto the package media 51 or into the medium ID management server 505.

(Case 2)

The service provider 504 may grant each package medium 51 access right information that is valid only for a predetermined period. In this case, the user who bought a package medium 51 is eligible for a content service from the service provider 504 during the period granted to the purchased package medium 51. After that period, the right to access the content data is nullified and all future attempts to get the service are denied. Where the access right information is supplemented with such period information, the access right becomes effective only during the designated period of time. The arrangement of Case 2 is implemented illustratively by storing period information indicating the usable period for the download service as additional access right information into the medium ID management server 505 together with such access right information as the relevant website URL and download authorization bit.

(Case 3)

Access right information may be granted to the user of the package medium 51 only if the user agrees to view an advertisement offered by the service provider 504. In this case, if the user cannot or will not agree to the condition, the access right granted to the package medium 51 is nullified. As an alternative, the user may have the access right until the user has received a predetermined number of times the content service designated by the service provider 504. The access right thus granted is nullified when the user has made use of the service a predetermined number of times or when a usable period for the service has expired. As another alternative, the user may be granted the access right if the user receives the content service during a specific campaign period designated by the service provider 504. The access right is then nullified when the designated campaign period has ended.

The arrangement of Case 3 is implemented by recording (storing) access right information such as advertisement information (i.e., whether or not the user has agreed to the delivery of advertisement), use count information (i.e., how many times the user has received the service), and period information (usable period for the service) onto the package media 51 or into the medium ID management server 505 together with such access right information as the download authorization bit.

With this embodiment, as described, a medium ID is written onto each package medium 51 and/or into the medium ID management server 505 along with access right information indicating how the service is to be granted to the medium 51 specific to the medium ID in question. The embodiment thus provides the package media 51 with upload and download services that are made available over the network. Different websites adopting different schemes of authentication can be readily dealt with by modifying programs recorded on each package medium 51. When URLs of websites offering services to the package media 51 are recorded as part of the access right information, access to individual websites is accomplished in an appreciably easy manner.

The content data downloaded over the network to the package medium 51 are recorded into its content data recording area DA2. This makes it possible for the user physically to hand over to someone else the package medium 51 with the access right and content data written on it.

The package medium 51 also contains a replay program for replaying downloaded content data. That means there is no need to install any additional software necessary for reproducing the data having been downloaded.

4. Storage of Medium IDs and Access Right Information

The medium IDs and access right information discussed above are stored into the medium ID database 505a of the medium ID management server 505 by the package medium issuing party 501 or by the package medium shop 502. Illustratively, as indicated by arrowed solid lines in FIG. 7, the package medium issuing party 501 may, upon delivering package media 51 to the package medium shop 505, store medium IDs of the delivered media into the medium ID database 505a of the medium ID management server 505.

Figure 7:
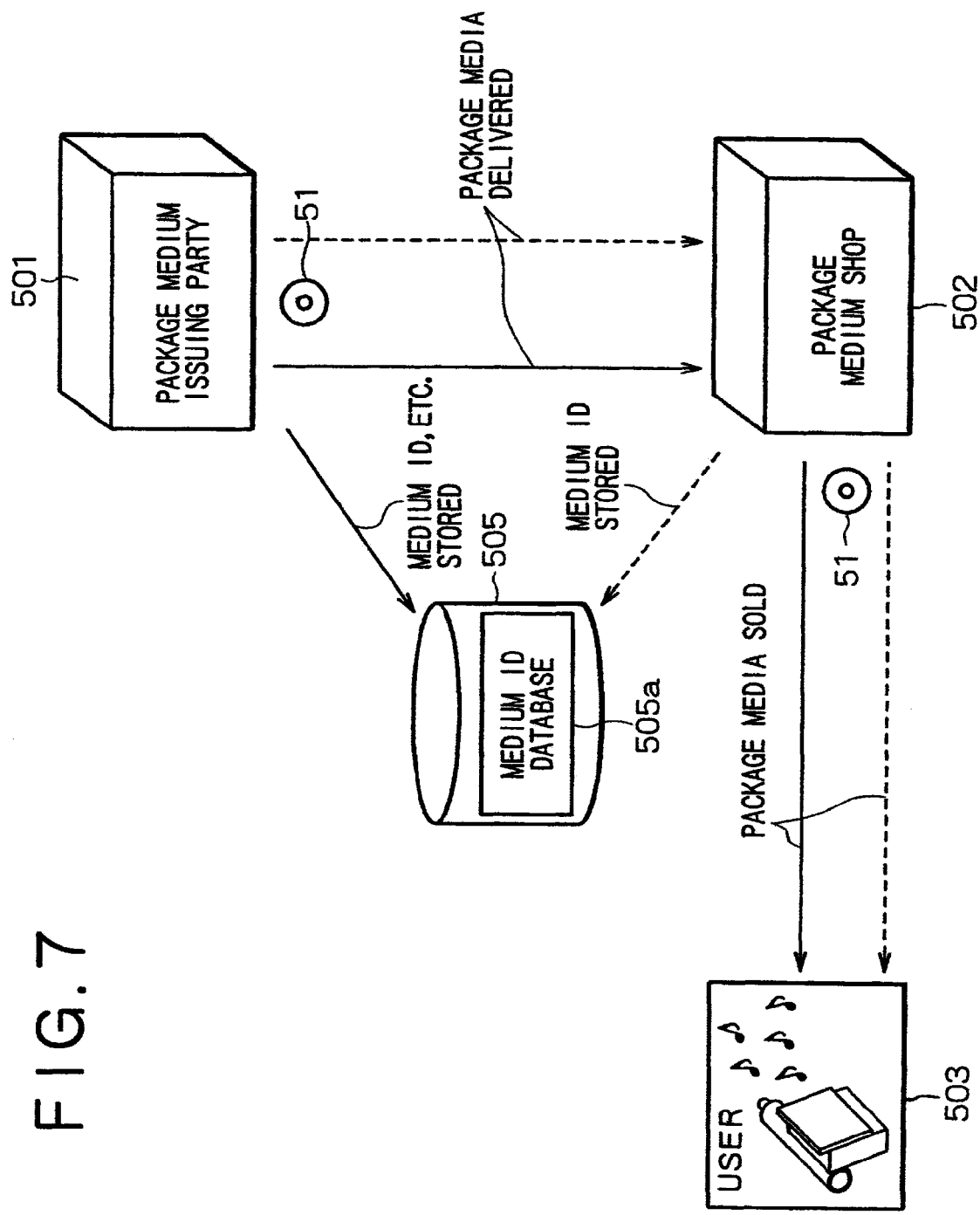
FIG. 7 is an explanatory view outlining a setup in which medium IDs are stored in a medium ID management server.

Alternatively, as denoted by arrowed broken lines in FIG. 7, the package medium shop 502 instead of the package medium issuing party 501 may, upon selling package media 51, record their medium IDs to the medium ID management server 505. In any case, when a user has bought a package medium 51, the medium ID of the sold medium is stored into the medium ID database 505a of the medium ID management server 505.

5. Steps for Creating Package Media

Figure 8:
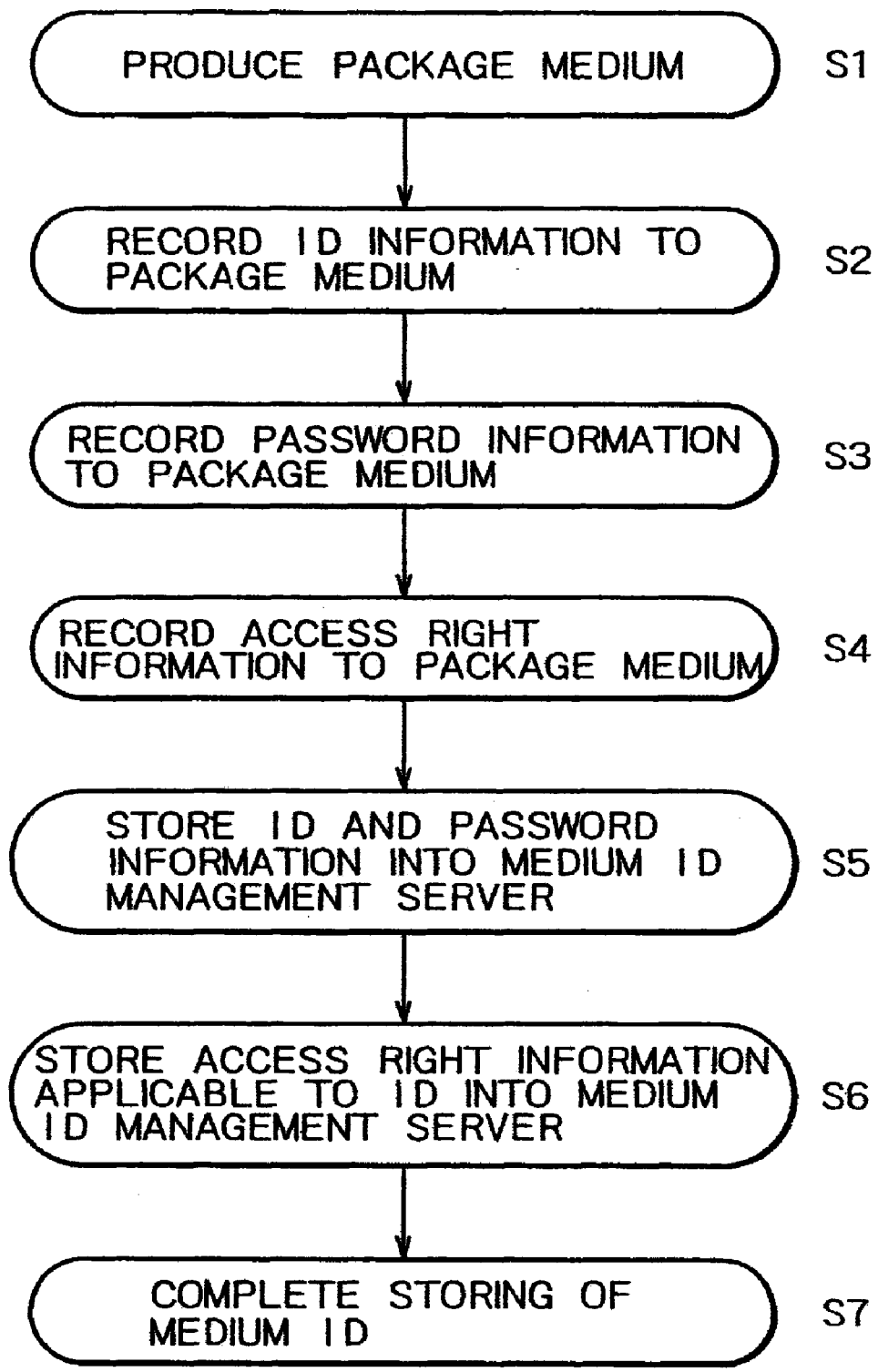
FIG. 8 is a flowchart of steps for creating package media according to the invention.

FIG. 8 is a flowchart of steps for creating package media 51 according to the invention. In this example, it is assumed that the package media 51 are created by the package medium issuing party 501 and that their medium IDs are also recorded by the package medium issuing party 501 to the medium ID management server 505.

In step S1 of FIG. 8, a package medium 51 such as a Mini-disc is produced. In step S2, a medium ID is recorded onto the package medium 51 produced in step S1. The ID to be written as an identifier should differ from one package to another. The identifier is recorded to the medium ID information recording area DA1 on each package medium 51. With the ID written to the package medium 51, step S3 is reached in which a password is recorded to the medium ID information recording area DA1 of the package medium 51. If necessary, access right information is written also to the medium ID information recording area DA1 in step S4.

In step S5, the medium ID and password are transmitted from the medium issuing apparatus to the medium ID management server 505 over communication lines. The transmitted data are stored into the medium ID database 505a. With the medium ID of the package medium 51 written to the medium ID database 505a, step S6 is reached in which access right information, if any, is recorded to the medium ID database 505a in association with the stored medium ID. This completes storage of the medium ID of the package medium 51 into the medium ID management server 505. At this stage, the medium IDs of the package media 51 issued by the package medium issuing party 50 as well as the access right information associated with the IDs are retained in the medium ID database 505a of the medium ID management server 505.

Where the package medium shop 502 is to record account information to the medium ID management server 505, the package medium issuing party 501 first records the medium ID and access right information to the package medium 51 in steps S1 through S4 above. Then the package medium shop 502 writes the medium ID and access right information to the media ID management server 505 in step S5 and subsequent steps.

6. User Terminal Device

The user terminal device 503 according to the invention will now be described. In the description that follows, the user terminal device 503 is assumed to be a video camera. It is possible obviously to constitute the user terminal device 503 by a personal computer instead.

6.1 Disk Format

A recording-reproducing apparatus mounted on the video camera constituting the user terminal device 503 of the invention is assumed to be compatible with what is known as an MD data format. That is, the apparatus is capable of recording and reproducing data to and from a Mini-disc (a magneto-optical disk). Of the two prevalent MD data formats called MD-DATA1 and MD-DATA2, the MD-DATA2 format is adopted by the inventive video camera so that it may write and read data to and from the disk at a higher density than in the MD-DATA1 format. The MD-DATA2 format is outlined below.

Figure 9:
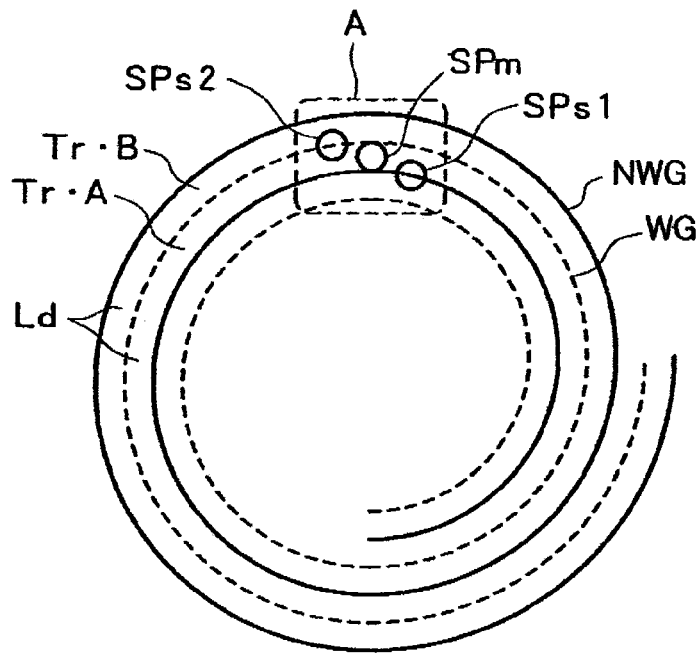
FIG. 9 is an explanatory view showing a track structure of a disk compatible with a video camera used as a user terminal device according to the invention.
Figures 10A, 10B:
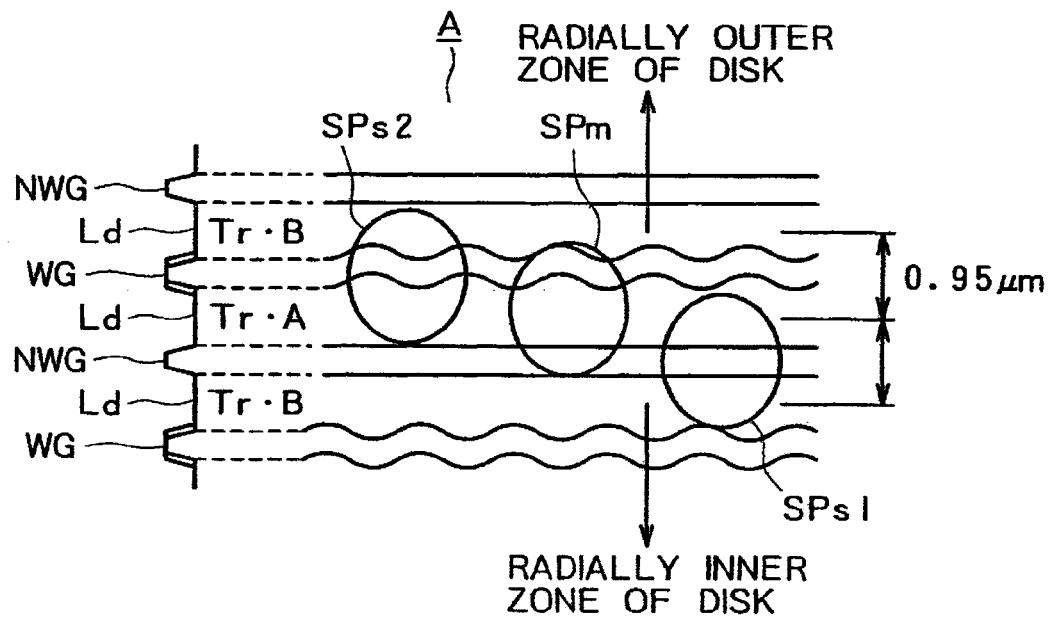
FIGS. 10A and 10B are a sectional and a plan view depicting in magnified fashion tracks of the disk compatible with the inventive video camera.

FIGS. 9, 10A and 10B conceptually illustrate a typical track structure of the disk subject to the MD-DATA2 format. FIGS. 10A and 10B are a sectional and a plan view depicting in magnified fashion a portion A of the disk enclosed by broken lines in FIG. 9. As shown in these figures, two kinds of grooves are formed in advance on the disk surface: wobbled grooves WG and non-wobbled grooves NWG. The two kinds of grooves are arranged alternately on the disk surface in a double-spiral fashion so that a land Ld is produced between the two different grooves.

Where the MD-DATA2 format is in effect, lands Ld are utilized as recording tracks (i.e., tracks where data are recorded). Because the wobbled grooves WG and non-wobbled grooves NWG are formed alternately as mentioned, two kinds of recording tracks Tr-A and Tr-B are formed independently in double-spiral fashion. That is, the track Tr-A is flanked by a wobbled groove WG on the radially outer side of the disk and by a non-wobbled groove NWG on the radially inner side; the track Tr-B is flanked by a wobbled groove WG on the radially inner side of the disk and by a non-wobbled groove NWG on the radially outer side. In other words, each track Tr-A has a wobbled groove formed only on the radially outer side of the disk, while each track Tr-B has a wobbled groove formed only on the radially inner side. In this makeup, the track pitch is defined by the distance between the adjacent tracks Tr-A and Tr-B, i.e., between their centers. The track pitch for this makeup measures 0.95 μm as shown in FIG. 10B.

The wobble found in each wobbled groove WG is formed on the basis of signals that have physical addresses on the disk surface encoded by frequency modulation plus biphase modulation. Upon recording replay, physical addresses on the disk can be extracted by suitably demodulating replay information obtained from the wobbled groove WG.

Address information acquired from each wobbled groove WG is effective for both the track Tr-A and the track Tr-B. That is, the track Tr-A on the radially inner side of a given wobbled groove WG and the track Tr-B on the radially outer side thereof share the address information granted to the wobbled groove WG in question.

The above system of addressing is known as the interlace addressing method. Adopting the interlace addressing method illustratively reduces the track pitch while minimizing crosstalk between the adjacent wobbled grooves. The setup for recording addresses by forming wobbles in previously formed grooves constitutes what is called the ADIP (Address-in-Pregroove) system.

Which of the tracks Tr-A and Tr-B sharing the same address information is being traced can be known illustratively by a so-called three-beam method involving a main beam and two side beams. With the main beam tracing a land Ld, the two remaining side beams are thought to trace the grooves located on both sides of the currently traced track.

In FIG. 10B, for example, a main beam spot SPm flanked by two side beam spots SPs1 and SPs2 is shown tracing the track Tr-A. In this case, the side beam spot SPs1 on the radially inner side traces the non-wobbled groove NWG while the side beam spot SPs2 on the radially outer side tracks the wobbled groove WG. By contract, although not shown, if the main beam spot SPm traces the track Tr-B, then the side beam spot SPs1 is supposed to trace the wobbled groove WG with the side beam spot SPs2 tracing the non-wobbled groove NWG. That is, depending on the main beam spot SPm tracing either the track Tr-A or the track Tr-B, the side beam spot SPs1 necessarily traces the wobbled groove WG while the side beam spot SPs2 traces the non-wobbled groove NWG, or vice versa.

A photo detector is used to acquire a detection signal corresponding to the reflection of the side beam spots SPs1 and SPs2, the detection signal having a different waveform depending on either the wobbled groove WG or the non-wobbled groove NWG being traced. The detection signal indicates which of the side beam spots SPs1 and SPs2 is currently tracing the wobbled groove WG (or non-wobbled groove NWG). This in turn permits determining which of the tracks Tr-A and Tr-B is being traced by the main beam.

FIG. 11 compares major specifications of the MD-DATA2 format having the above-described track structure with those of the MD-DATA1 format. With the MD-DATA1 format, the track pitch is 1.6 μm, the pit length is 0.59 μm/bit, the laser wavelength ($\lambda$) is 780 nm, and the numerical aperture (NA) of an optical head is 0.45. As the recording mode, groove recording is adopted. That is, grooves are used as tracks to and from which data are written and read. The address system adopted for this format is a single-spiral two-side wobbled groove system in which grooves (tracks) are formed in single-spiral fashion, each groove being flanked by wobbles formed so as to represent address information.

The modulation technique adopted for data recording is EFM (Eight-Fourteen Modulation). As the error correcting system, ACIRC (Advanced Cross Interleave Reed-Solomon Code) is adopted. For data interleave, the convolution scheme is adopted. All these specifications amount to the data redundancy of 46.3%.

Also with the DM-DATA1 format, CLV (Constant Linear Velocity) is adopted as the disk driving system. The linear velocity of CLV is 1.2 m/s. The standard data rate for recording and reproduction is 133 kB/s, and the storage capacity is set for 140 MB.

By contract, in the case of the MD-DATA2 format with which the inventive video camera is compatible, the track pitch is 0.95 μm and the pit length is 0.39 μm/bit. Both settings are shorter than those of the MD-DATA1 format. The prolonged pit length is realized illustratively by setting the laser wavelength ($\lambda$) at 650 nm and the numerical aperture (NA) of the optical head at 0.52. That is, the beam spot diameter at the focal point is reduced while the zone availability of the optical system is enlarged.

Land recording is adopted as the recording mode and interlace addressing is used as the address system, as described above with reference to FIGS. 9, 10A and 10B. Adopted as the modulation technique for data recording is RLL (Run Length Limited Encoding; 1,7) suitable for recording at significantly higher density than ever before. RS-PC is adopted as the error correcting system and the block contained scheme is used for data interleave. These settings amount to the data redundancy of as low as 19.7%.

Also with the MD-DATA2 format, CLV is adopted as the disk driving system. The linear velocity of CLV is set for 2.0 m/s. The standard data rate for recording and reproduction is 589 kB/s, and the storage capacity is 650 MB. That means the MD-DATA2 format affords more than four times the storage capacity available in the MD-DATA1 format. Illustratively, if moving picture data are to be recorded compression-coded in the MD-DATA2 format, the moving pictures may be recorded for 15 to 17 minutes depending on the bit rate in effect for data encoding. If audio signal data alone are to be recorded in compressed fashion by ATRAC2 (Adaptive Transform Acoustic Coding 2), the audio data may be recorded for about 10 hours.

6.2 External Structure of Video Camera

A typical external structure of the video camera according to the invention will now be described. FIGS. 12A, 12B, 13A and 13B are a plan view, a side view, a front view, and a back view of the inventive video camera respectively. As shown in these figures, a body 200 of the video camera is equipped with a camera lens 201 projected in front. The camera lens 201 includes image pickup lens and aperture arrangements. At the back bottom of the body 200 is a microphone 202 designed to pick up external sound during image pickup. That is, the video camera is capable of recording both pictures taken by the camera lens 201 and sounds picked up in stereo by the microphone 202. A speaker 205 for reproduced sound output is attached to the same location as the microphone 202. The speaker 205 may also output message sounds illustratively in beeps.

A viewfinder 204 is located at the back of the body 200. During recording or on standby, the viewfinder 204 displays pictures (sometimes called through-pictures) taken by the camera lens 201, icons and other images. The user can take pictures while looking into the viewfinder 201. A main dial 300, a release key 301 and an erase key 302, to be described later, are mounted on a battery lid 206 that may be opened and closed. Opening the battery lid 206 allows a chargeable battery to be inserted and taken out.

At one side of the body 200 is a hinged display panel 203 that is attached swingingly to the body 200 by means of a hinged support 208. How the hinged display panel 203 moves will be described later.

At the back of the hinged display panel 203 is a display panel screen 67. When the hinged panel 203 is swung shut as shown in FIG. 12B, the display panel screen 67 faces the body while being housed therein.

The display panel screen 67 displays images picked up by the lens and pictures reproduced by the internal recording-reproducing apparatus. The screen 67 also gives indications in characters and icons for notifying the user of messages regarding operations of the video camera. The display panel screen 67 may be implemented by, but not limited to, a display device such as a liquid crystal display.

The display panel screen 67 illustratively has a touch-sensitive panel which, located behind the display surface, senses pushing actions on the surface and translates them into operation information to be output. That is, the embodiment affords the user an operating environment in which images on the display panel screen 67 may be operated on by the pushes in a so-called GUI fashion.

On the display panel screen 67, the points pushed on the touch-sensitive panel are detected as coordinate location information. The screen surface may be pointed to with fingertips. However, given the fact that the display panel screen 67 has a limited surface area, the pointing action may be difficult to accomplish with fingers. In such a case, a stick-like pen 320 may be used instead as shown in FIG. 12B. The user may point to (i.e., touch) the display panel screen 67 using the pen 320 instead of the fingertips.

A disk loading/unloading unit 210 is located along that part of the body 200 into which the hinged display panel 203 is housed. The disk used as a storage medium by this video camera is loaded into and unloaded from the disk loading/unloading unit 210.

Although not shown in these figures, the video camera comprises a video output terminal for outputting reproduced video signals to an external video device, and a headphone/line terminal for outputting reproduced audio signals to an external audio device or to headphones. Also provided is an interface (I/F) terminal as an extension of an interface function provided by the video camera for exchanging data with an external data processing device.

The body 200 includes various keys and controls to be manipulated by the user. The major keys and controls are described below.

The main dial 300 is attached to the back of the body 200 as shown in FIG. 13B. The dial 300 is used to turn on and off the video camera and to make settings for recording and replay operations. Rotating the main dial 300 performs the operations or establishes the settings.

With the main dial 300 placed in a power-off position PS2, the video camera remains deactivated. Turning the dial 300 to a replay/edit position PS1 activates the video camera and brings about a mode in which recording files are replayed or various editing operations are carried out. Rotating the main dial 300 to a camera mode position PS3 brings out a camera mode where, with the video camera turned on, moving pictures or still pictures may be recorded into files. Turning the dial 300 further to a camera mode position PS4 puts the video camera in an interview mode.

The interview mode, to be brief, is a mode in which, with sounds recorded continuously, pressing the release key 301 or a photo key 304 (to be discussed later) at a desired point in time causes the image being picked up at that point to be recorded as a still picture. For a replay of the file recorded in the interview mode, continuous playback of the sound is illustratively interspersed with still pictures reproduced in the same timed sequence in which they were recorded.

At the pivotal center of the main dial 300 is the release key 301. The release key 301 is operated to start and stop recording in the camera mode or interview mode.

A jog dial 303 is attached to the back of the body 200. The jog dial 303 is a disk-like control that may be rotated in the forward and backward directions (i.e., clockwise and counterclockwise). In rotating the jog dial 303, the user gets a "click" feel in increments of a specific rotating angle. In practice, the jog dial 303 may be combined with a two-phase rotary encoder. In that combination, a single dial click is made to correspond with a given step of rotation so that information representing the number of rotating steps with regard to the rotating direction and rotating angle currently in effect will be output. The jog dial 303 is designed to be pushed toward the left as viewed in FIG. 13B.

The erase key 302 is used to finalize erasure of data being reproduced in a given mode.

Figure 12A:
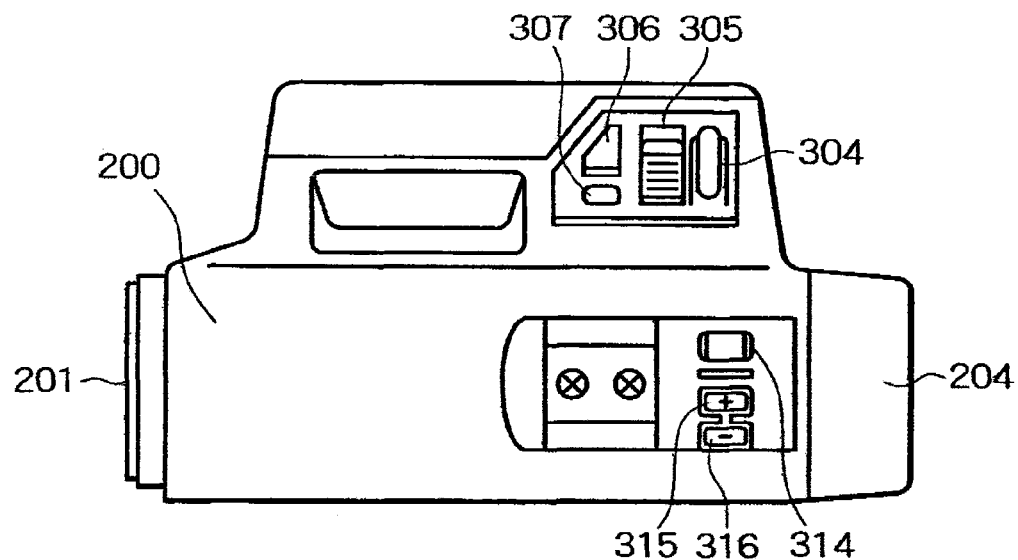
FIGS. 12A and 12B are a plan and a side view of the inventive video camera.
Figure 12B:
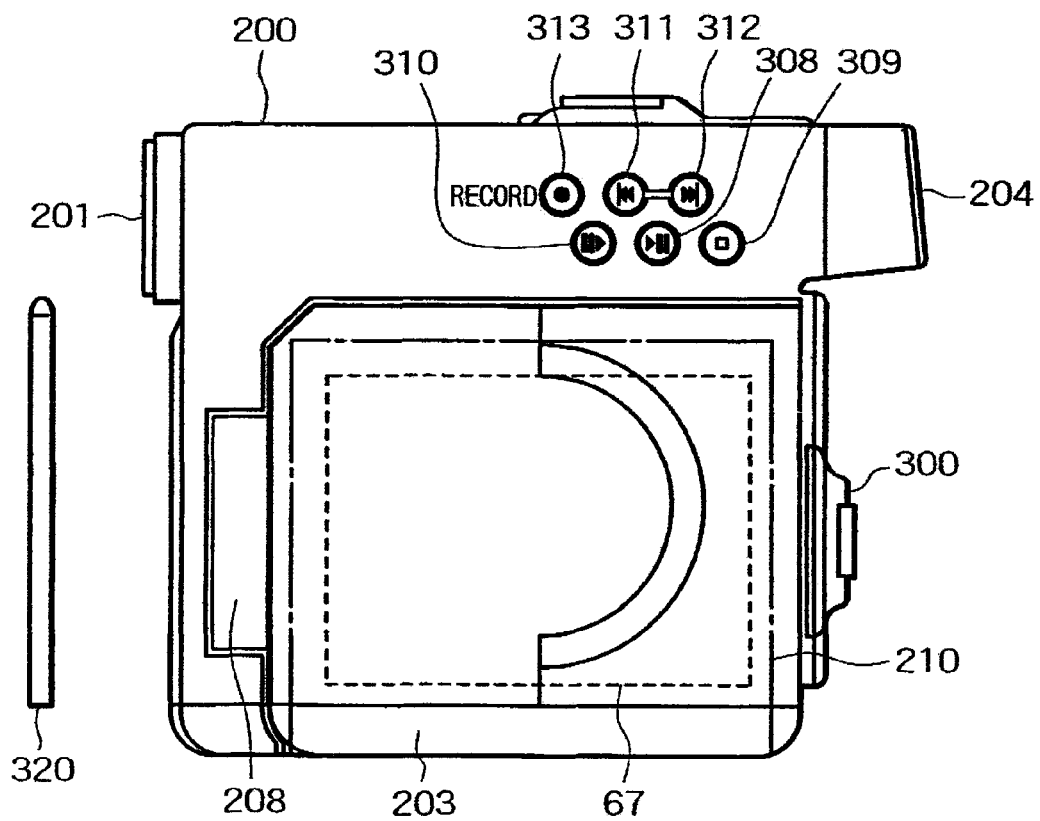

The photo key 304, a zoom key 305, a focus key 306, and an against-light compensation key 307 are furnished on the side of the body 200 in a slightly upward-facing manner as shown in FIG. 12A. The photo key 304, when pushed illustratively in the camera mode, activates a shutter to record a still picture into a file.

The zoom key 305 is used to control zoom status (from telephoto to wide angle) of a lens optical system (made of the camera lens 201). The focus key 306 serves to vary focus status (e.g., from normal to infinite) of the lens optical system. The against-light compensation key 307 is operated to turn on and off an against-light compensation function.

Attached to that side of the body 200 which accommodates the hinged display panel 203, as shown in FIG. 12B, are a replay/pause key 308, a stop key 309, a slow replay key 310, search keys 311 and 312, and a recording key 313 used mainly for recording and reproducing files (tracks). At the top of the body 200 are a screen display key 314 for activating screen display, and volume keys 315 and 316 for adjusting the volume of sound output from the speaker.

The external structure of the video camera shown in FIGS. 12A through 13B is given merely as an example and may be modified depending on the actual use conditions required of the video camera. The types of keys and controls and the manners of operating them as well as the terminals for connecting to external devices may be modified as needed in diverse ways.

How the hinged display panel 203 moves will now be described by referring to FIGS. 14A and 14B. In these figures, the external structure of the video camera is skeletonized for purpose of simplification and illustration.

Figure 14A:
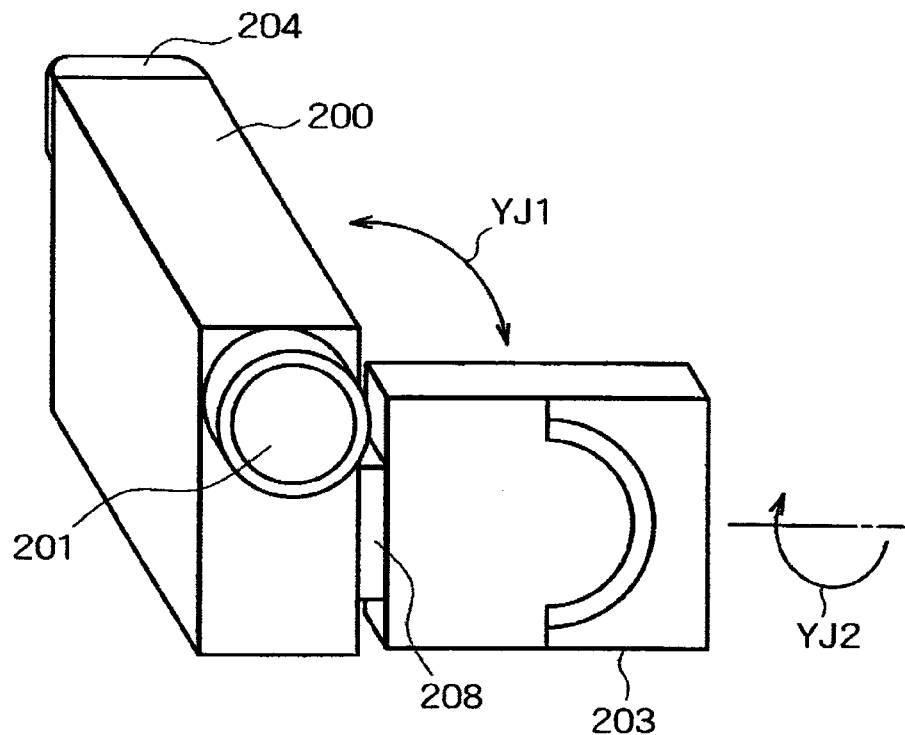
FIGS. 14A and 14B are perspective views illustrating movements of a hinged panel on the inventive video camera.

The hinged display panel 203 is first swung away from its position shown in FIG. 12B in an arrowed direction YJ1, into the position depicted in FIG. 14A. In this state, the display panel screen 67 faces a picture-taking user (toward the viewfinder 204), i.e., in approximately the opposite direction of the camera lens 201 pointing to a subject. With the display panel screen 67 swung open in this manner, the user handling the video camera may take pictures while monitoring images being displayed on the display panel screen 67.

The hinged display panel 203 (together with the display panel screen 67) may also be rotated by any angle within about 180 degrees in an arrowed direction YJ2 from the position shown in FIG. 14A. That is, the hinged display panel 203 may face the subject (i.e., in the same direction as the camera lens). In this state, the user acting as the subject is able to see what is being picked up by the video camera.

Figure 14B:
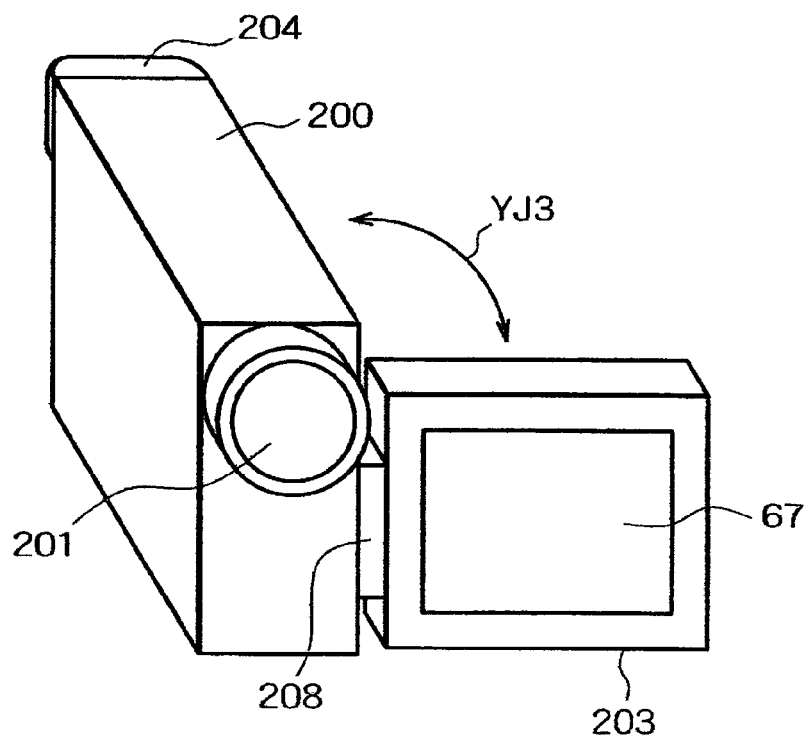

When a disk is to be loaded into or unloaded from the disk loading/unloading unit 210, the hinged display panel 203 should be held swung away from the body 200 as shown in FIG. 14A or 14B.

It is also possible to move the hinged display panel 203 from the position of FIG. 14B in an arrowed direction YJ3. When the hinged display panel 203 is accommodated into the body 200 in that manner, not shown, the display panel screen 67 remains visible from the outside.

With the hinged display panel 203 rotated in the arrowed direction YJ2 to face either the picture-taker or the subject, the orientation of images on the display panel screen 67 is supposed to be vertically reversed between the two positions. This embodiment, however, bypasses that inconvenience with a reverse display control feature that gets images displayed always upright as viewed by the user (who is taking pictures or whose picture is being taken).

6.3 Internal Structure of Video Camera

FIG. 15 is a block diagram outlining an internal structure of the inventive video camera. A lens block 1 shown in FIG. 15 includes an optical system 11 made up of image pickup lens and apertures arrangements. The camera lens 201 indicated in FIGS. 12A and 12B is part of the optical system 11. The lens block 1 also has a motor unit 12 that includes a focus motor for performing an automatic focusing operation and a zoom motor for moving a zoom lens in response to the operation of the zoom key 304.

A camera block 2 is mostly made up of circuits for converting the image light picked up by the lens block 1 into digital video signals. A CCD (charge coupled device) 21 in the camera block 2 receives optical images of the subject through the optical system 11. The CCD 21 generates an image pickup signal by subjecting the optical image to photoelectric conversion and feeds the generated signal to a sample hold/AGC (automatic gain control) circuit 22. The sample hold/AGC circuit 22 subjects the image pickup signal from the CCD 21 to both gain control and sample hold processing for waveform rectification. The output of the sample hold/AGC circuit 22 is fed to a video A/D converter 23 for conversion to digital video signal data.

The CCD 21, sample hold/AGC circuit 22, and video A/D converter 23 are controlled in signal processing timing by use of timing signals generated by a timing generator 24. The timing generator 24 admits from a data processing/system control circuit 31 (inside a video signal processing circuit 3) a clock signal for use in signal processing and, based on that clock signal, generates necessary timing signals. The timing signals synchronize the camera block 2 with the video signal processing unit 3 in terms of signal processing.

A camera controller 25 performs various operations suitably to control the above-mentioned functional circuits in the camera block 2. At the same time, the camera controller 25 effects such regulating functions as automatic focusing, automatic exposure control, aperture control, and zooming on the lens block 1.

Illustratively, automatic focusing involves the camera controller 25 controlling rotating angles of the focus motor based on focus control information acquired by a suitable automatic focus control system. Given the focus control information, the control function drives the image pickup lens automatically into focus.

Upon recording, the video signal processing unit 3 compresses digital video signals coming from the camera block 2 and digital audio signals from the microphone 202 having picked up sounds. The compressed data are supplied as user recording data to a medium drive unit 4 located downstream. Digital video signals from the camera block 2 and images formed by characters and icons are fed to a viewfinder drive unit 207. In turn, the viewfinder drive unit 207 displays the received images onto the viewfinder 204.

User-reproduced data (i.e., data retrieved from the package medium 51) coming from the medium drive unit 4 are compressed video and audio signal data. Upon reproduction, these compressed data are decompressed and output as replay video and audio signals.

For this embodiment, video signal data (image data) representing moving pictures are compressed and decompressed according to MPEG (Moving Picture Experts Group) 2 standards; the data that denote still pictures are compressed and decompressed in accordance with JPEG (Joint Photographic Coding Experts Group) standards. Audio signal data are compressed and decompressed in keeping with ATRAC (Adaptive Transform Acoustic Coding) 2.

The data processing/system control circuit 31 in the video signal processing unit 3 mainly performs two control processes: a process for regulating the compression and decompression of video and audio signal data performed by the video signal processing unit 3, and a control process for inputting and outputting data through the video signal processing unit 3.

The entire video signal processing unit 3 including the data processing/system control circuit 31 is controlled by a video controller 38. The video controller 38 is constituted illustratively by a microcomputer that communicates with the camera controller 25 in the camera block 2 as well as with a driver controller 46, to be described later, in the medium drive unit 4 illustratively through a bus line, not shown.

The view control 38 includes a program memory 39. The program memory 39 is illustratively made of a rewritable memory device such as an EEPROM or a flash memory which accommodates various programs to be performed by the video controller 38 acting as a master controller, as well as diverse setting data and other information.

Upon recording, the video signal processing unit 3 basically causes the data processing/system control circuit 31 to admit video signal data from the video A/D converter 23 in the camera block 2. The data processing/system control circuit 31 forwards the input video signal data illustratively to a notion detection circuit 35. Using illustratively a memory 36 as a work area, the motion detection circuit 35 subjects the input video signal data to image processing such as motion compensation before feeding the processed data to an MPEG2 video signal processing circuit 33.

Using illustratively a memory 34 as a work area, the MPEG2 video signal processing circuit 33 compresses the input video signal data in the MPEG2 format and outputs a bit stream of the compressed data as moving pictures (i.e., MPEG2 bit stream). The MPEG2 video signal processing circuit 33 is also used to extract video data representing still pictures illustratively from the video signal data denoting moving pictures and to compress the extracted data. In that case, the MPEG2 video signal processing circuit 33 generates compressed video data representative of still pictures in the JPEG format. It is also possible to replace the JPEG format with the MPEG2 format in which video data may be compressed. This will involve handling I-pictures (intra pictures, considered standard image data) as still picture video data.

The video signal data having undergone compression coding by the MPEG2 video signal processing circuit 33 (i.e., compressed video data) are written illustratively to a buffer memory 32 at a suitable transfer rate for temporary storage.

As is well known, the MPEG2 format supports both CBR (constant bit rate) and VBR (variable bit rate) as the coding bit rate (data rate). These two rate schemes are addressed by the video signal processing unit 3.

For video compression processing at VBR, for example, the motion detection circuit 35 detects motions in increments of macro blocks within a range of tens to hundreds of prior and subsequent frames of video data. Any detected motions are converted to motion vector information that is transferred to the MPEG2 video signal processing circuit 33. Using the motion vector information and other relevant information, the MPEG2 video signal processing circuit 33 determines a quantization coefficient per macro block in such a manner that the video data after compression coding will have a predetermined data rate.

An audio compression encoder/decoder 37 admits as digital audio signal data the sound picked up illustratively by the microphone 202. The data are input to the audio compression encoder/decoder 37 through an A/D converter 64 (in a display/image/audio input/output unit 6). The audio compression encoder/decoder 37 compresses the audio signal data input in the ATRAC2 format as described above. The compressed audio signal data are also written by the data processing/system control circuit 31 to the buffer memory 32 at a predetermined transfer rate for temporary storage.

The buffer memory 32 accommodates the compressed video data and compressed audio data in the manner described. The primary function of the buffer memory 32 is to absorb differences between two data transfer rates: one for data transfer between the camera block 2 or display/image/audio input/output unit 6 on the one hand and the buffer memory 32 on the other hand, the other for data transfer between the buffer memory 32 and the medium drive unit 4.

At the time of recording, the compressed video data and compressed audio signal data held in the buffer memory 32 are retrieved in a suitably timed manner and transferred to an MD-DATA2 encoder/decoder 41 in the medium drive unit 4. Upon reproduction, however, retrieval of data from the buffer memory 32 and recording of the retrieved data to the package medium 51 from the medium drive unit 4 through a deck unit 5 may be performed intermittently. The writing and the reading of data to and from the buffer memory 32 are controlled illustratively by the data processing/system control circuit 31.

How the video signal processing unit 3 works upon data reproduction is outlined below. Compressed video data and compressed audio signal data (i.e., user-reproduced data) are first retrieved from the package medium 51 and decoded according to the MD-DATA2 format by the MD-DATA2 encoder/decoder 41 (in the medium drive unit 4). The decoded data are sent to the data processing/system control circuit 31.

The data processing/system control circuit 31 illustratively places the input compressed video data and compressed audio signal data temporarily into the buffer memory 32. The compressed video data and compressed audio signal data are read from the buffer memory 32 in a suitably timed fashion and at an appropriate transfer rate so as to ensure time-base consistency during replay. After their retrieval, the compressed video data are fed to the MPEG2 video signal processing circuit 33 and the compressed audio signal data are sent to the audio compression encoder/decoder 37.

The MPEG2 video signal processing circuit 33 decompresses the input compressed video data and forwards the decompressed data to the data processing/system control circuit 31. In turn, the data processing/system control circuit 31 supplies the decompressed video signal data to a video D/A converter 61 (in the display/image/audio input/output unit 6). The audio compression encoder/decoder 37 decompresses the input compressed audio signal data and sends the decompressed data to the D/A converter 65 (in the display/image/audio input/output unit 6).

In the display/image/audio input/output unit 6, the video D/A converter 61 converts the input video signal data into analog video signals that are branched to two destinations: a display controller 62 and a composite signal processing circuit 63.

The display controller 62 drives a display unit 6A based on the input video signal causing the display unit 6A to display replayed images. In addition to the images reproduced from the package medium 51, the display unit 6A can display substantially in real time the pictures taken by the lens block 1 and camera block 2 making up a camera unit.

Besides the reproduced images and the pictures taken, the display unit 6A also displays messages in characters and icons for giving the user necessary information about the video camera in operation. Such messages are displayed illustratively under control of the video controller 38 suitably processing the video signal data sent from the data processing/system control circuit 31 to the video D/A converter 61. That is, the video controller 38 composes the video signal data into relevant characters and icons that are displayed in appropriate locations on the screen.

In the display unit 6A, the display panel screen 67 is combined with a touch-sensitive panel 6B. The touch-sensitive panel 6B detects pushing actions onto the display unit 6A as position information and outputs the detected position information to the video controller 38 as operation information.

The composite signal processing circuit 63 converts to a composite signal the analog video signal coming from the video D/A converter 61, and outputs the composite signal to a video output terminal T1. If an external monitor device is connected to the video output terminal T1, the images replayed by the video camera may be displayed on that monitor device.

In the display/image/audio input/output unit 6, the audio signal data sent from the audio compression encoder/decoder 37 to the D/A converter 65 are converted to an analog audio signal by the latter. The analog audio signal is forwarded to a headphone/line terminal T2. From the D/A converter 65, the analog audio signal is also branched through an amplifier 66 to the speaker 205. The speaker 205 thus outputs reproduced sounds.

Upon recording, the medium drive unit 4 primarily encodes recording data in the DM-DATA2 format and sends to the deck unit 5 the encoded data ready to be recorded onto the disk. Upon reproduction, the deck unit 6 decodes the data retrieved from the package medium 51 and transmits the decoded data to the video signal processing unit 3.

The MD-DATA2 encoder/decoder 41 in the medium drive unit 4 admits recording data (i.e., compressed video data plus compressed audio signal data) from the data processing/system control circuit 31 at the time of recording. The recording data are encoded in the MD-DATA2 format before being temporarily placed into a buffer memory 42. From the buffer memory 42, the encoded data are read in a suitably timed fashion and sent to the deck unit 5.

Upon reproduction, the digital signal retrieved from the package medium 51 is input to the MD-DATA2 encoder/decoder 41 through an RF signal processing circuit 44 and a binary circuit 43. The input signal is decoded according to the MD-DATA2 format before being forwarded as reproduced data to the data processing/system control circuit 31 in the video signal processing unit 3.

Where necessary, the reproduced data are placed temporarily in the buffer memory 42. From the buffer memory 42, the data may be retrieved in a suitably timed manner for output to the data processing/system control circuit 31. The writing and the reading of data to and from the buffer memory 42 are controlled by the driver controller 46.

Some external disturbance during replay of the package medium 51 may trigger a servo disorder leading to the failure to read signals from the disk. If that happens, the replay operation on the disk is brought back to normal while the retrieved data remaining in the buffer memory 42 are being tapped. This ensures the proper time sequence of the data being reproduced.

The RF signal processing circuit 44 suitably processes the signal retrieved from the package medium 51 so as to generate illustratively an RF signal as reproduced data, as well as servo control signals such as a focus error signal and a tracking error signal for servo control over the deck unit 5. The RF signal is put into binary format by the binary circuit 43 before being fed as digital signal data to the MD-DATA2 encoder/decoder 41. The serve control signals generated as described are sent to a servo circuit 45. Given the servo control signals, the servo circuit 45 executes servo control accordingly over the deck unit 5.

An encoder/decoder 47 compatible with the MD-DATA1 format is also provided. In operation, the encoder/decoder 47 may encode recording data from the video signal processing unit 3 in the MD-DATA1 format for recording to the package medium 51, or decode data which turn out to be in the DM-DATA1 format upon retrieval from the package medium 51 for output to the video signal processing unit 3. In other words, the inventive video camera is compatible with data in both the MD-DATA2 format and the MD-DATA1 format. The driver controller 46 serves as a functional circuit that provides overall control on the medium drive unit 4.

The deck unit 5 is a feature that drives the package medium 51. The deck unit 5 has the disk loading/unloading unit 210 (see FIG. 12B) to and from which the user may load and unload the package medium 51. The package medium 51 is assumed to be a magneto-optical disk compatible with the MD-DATA2 format or MD-DATA1 format.

In the deck unit 5, the loaded package medium 51 is driven by a spindle motor 52 rotating at CLV. Upon recording or replay, an optical head 53 emits a laser beam at the package medium 51.

For recording, the optical head 53 executes high-level laser output to heat recording tracks up to the Curie temperature; for reproducing data, the optical head 53 provides laser output at a relatively low level to detect the data from the reflected light based on the magnetic Kerr effect. These functions are implemented by a laser diode arrangement as laser outputting means, by an optical system made up of a polarization beam splitter and an objective lens, and by detectors detecting reflected light, not shown. The objective lens mounted on the optical head 53 is retained illustratively by a dual-axis mechanism in radially and perpendicularly movable relation to the disk surface.

Opposite to the optical head 53 across the package medium 51 is a magnetic head 54. The magnetic head 54 applies to the package medium a magnetic field modulated in terms of recording data.

Although not shown, the deck unit 5 also includes a sled mechanism driven by a sled motor 55. The sled mechanism causes the whole optical head 53 and magnetic head 54 to move in radial relation to the disk.

An operation unit 7 comprises the various keys and controls shown in FIGS. 12A and 12B. Operation information derived from the user operating these keys and controls is output illustratively to the video controller 38. The video controller 38 supplies the camera controller 25 and driver controller 46 with control information for regulating relevant parts of the video camera in response to the operation information coming from the touch-sensitive panel 6B and operation unit 7.

An external interface 8 is provided to interface the video camera to an external device for bidirectional data transfer therebetween. Illustratively, the external interface 8 is located between an interface terminal T3 and the video signal processing unit 3 as shown in FIG. 15. The external interface 8 may comply with, but is not limited to, IEEE 1394 standards.

If an external digital video device is connected to the inventive video camera through the interface terminal T3, images (sounds) picked up by the video camera may be recorded to the connected external device. Images (sounds) replayed by the external digital video device may be fed into the video camera through the external interface 8 for recording onto the package medium 51 in the MD-DATA2 (or MD-DATA1) format. It is also possible to admit and record files of character information for inserting captions into images.

A power supply block 9 supplies the functional circuits with voltages at suitable levels using a DC power supply provided by an internal battery or derived from a commercial AC power source. The supply of power by the power supply block 9 is turned on and off by the video controller 38 in accordance with the operation of the main dial 300 mentioned above. While recording is in progress, the video controller 38 permits indicator illumination.

6.4 Structure of Medium Drive

Figure 16:
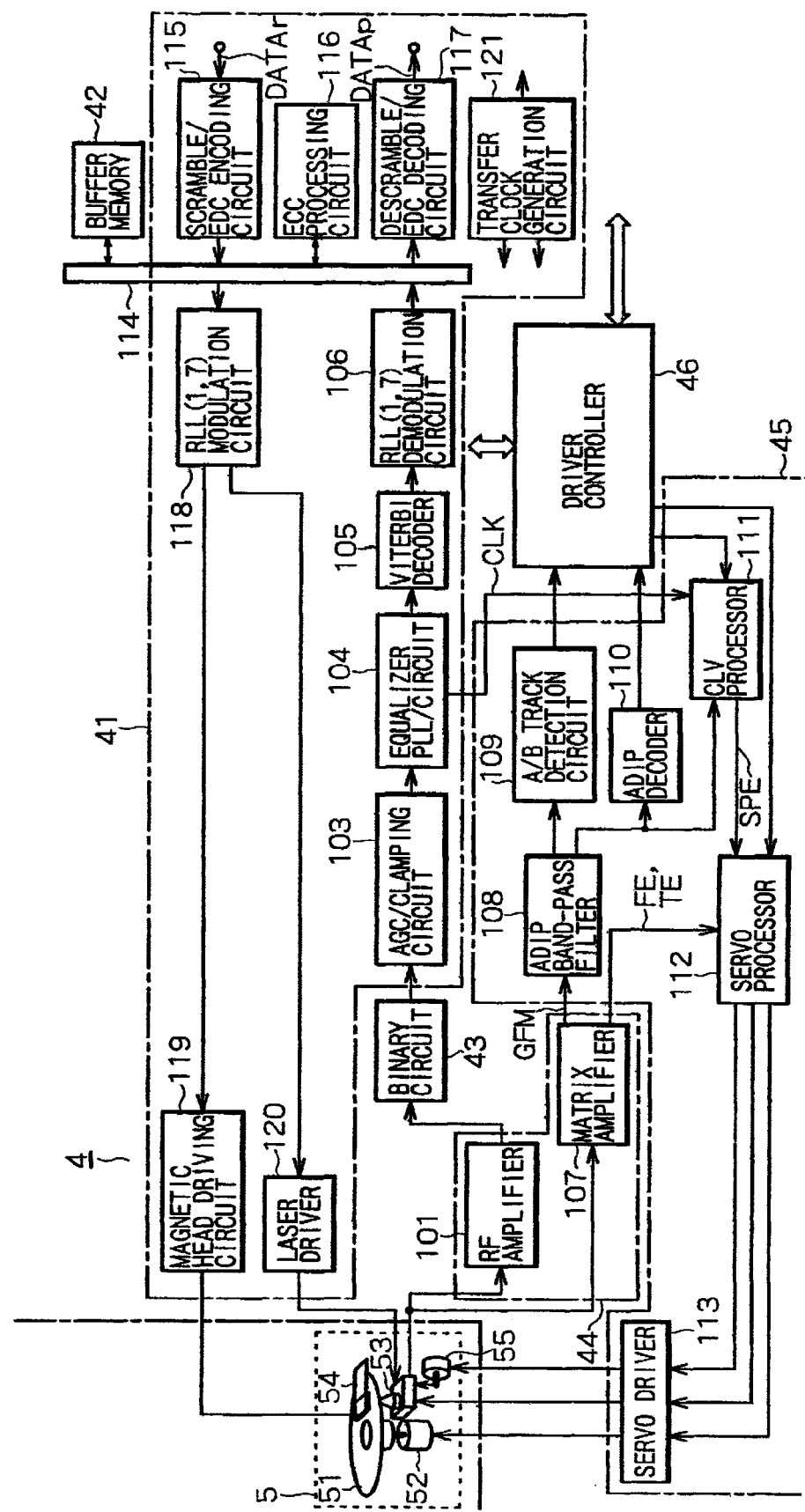
FIG. 16 is a block diagram depicting an internal structure of a medium drive in the inventive video camera.

A more detailed structure of the medium drive unit 4 included in FIG. 15 will now be described by referring to FIG. 15. The structure corresponds to the functional circuits that are compatible with the MD-DATA2 format and shown extracted in FIG. 16. While FIG. 16 indicates the deck unit 5 in addition to the medium drive unit 4, those internal parts of the deck unit 5 which were described with reference to FIG. 15 are given the same reference numerals and their descriptions are omitted to avoid repetition. Those parts of the medium drive unit 4 in FIG. 16 which also appeared in FIG. 15 are designated by the same reference numerals.

Information detected by the optical head 53 during a data read operation from the package medium 51 (i.e., an optical current obtained upon detection of a reflected laser beam by the photo detector) is supplied to an RF amplifier 101 in the RF signal processing circuit 44. Given the input detection information, the RF amplifier 101 generates a reproduced RF signal and sends the reproduced signal to the binary circuit 43. In turn, the binary circuit 43 puts the input reproduced RF signal into binary format to generate a digitized reproduced RF signal (binary RF signal).

The binary RF signal is fed to the MD-DATA2 encoder/decoder 41. In the encoder/decoder 41, the signal is first input to an AGC/clamping circuit 103 for gain adjustment and clamping. The binary RF signal is then forwarded to an equalizer/PLL circuit 104.

The equalizer/PLL circuit 104 equalizes the input binary RF signal before sending the equalized signal to a Viterbi decoder 105. The equalized binary RF signal is further input to a PLL circuit whereby a clock signal CLK synchronized with the binary RF signal (RLL (1, 7) code sequence) is extracted.

The frequency of the clock signal CLK corresponds with the current disk revolutions. That being the case, a CLV processor 111 obtains error information by admitting the clock signal CLK from the equalizer/PLL circuit 104 and comparing the clock signal with a reference value reflecting the CLV in effect (see FIG. 11). The error information thus acquired is used as a signal component for generating a spindle error signal SPE. The clock signal CLK is also used as a clock for processes performed by such signal processing circuits as an RLL (1, 7) demodulation circuit 106.

The Viterbi decoder 105 subjects to so-called Viterbi decoding the binary RF signal input from the equalizer/PLL circuit 104. This provides reproduced data in the form of an RLL (1, 7) code sequence. The reproduced data are fed to the RLL (1, 7) demodulation circuit 106 which in turn produces a data stream having undergone RLL (1, 7) demodulation.

The data stream obtained by the RLL (1, 7) demodulation circuit 106 through demodulation processing is written to and developed in the buffer memory 42 via a data bus 114. The data stream thus developed in the buffer memory 42 is first subjected to an error correcting process by an ECC processing circuit 116 in increments of error correcting blocks according to the RS-PC method. After the error correction, the data are subjected to descrambling and EDC decoding processes (i.e., error detection) by a descramble/EDC decoding circuit 117.

The data thus processed constitute reproduced data DATAP. From the descramble/EDC decoding circuit 117, the reproduced data DATAP are transferred at a rate compatible with a transfer clock signal generated by a transfer clock generation circuit 121. Illustratively the transferred data are destined for the data processing/system control circuit 31 in the video signal processing unit 3.

The transfer clock generation circuit 121 illustratively uses a crystal oscillator arrangement to generate as needed a transfer clock signal (denoting a data transfer rate) of a frequency suitable for data transfer between the medium drive unit 4 and the video signal processing unit 3, as well as between the functional circuits inside the medium drive unit 4. Depending on the operating status of the video camera, the transfer clock generation circuit 121 also generates a clock signal of a suitable frequency to be fed to the functional circuits in the medium drive unit 4 and video signal processing units 3.

The information detected by the optical head 53 (as an optical current) through a data read operation from the package medium 51 is also supplied to a matrix amplifier 107. The matrix amplifier 107 subjects the input detection information to suitable arithmetic processes, thereby extracting from the information including a tracking error signal TE, a focus error signal FE, and groove information GFM (i.e., absolute address information recorded in wobbled grooves WG on the package medium 51). The extracted signals are supplied to the servo circuit 45. More specifically, the tracking error signal TE and focus error signal FE are fed to a servo processor 112 while the groove information GFM is sent to an ADIP band-pass filter 108.

After undergoing band-pass filtering by the ADIP band-pass filter 108, the groove information GFM is forwarded to an A/B track detection circuit 109, to an ADIP decoder 110, and to the CLV processor 111. The A/B track detection circuit 109 determines whether the currently traced track is track Tr-A or track Tr-B based on the input groove information GFM and illustratively in keeping with the scheme discussed above with reference to FIG. 10B. The resulting track determination information is output to the driver controller 46. The ADIP decoder 110 decodes the input groove information GFM in order to extract an ADIP signal representative of absolute address information on the disk. The ADIP signal thus extracted is also output to the driver controller 46. In turn, the driver controller 46 executes relevant control processes based on the track determination information and ADIP signal.

The CLV processor 111 receives the clock signal CLK from the equalizer/PLL circuit 104 and the groove information GFM past the ADIP band-pass filter 108. In turn, the CLV processor 111 generates a spindle error signal SPE for CLV serve control based illustratively on an error signal obtained by integrating phase errors of the groove information GFM with respect to the clock signal CLK. The spindle error signal SPE thus generated is output to the servo processor 112. The operation to be performed by the CLV processor 111 is controlled by the driver controller 46.

The servo processor 112 generates various servo control signals (tracking control signal, focus control signal, sled control signal, spindle control signal, etc.) based on the input tracking error signal TE, focus error signal FE and spindle error signal SPE, as well as on track jump commands and access commands coming from the driver controller 46. The generated servo control signals are output to a servo driver 113.

Given the servo control signals from the servo processor 112, the servo driver 113 generates necessary servo drive signals accordingly. The servo drive signals may include dual-axis drive signals for driving the dual-axis mechanism (one signal dealing with the focus direction and the other addressing the tracking direction), a sled motor drive signal for driving the sled mechanism, and a spindle motor drive signal for driving the spindle motor 52. When supplied with these servo drive signals, the deck unit 5 provides focusing and tracking control on the package medium 51 as well as CLV control over the spindle motor 52.

Upon write operation to the package medium 51, illustratively the data processing/system control circuit 31 in the video signal processing unit 3 feeds recording data DATAr to a scramble/EDC encoding circuit 115. The user recording data DATAr are input illustratively in synchronism with a transfer clock signal (denoting a data transfer rate) generated typically by the transfer clock generation circuit 121.

The scramble/EDC encoding circuit 115 may write the recording data DATAr to the buffer memory 42 and develop the data therein for data scrambling and EDC encoding (i.e., the process of adding an error detection code of a predetermined system). After the processing, illustratively the ECC processing circuit 116 adds an error correcting code of the RS-PC method to the recording data DATAr currently developed in the buffer memory 42. The recording data DATAr thus processed are read from the buffer memory 42 and fed to an RLL (1, 7) modulation circuit 118 via the data bus 114.

The RLL (1, 7) modulation circuit 118 subjects the input recording data DATAr to RLL (1, 7) modulation. The process turns the recording data into an RLL (1, 7) code sequence that is output to a magnetic head driving circuit 119.

The MD-DATA2 format adopts so-called laser strobe magnetic field modulation as a method for writing data to the disk. The laser strobe magnetic field modulation method involves applying a magnetic field modulated by recording data to the disk recording surface while emitting a laser beam in pulse fashion at the disk in synchronism with the recording data.

According to this modulation method, the process of pit edge formation in recording the data onto the disk is determined not by transient characteristics such as a flux reversal speed but by the timing of laser pulse emission. That means the method minimizes jitters of recording pits in a far easier manner than, say, the simple magnetic field modulation method (i.e., the system of emitting a laser beam continuously at the disk while applying a magnetic field modulated by recording data to the disk recording surface). In other words, the laser strobe magnetic field modulation method can be used in a particularly advantageous manner for high-density data recording.

The magnetic head driving circuit 119 in the medium drive unit 4 causes the magnetic head 54 to apply a magnetic field modulated by the input recording data to the package medium 51. The RLL (1, 7) modulation circuit 118 outputs a clock signal to a laser driver 120 in synchronism with the recording data. On the basis of the input clock signal, the laser driver 120 drives the laser diode of the optical head 53 to emit laser pulses to the disk in synchronism with the recording data that are output as the magnetic field from the magnetic head 54. At this point, the laser pulses emitted by the laser diode are given a power level consistent with the ongoing recording. The medium drive unit 4 of this embodiment thus permits recording of data onto the disk according to the laser strobe magnetic field modulation method.

6.5 Typical Structure of Disk Compatible with Video Camera

A typical data structure of the package medium 51 compatible with this embodiment will now be described. Data are handled in units called sectors and clusters. These units are discussed first as part of the MD-DATA2 format.

A sector is the smallest physical increment in which to read data from the disk. Each sector is assigned a PSA (physical sector address). A cluster is the smallest physical increment in which to write data to the disk. One cluster is made up of 16 consecutive sectors numbered 0h through Fh. Each cluster is assigned a PCA (physical cluster address). A sector in a lead-in area (pre-mastered area) of the disk, to be described later, is uniquely identified by a PCA. In a recordable area of the disk, one PCA is given to two clusters corresponding to the track Tr-A and track Tr-B.

Figure 17:
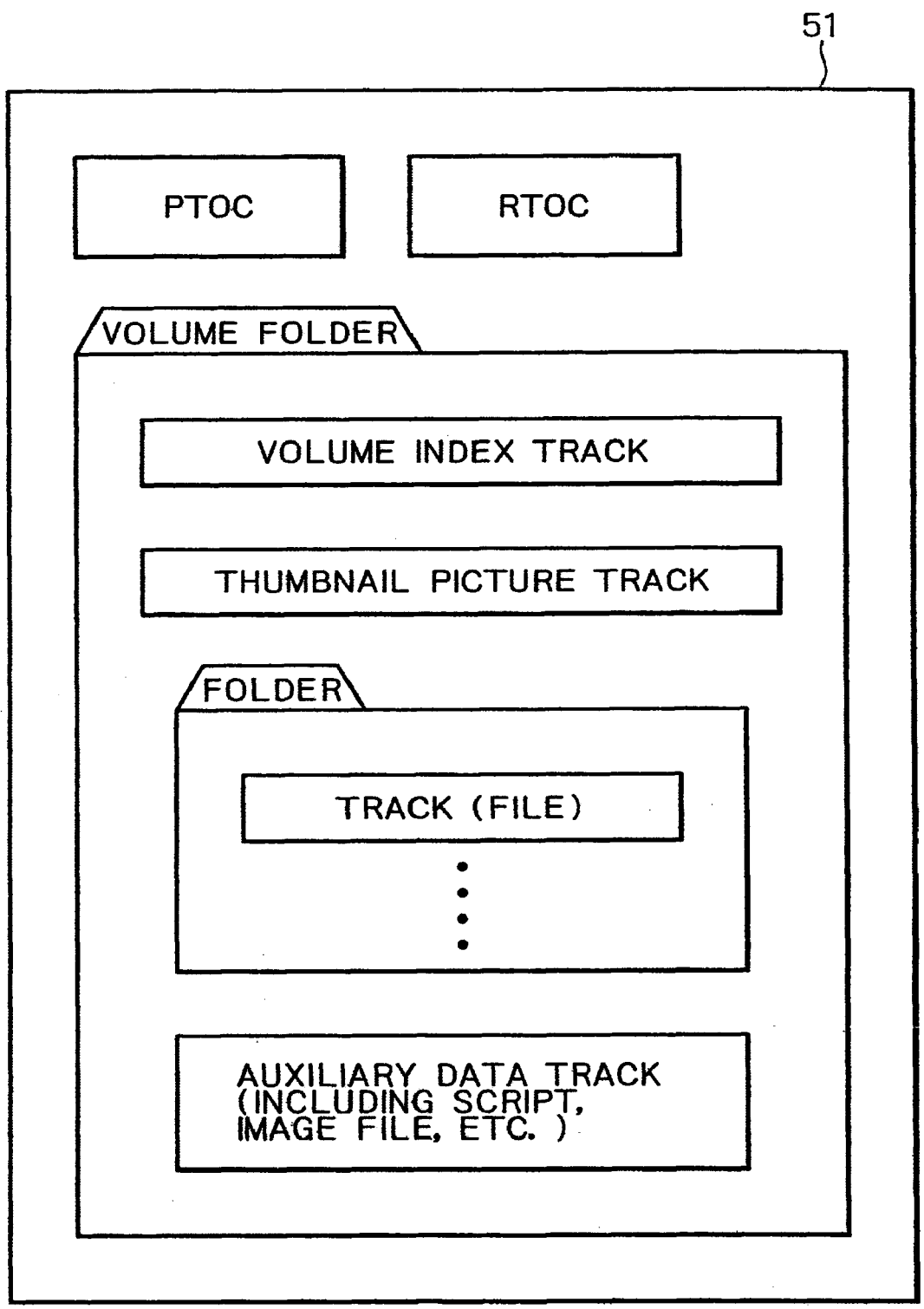
FIG. 17 is an explanatory view showing how files and folders are typically managed on the disk.

FIG. 17 shows conceptually how data are typically managed on the package medium 51 according to the invention. The physical format of the package medium 51 was discussed earlier with reference to FIGS. 9 and 10.

Illustratively the package medium 51 has PTOC and RTOC written thereon as management information. The PTOC is constituted by specific management information written in pits and cannot be updated. The RTOC is made of basic information necessary for managing, say, data recorded on the disk. With this embodiment, the RTOC may contain information for managing tracks (sometimes equivalent to files) and folders (a structure for grouping tracks for management purposes) when data are written to and read from the disk. The RTOC may be updated as needed whenever tracks (files) and folders accommodating data on the disk are erased or otherwise edited.

User data are managed by use of a volume folder placed in a single root folder. For this embodiment, a volume is defined as a complete set of user data. Only one volume exists on each disk. The data contained in the volume except for those managed by the PTOC and RTOC are accommodated by folders and tracks that come under the volume folder.

The volume folder includes a volume index track (VIT) of a predetermined size (e.g., amounting to 12 clusters). The volume index track is defined as an area that contains auxiliary management information as opposed to the PTOC and RTOC which accommodate main management information. As such, the volume index track has a table that records information for managing tracks (files), folders, properties regarding auxiliary data, titles, and packet data with which to form the tracks.

A thumbnail picture track is provided as an optional track that may be managed in the volume folder. This embodiment allows one still picture of a predetermined resolution to be attached as a thumbnail picture to each of the files recorded on the disk. The thumbnail picture is used as a representative image facilitating visual recognition of the file in question.

The thumbnail picture track is recorded together with index information designating correspondence between the files (tracks) recorded on the disk on the one hand, and the storage locations of the thumbnail pictures on the other hand. The data length of the thumbnail picture track may be extended as needed depending on the number of thumbnail pictures to be stored.

The video/audio data recorded by the user operating the video camera are managed in units of files. These files are managed as tracks in the volume folder or are placed in folders that come under the volume folder.

In FIG. 17, a file is shown as a track that is housed in a single folder. Each folder, as mentioned above, is used to manage tracks or folders in a single group. It follows that the structure coming under the volume folder can accommodate the largest possible number of tracks or folders subject to constraints defined by a maximum number of tracks or folders that may be contained in the volume folder and by a maximum number of layers if the folder structure is layered.

The volume folder includes an auxiliary data track that accommodates auxiliary data. The data to be stored in the auxiliary data track vary illustratively depending on the application program actually in use.

The PTOC and RTOC constituting the above-mentioned management information, as well as the information held in the volume index track (such information is generically called the management information with this embodiment), are retrieved typically upon loading of the disk. The retrieved information is written to and stored in, say, a suitable area in the buffer memory 42 (or buffer memory 32) of the medium drive unit 4. The management information in the buffer memory is updated as needed to reflect the data having been recorded or edited. Later in a suitably timed manner, the management information about the package medium 51 (not the PTOC) is updated in accordance with the management information retained in the buffer memory.

Figure 18:
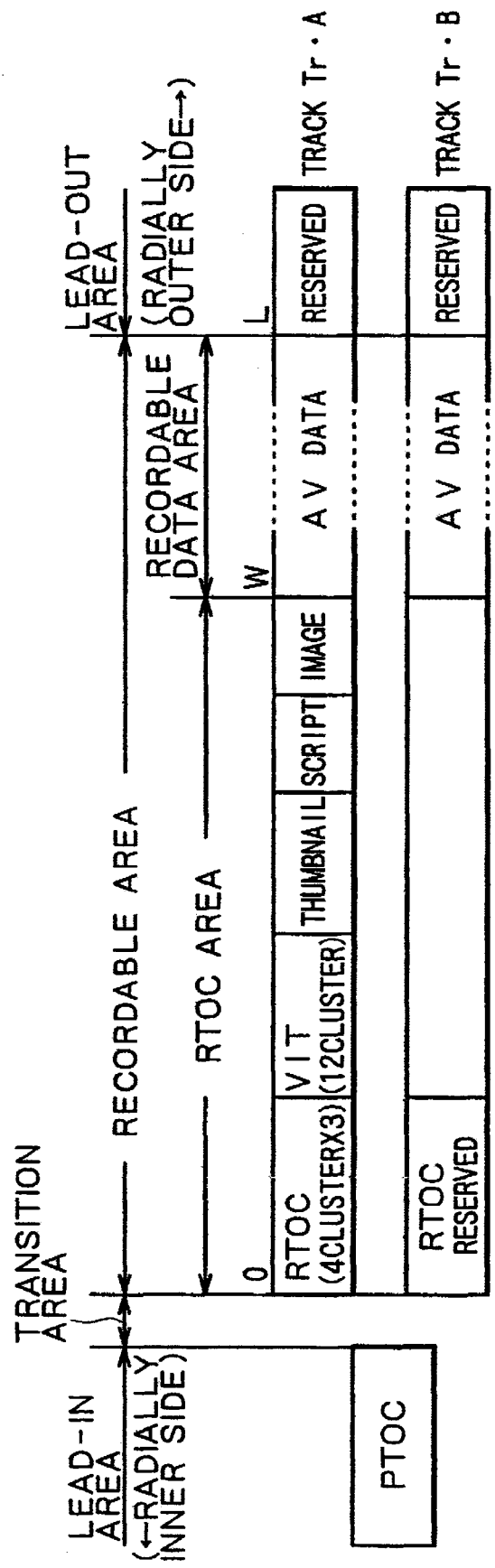
FIG. 18 is a conceptual view picturing a data structure on the disk compatible with the inventive video camera.

FIG. 18 depicts how the data management arrangement indicated in FIG. 17 corresponds to the physical structure of the package medium 51. A lead-in area shown in FIG. 18 represents a pit area in the radially innermost zone of the disk. This is the area that retains PTOC information.

On the radially outer side of the lead-in area is a recordable area with a transition area interposed therebetween. The recordable area is capable of having data recorded thereto and reproduced therefrom on a magneto-optical basis. As discussed earlier with reference to FIGS. 9 and 10, the recordable area has two tracks Tr-A and Tr-B formed therein in a double-spiral fashion.

On the radially innermost side of the recordable area is an RTOC area for each of the tracks Tr-A and Tr-B. In the RTOC area for the track Tr-A, four-cluster-size RTOC information is recorded three times. Next to the RTOC area is a 12-cluster-size volume index track.

The volume index track is followed by an optional thumbnail picture track. It is stipulated that at least a first cluster of the RTOC area be set aside as a thumbnail picture track. A growing number of files may result in thumbnail picture data so large as to exceed a thumbnail picture track capacity of the RTOC area. If that happens, the spill-over portion of the thumbnail picture data may be added to a recordable data area, to be described later. In such a case, the thumbnail picture track in the recordable data area is managed by the volume index track (or RTOC).

The thumbnail picture track in the RTOC area is followed by an optional area for recording script and image data as auxiliary data. If the script and image data exceed a recordable capacity of the RTOC area, the spill-over data portion may also be added to the recordable data area under management of the volume index track (or RTOC).

The recordable data area starts at an address location designated by a recordable data area start address W. The recordable data area accommodates AV data, i.e., track (file) data. The excess thumbnail picture data and auxiliary data mentioned above may also be written to this area.

At the end of the recordable data area, a lead-out area starts at an address location designated by a lead-out area start address L and extends towards the radially outermost zone.

Although the description above dealt with the track Tr-A alone, the same can also be said of the track Tr-B in terms of area assignments as shown in FIG. 18. It should be noted that the RTOC area is yet to be defined for the track Tr-B at present. That is, the RTOC area is presently usable only for the track Tr-A.

The disk structure sketched in FIGS. 17 and 18 is only an example. The relations between physical area locations on the disk may be modified as needed to reflect the actual use conditions. It is also possible to change as desired the structure in which to accommodate data.

Shown below is a typical directory structure that may be used when a medium ID and access right information are recorded as a file system to the above-described medium ID information recording area DA1 on the package medium 51 compatible with the inventive video camera. The directory structure is as follows:

```
¥ROOT
    ¥SECURE
        ¥SYSTEM
            ¥ID_PATH
            ¥SCRIPT
            ¥JAVA_CLASS_PATH
            ¥NETWORK_PATH
            ¥CONTENTS_PATH
            ¥APPLICATION_PATH
            ¥ACCESS_PATH
```

In the structure above, "ID_PATH" defines the location where the ID and authentication information about the package medium are stored. As mentioned earlier, this embodiment uses the authentication information on "ID_PATH" as its password. Alternatively, the embodiment may retain public encryption key information if necessary. "JAVA_CLASS_PATH" points to the location where a JAVA program library is stored. "CONTENTS_PATH" designates the location where contents are stored. "SCRIPT" specifies the location where a script, to be described later, is used to describe and store ways to start application programs from a package medium, detailed information about contents, and manners of reproducing such contents. "NETWORK_PATH" designates the location that accommodates information about the service provider 504 to be connected and about the name server to be referenced, as well as URLs of websites from which services are made available. "APPLICATION_PATH" indicates the location where an application program is stored. "ACCESS_PATH" specifies the location that retains access right information giving access rights to contents over the network.

6.6 Process for Creating Thumbnail Images

Thumbnail images (pictures) stored in the thumbnail picture track shown in FIGS. 17 and 18 may be created by the video camera according to the invention. How such thumbnail pictures are created will now be described. What follows is a description of how to create thumbnail pictures of image files already recorded on a disk.

As described above, the management information (PTOC, RTOC, volume index track) recorded on the package medium 51 is read in a suitably timed manner (e.g., upon loading of the disk) and written to the buffer memory 42 (or buffer memory 32).

The driver controller 46 typically references management information in the buffer memory 42 to obtain that address on the disk which retains image data designated as a thumbnail picture of a target file. The address on the disk is then accessed and the image data are read from that address. The retrieved data serve as a source for creating the thumbnail picture. The image data are sent successively from the medium drive unit 4 to the video signal processing unit 3 and supplied to the data processing/system control circuit 31. Unless otherwise specified, the image data in the first frame (or field) of a given file are designated by the management information as a source from which to create a thumbnail picture.

When supplied with the image data, the data processing/system control circuit 31 causes the MPEG2 video signal processing circuit 33 to decompress the data according to the MPEG2 format. This provides data that have been decoded down to an image data level of field-by-field image units.

The image data decoded down to the field-by-field image unit level typically have a sufficient image size (i.e., pixel count) for a more or less full-size display on the display screen. After the full-size image data have been obtained at the field-by-field image unit level, appropriate signal processing is carried out to reduce the full-size image to a thumbnail picture size actually needed. The processing may involve sampling the original full-size image data in a suitably timed manner and reconstituting the image data from the sampled image data.

Illustratively the video controller 38 generates index information (discussed above with reference to FIG. 17) about the thumbnail picture data thus acquired. Under suitable control, the thumbnail picture data along with the index information are written to the thumbnail picture track on the disk. In this manner, each file is provided with the corresponding thumbnail picture data recorded on the disk.

As described above, this embodiment of the invention is capable of recording not only video data (along with audio data) but also audio data alone or character information/data in the form of files. Sometimes the file may have no image data usable as a source from which to create a thumbnail picture, particularly with respect to audio data or character information/data. In such cases, it is possible to prepare beforehand suitable icon data visually representative of the audio data or character information/data in question. The icon data thus prepared may be stored illustratively in a ROM of the video controller 38 or in an appropriate area on the disk for eventual use as thumbnail image data.

6.7 Script

This embodiment allows files recorded by the inventive video camera (mainly as recorded picture files) to be edited for a desired replay sequence or for special effects upon reproduction. Such editing is accomplished by the embodiment using a script as reproduction control information causing the recorded picture file to be output or reproduced in designated ways and manners. In the video camera, the video controller 38 illustratively interprets the script so as to obtain the specifics of output or reproduction (e.g., replay sequence) in keeping with the result of editing. At the editing stage, the contents of the script are updated. The script in this context refers to any procedural structure described in suitable programming language in such a manner as to output or reproduce moving picture data, still picture data, audio data, and text data in synchronized fashion.

The script for use as reproduction control information by this embodiment is outlined below.

This embodiment of the invention adopts SMIL (Synchronized Multimedia Integration Language) as its script. SMIL is a language currently undergoing a standardization process pursued by W3C (an Internet standardization organization) in an effort to implement TV broadcasts, presentations, etc., over the Internet. This is a language based on the syntax of XML (super-set of HTML) designed to bring about time-series presentations in particular.

First, scheduling is expressed using two types of tags <seq> and <par>. <seq> stands for "sequential," signifying that the information enclosed tags of this type is reproduced sequentially. <par> stands for "parallel," indicating that the information enclosed by tags of this type is reproduced synchronously.

Suppose that files named "video1," "video2" and "video3" are recorded on the disk as image data files and that it is desired to reproduce the file "video1" first, followed by the files "video2" and "video3" in that order. In such a case, the description is made either as:

```
<seq>
    <video src = "video1">
    <video src = "video2">
    <video src = "video3">
</seq>
``` or as:

```
<seq>
    <play video1>
    <play video2>
    <play video3>
</seq>
```

If it is desired to reproduce the files "video1," "video2" and "video3" in that order, with an audio data file "audio1" replayed in synchronism with the file "video1" as a dubbing track, then the description is made as follows:

```
<seq>
    <par>
        <video src = "video1">
        <audio src = "audio1">
    </par>
    <video src = "video2">
    <video src = "video3">
</seq>
```

There is also a description specifying that a given file being replayed is to be followed by a second file a designated number of seconds later. For example, if the image file "video1" is to be first displayed (replayed), followed by display of a caption (i.e., character information image) five seconds later, the description is made as follows:

```
<par>
    <video src = "video1">
    <image src = "scratch1" begin = "5s">
</par>
```

If a still picture file "picture1" is to be displayed for five seconds, the description is made as:

<image src="picture1" dur="5 s">

Where a so-called frame mute is to be made, i.e., part of a moving picture file is to be extracted and replayed, the description includes "range" and a time code in SMPTE (Society of Motion Picture and Television) format, such as this:

<video src="video1"range="smpte:10:07:00-10:07:33">

If a specified file is to be repeated a number of times, the description includes "repeat." Repeating the file "video1" 10 times is accomplished with the following description:

<video src="video1"repeat="10">

Using SMIL as its script, this embodiment of the invention is designed to provide suitable control over thumbnail picture displays. Typically the inventive video camera includes subsets of XML for interpreting and describing (i.e., creating) the script in SMIL. These subsets may be stored beforehand in the program memory 39 or recorded in an application layer of the disk as programs to be retrieved and executed by the video controller 38.

With this embodiment, the script is typically generated or updated by the video controller 38 at the editing stage (or while recording operation is being performed). The script thus created or updated is stored in a predetermined area of the buffer memory 32.

From the buffer memory 32, the script is recorded to the disk at an appropriate moment or in a suitably timed manner. The data constituting the script are stored as a script file in the auxiliary data track discussed above with reference to FIGS. 17 and 18. The script written on the disk is retrieved therefrom next time the disk is loaded into the video camera. The retrieved script is typically placed into the buffer memory 32 and referenced therefrom. This makes it possible to conduct editing or replay operations illustratively in keeping with the previously designated replay sequence or with other previously edited details.

6.8 Operation Screen Displays

In searching for a file recorded on the disk, in editing data or in making diverse settings, the inventive video camera causes an operation screen to appear on the display panel screen 67. The operation screen shows various kinds of information about the currently loaded disk and about any files that may be recorded on the disk. The video camera, with its operation screen pushed where needed (called pointing operations hereunder), has the keys and controls operated in parallel to accomplish various operating objectives.

The operation screen of this embodiment includes a display of thumbnail pictures representative of the files recorded on the presently loaded disk. By viewing the thumbnail pictures on the operation screen, the user is able to verify visually the contents of the files (i.e., tracks) on the disk. The thumbnail pictures are also operated on to make a search for or to play back a desired file.

Figure 19:
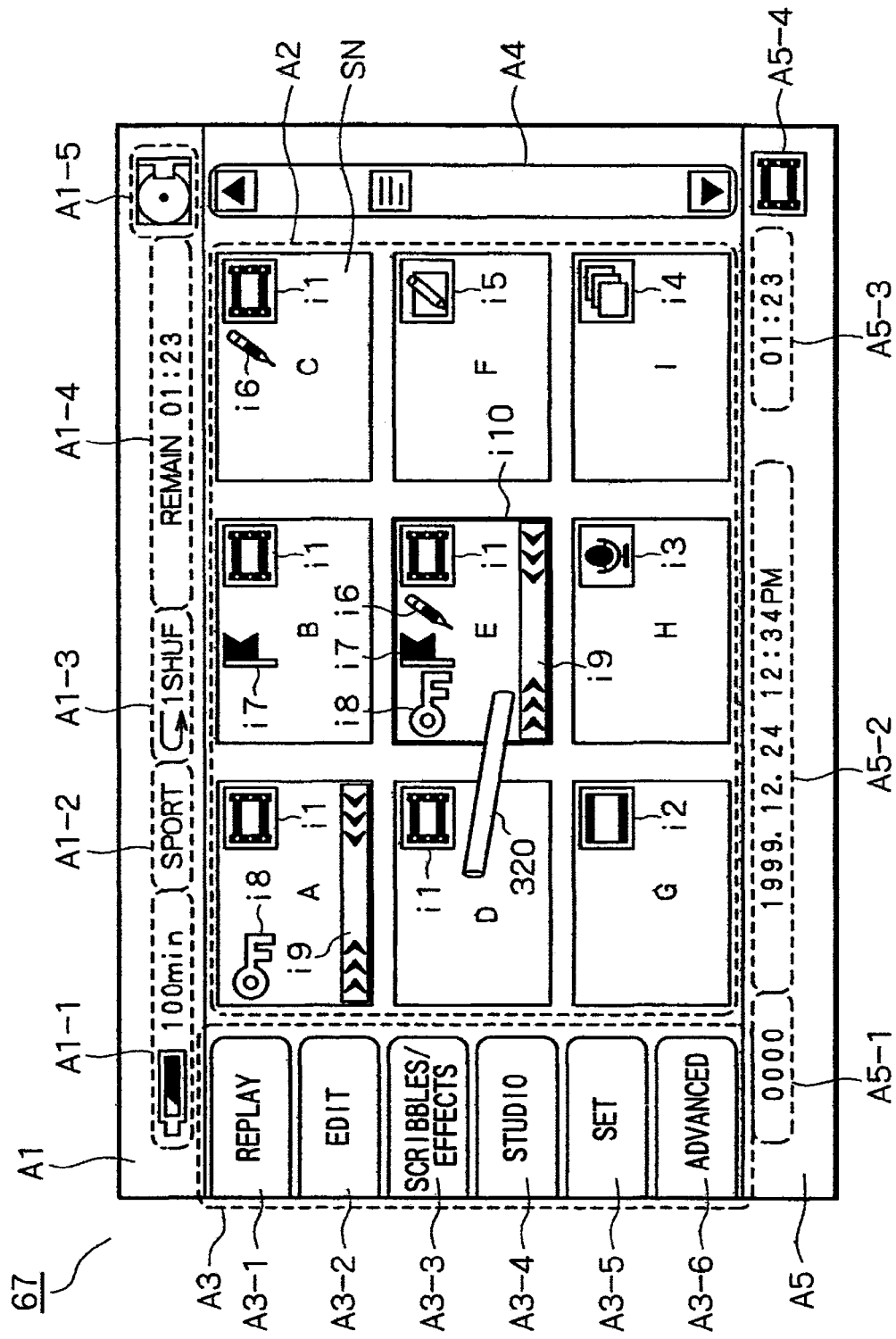
FIG. 19 is an explanatory view of an operation screen (with thumbnail images displayed) on the inventive video camera.

FIG. 19 shows a typical operation screen displayed on the display panel screen 67 of the video camera. This screen appears as a default screen illustratively when, with the disk loaded, replay/editing mode is selected.

In the top region of the screen in FIG. 19 is an information display area A1. The area A1 presents various items of information that are needed by the user. In this example, the information display area A1 includes a battery level display area A1-1, a sport mode display area A1-2, a replay mode display area A1-3, a remaining recordable time display area A1-4, and a disk icon A1-5.

The battery level display area A1-1 indicates the remaining level of the battery using a battery symbol and a numeral showing the time. Although not discussed in detail here, what is called a sport mode is provided for the inventive video camera. This is a mode in which the subject's motions photographed by the user may illustratively be replayed frame by frame for verification. When the sport mode is selected, the sport mode display area A1-2 typically gives an indication "SPORT" signifying that the sport mode is currently established. The replay mode display area A1-3 indicates in characters or symbols any one of various special replay modes such as shuffle, repeat, and A-to-B replay. The remaining recordable time display area A1-4, as its name implies, indicates the remaining recordable disk capacity in terms of a remaining recordable time. The disk icon A1-5 typically indicates a disk symbol signifying that a disk is currently loaded. Pointing to this disk icon brings about a switch from this operation screen to a display information screen that displays various kinds of information about the disk in question.

Below the information display area A1 is a thumbnail picture display area A2 capable of displaying up to nine thumbnail pictures (of nine files). FIG. 19 shows nine thumbnail pictures (SN) A through I on display. Although not shown in this example, the thumbnail pictures SN are still pictures extracted typically from the files if the files contain picture data.

The thumbnail pictures A through I (in alphabetical order) are arranged basically in the order in which the corresponding full-size pictures are to be replayed. That is, this embodiment allows thumbnail pictures to be displayed in the sequence of file reproduction designated by the script. If the sequence is modified illustratively by a sort operation, then the thumbnail pictures are displayed in the newly sorted order.

Whereas up to nine thumbnail pictures are displayed at a time, there may be cases where there are more than nine tracks (files) recorded on the disk entailing more than nine thumbnail pictures. In such cases, ten or more thumbnail pictures can be scrolled through the thumbnail picture display area A2 by pointing to and dragging a scroll bar A4 located on the right-hand side of the display area A2.

In the thumbnail picture display area A2, some of the thumbnail pictures may be shown overlaid with an icon or icons each. A moving picture icon i1 indicates that the file whose thumbnail picture is overlaid therewith is a moving picture file. In FIG. 19, the thumbnail pictures A, B, C, D and E are recognized as representative of moving picture files thanks to the moving picture icon i1 superposed on each of them.

A still picture icon i2 is shown superposed on the thumbnail picture G, indicating that the file identified by the thumbnail picture in question is a still picture file. An interview file icon i3 is shown superposed on the thumbnail picture H. This icon signifies that the file identified by the thumbnail picture H is an interview file recorded in the interview mode described earlier.

A group icon i4 is shown superposed on the thumbnail picture I. With the inventive video camera, a plurality of files for consecutive replay may be put into a single group that is represented by one thumbnail picture. That thumbnail picture may be overlaid with the group icon i4 signifying that the file in question is constituted by a plurality of files being grouped.

A memo file icon i5 is shown superposed on the thumbnail picture F. The video camera of this invention allows a memo written by the user to be created as an independent file. Where such a memo file is inserted and reproduced before a desired file, the content of the file of interest can be outlined in subtitles on display by the memo file. The memo file icon i5 identifies such a file containing a memo preceding a given file.

A pencil-shaped icon shown superposed on the thumbnail pictures C and E is a scribble icon i6. The inventive video camera has a scribble function, i.e., an editing function for adding scribbled images to a previously recorded picture file. Typically, scribbles are plotted on the panel display screen 67 by the user manipulating the pen 320 or are prepared as stamped images before they are pasted onto a filed picture of interest. The scribble icon i6 indicates that the file in question is scribbled with the scribble function.

A mark icon i7 is shown superposed on the thumbnail pictures B and E. The user may append a mark to a specific file by suitably operating on the operation screen. Illustratively, the mark attached by the user to a given file highlights the latter's importance. The mark icon i7 identifies such a file specifically marked up by the user.

A lock icon i8 is shown superposed on the thumbnail pictures A and E. This icon indicates that the file overlaid therewith is locked, i.e., protected by the user suitably operating on the operation screen against attempts to erase or otherwise edit the file in question. At the bottom of the thumbnail pictures A and E is an effect icon i9. This icon indicates that the file overlaid therewith has been given special effects to be carried out by this embodiment during replay, such as various scene changes and mosaics.

As described, the embodiment of this invention allows thumbnail pictures to be overlaid with various icons. These icons prompt the user visually to recognize types, settings and other attributes of the files represented by the thumbnail pictures.

In addition, a pointer icon i10 shown surrounding the thumbnail picture E by thick lines highlights the thumbnail picture currently pointed to by the user typically manipulating the pen 320. That is, the pointer icon i10 indicates that the thumbnail picture shown overlaid therewith is presently selected.

In practice, any thumbnail picture not surrounded by the pointer icon i10 is not shown overlaid with any icons on the operation screen. The embodiment causes a thumbnail picture to appear overlaid with an ivon or icons only when the thumbnail picture in question is selected by the user and surrounded by the pointer icon i10.

Suppose that the replay/pause key 308 is operated with the pointer icon i10 attached to a desired thumbnail picture by the user. In that case, playback starts from the file that is currently selected and surrounded by the pointer icon i10. Where a specific thumbnail picture is highlighted by the pointer icon i10, pointing again to the thumbnail picture causes playback to start from the track identified by the pointer icon i10.

On the left-hand side of the thumbnail picture display area A2 is a menu key area A3 in which diverse menu keys are displayed. From top down in the menu key area A3 are a replay menu key A3-1, an edit menu key A3-2, a scribbles/effects menu key A3-3, a studio menu key A3-4, a set menu key A3-5, and an advanced menu key A3-6.

The replay menu key A3-1 is used to present various replay menus and to make settings therein. Illustratively, the key A3-1 is operated to establish replay mode that is reflected in the replay mode display area A1-3.

The edit menu key A3-2 is used to present editing items that are executed per recorded file, such as moving, copying, or erasing a track (file); dividing or trimming a track; grouping files; and extracting still pictures (illustratively for selective display as thumbnail pictures). The key A3-2 is also operated to present track information and to effect transition to a track information screen where diverse settings regarding individual items of track information are established.

The scribbles/effects menu key A3-3 is used to present menus allowing a doodling feature and various special effects to be established, including scribbling, stamping, scene changes (fade-in, fade-out, wipe, etc.), special audio effects, and special visual effects (mosaics, sepia processing).

The inventive video camera affords the user what may be called an easy video work production feature permitting production of video works in a simplified GUI fashion in terms of image pickup and related operations. The feature is implemented by operating the studio menu key A3-4 to present suitable menus.

Operating the set menu key A3-5 presents menus in which to make diverse settings, such as screen brightness of the display unit 6A, panel color contrast, viewfinder brightness, date and time settings, and a still picture set time. The advanced menu key A3-6 is used to present menus about functions for connecting to an external device such as a personal computer as well as about demonstration mode.

Below the display area is a track information display area A5. This is an area that displays information about the track identified by the thumbnail picture selected in the thumbnail picture display area A2 (i.e., shown surrounded by the pointer icon i10). The display area A5 comprises subordinate areas A5-1 through A5-4 arranged from left to right.

A track number display area A5-1 indicates a track number. Next to the track number display area A5-1 is a date and time/title display area A5-2 that provides a recording date and time indication and a track title indication alternately at predetermined intervals (e.g., of several seconds). A time display area A5-3 to the right shows the total playing time of the track.

A shortcut icon A5-4 in the bottom rightmost position shows one of the above-mentioned icons (e.g., moving picture icon i1, still picture icon i2, interview file icon i3, group icon i4, memo file icon i5) in keeping with the type of the file in effect and depending on whether the file has a plurality of files grouped therein. Pointing to this shortcut icon A5-4 triggers transition to the track information screen.

Figure 20:
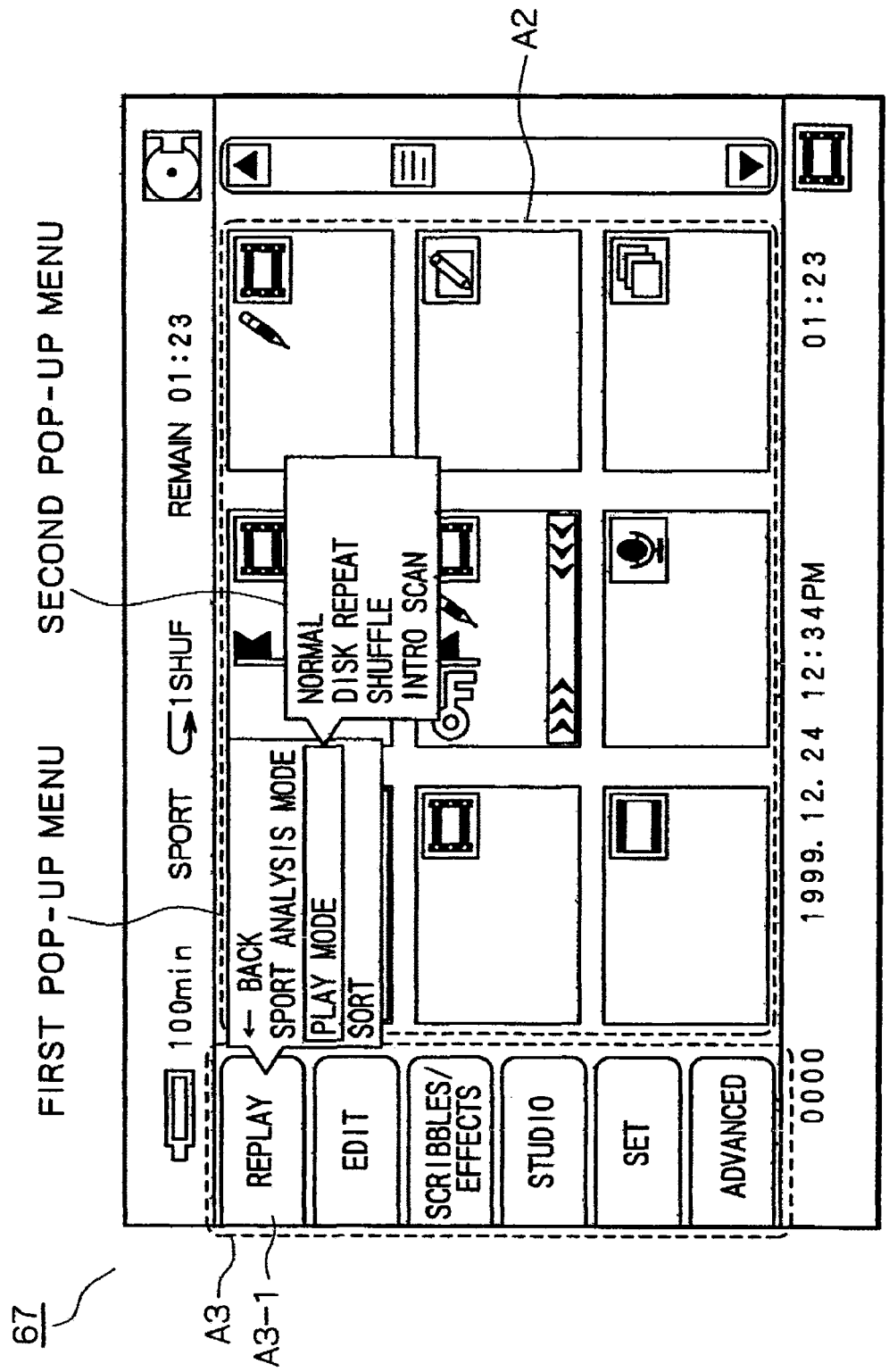
FIG. 20 is an explanatory view showing how a replay menu key is typically operated.

Typical operations of the menu key area A3 are described below with reference to FIG. 20. The operations involve the replay menu key A3-1. As shown in FIG. 20, pointing to the replay menu key A3-1 illustratively with the pen 320 causes a first pop-up menu to appear. This menu includes menu items "← BACK," "SPORT ANALYSIS MODE," "PLAY MODE," and "SORT." With the first pop-up menu displayed, a rotation of the jog dial 303 (or a drag operation on the screen with the pen) shifts the selected item in the rotated (or dragged) direction. If the play mode is selected as indicated with the jog dial 303 pushed (or with a pointing action sustained over a predetermined period of time by use of the pen), then a second pop-up menu appears.

The second pop-up menu includes four menu items: "NORMAL," "DISK REPEAT," "SHUFFLE" and "INTRO SCAN." The user may select any one of these items by operating in the second pop-up menu in the same manner as in the first pop-up menu. The play mode selected here is reflected illustratively in the replay mode display area shown in FIG. 19.

7. Typical Content Services

Described below are examples of content services that are afforded to the package medium 51 furnished with the access right discussed earlier. The typical content services offered by the service provider 504 to the package medium 51 include a content delivery service and an upload service. The content delivery service involves the service provider 504 delivering contents to the user terminal device 503 loaded with an authenticated package medium 51. The upload service involves allowing the user terminal device 503 loaded with the package medium 51 to upload content data to a designated website of the service provider 504.

Figure 21:
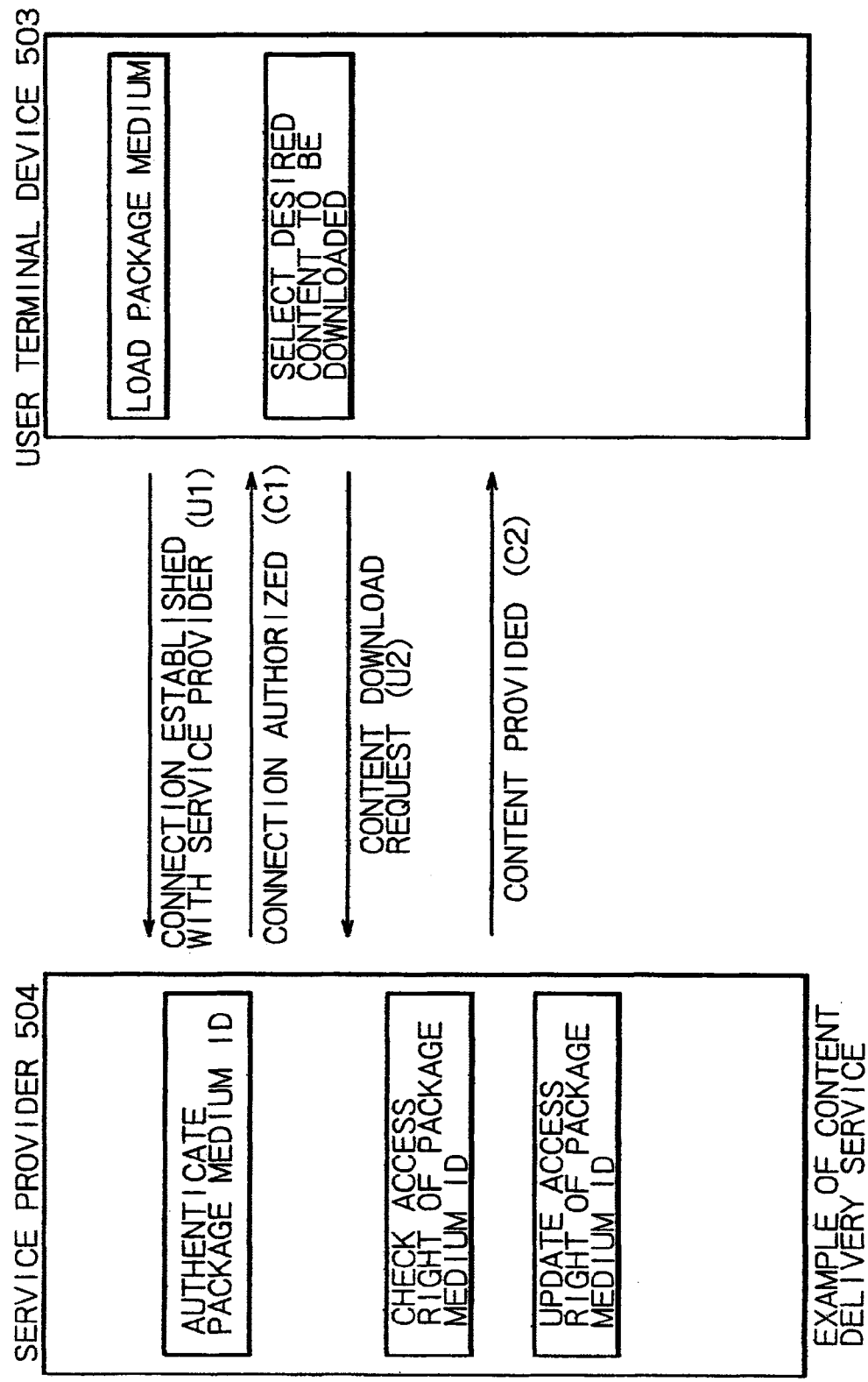
FIG. 21 is an explanatory view depicting a typical service that may be offered by a service offering system according to the invention.

FIG. 21 outlines how a typical content delivery service is implemented. The figure outlines communications between the service provider 504 and the user terminal device 503. In FIG. 21, processes performed by the user terminal device 503 and by the service provider 504 are identified by reference characters U and C respectively.

As preconditions for the setup of FIG. 21, the package medium 51 to be purchased by the user must contain a medium ID and the same medium ID must be stored beforehand in the medium ID management server 505. Furthermore, the access right information designating the right to receive the content delivery service from a specific website managed by the service provider 504 must be recorded (stored) either on the package medium 51 or in the medium ID management server 505. The medium ID in this context refers to an ID for identifying the package medium 51, a password provided as authentication information on the medium, or a program for effecting connection with the service provider 504.

When the user loads the package medium 51 into the user terminal device 503, the device 503 carries out a process for connecting with the service provider 504 (U1). Given a connection request from the user terminal device 503, the service provider 504 authenticates the medium ID of the requesting package medium 51. If the medium ID is authenticated, then the service provider 504 returns connection authorization (C1). For authentication, the service provider 504 checks the medium ID from the package medium 51 in the user terminal device 503 against the medium IDs stored in the medium ID management server 505.

When connection is authorized by the service provider 504, the user selects a desired content to be downloaded. The user terminal device 503 then sends a content download request (U2) to the service provider 504.

The service provider 504 verifies that the access right identified by the medium ID regarding the requested content is valid. The service provider 504 then reads the content in question from the content database 504*a* and delivers what is retrieved from the database to the user terminal device 503. At the end of the delivery, the service provider 504 changes the access right and terminates the content delivery service for the package medium.

Figure 22:
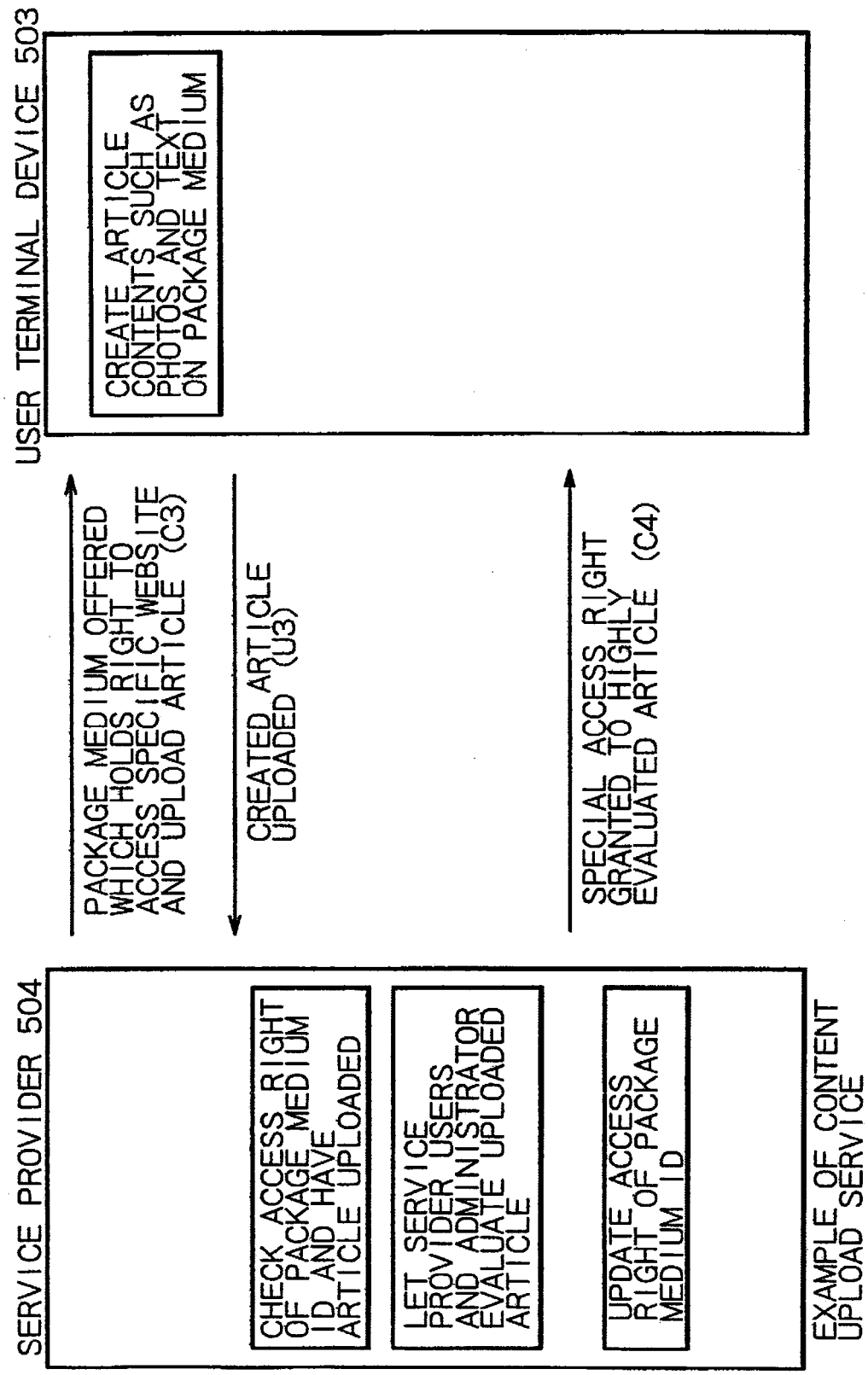
FIG. 22 is an explanatory view illustrating another typical service that may be offered by the inventive service offering system.

FIG. 22 outlines how a typical upload service is implemented. Although there can be many types of contents to be uploaded from the user terminal device 503, this example involves the user preparing a magazine article on the package medium 51 and uploading the prepared article data to an information website run by the service provider 504.

In this case, too, the user at the user terminal device 503 must purchase the package medium 51 in advance. It is also required that a medium ID be recorded (stored) on both the user's package medium 51 and in the service provider 504 and that the service provider 504 furnish the package medium 51 with the access right allowing the user to upload a content (C3) to the specific information website of the provider 504.

When the above requirements are met, the user at the user terminal device 503 proceeds to prepare an article content that may include photos and text through the use of the package medium 51. The article content thus prepared is uploaded (U3) to the service provider 504.

Given an article content upload from the user terminal device 503, the service provider 504 first verifies that the access right identified by the medium ID regarding the uploaded content is valid. The service provider 504 then transfers the uploaded article data to the appropriate website.

Later, the service provider 504 evaluates the uploaded article by typically collecting responses from readers browsing the website. Based on the results of the evaluation, the service provider 504 may grant a special access right (C4) to the user having uploaded the article in question.

8. Processing Operations

What follows is a description of how the user terminal device 503 and the management server (i.e., service provider 504 running the medium ID management server 505) typically work in implementing a service offering system according to the invention.

In the inventive service offering system, communications between the user terminal device 503 and the management server actually take place between the user terminal device 503 and the service provider 504. From the point of view of the user terminal device 503, "transmission" signifies sending data to the service provider 504 and "reception" means receiving data from the service provider 504. From the viewpoint of the management server, "transmission" in fact signifies sending data from the service provider 504 to the user terminal device 503 and "reception" actually means reception of data from the user terminal device 503 by the service provider 504.

8.1 Starting Process by User Terminal Device

When the video camera acting as the inventive user terminal device 503 loaded with the package medium 51 is to receive a service from the service provider 504 on the network, it is necessary first to start from the package medium 51 a recorded application program for establishing connection with the service provider 504. How this starting process is performed by the user terminal device 503 will now be described with reference to FIG. 23. In the video camera working as the user terminal device 503, the video controller 38 functions as a master controller under which the data processing/system control circuit 31, driver controller 46 and related parts execute their control operations. It is assumed that at least a medium ID is recorded (stored) both on the package medium 51 purchased by the user from the package medium shop 502 and in the medium ID management server 505.

Figure 23:
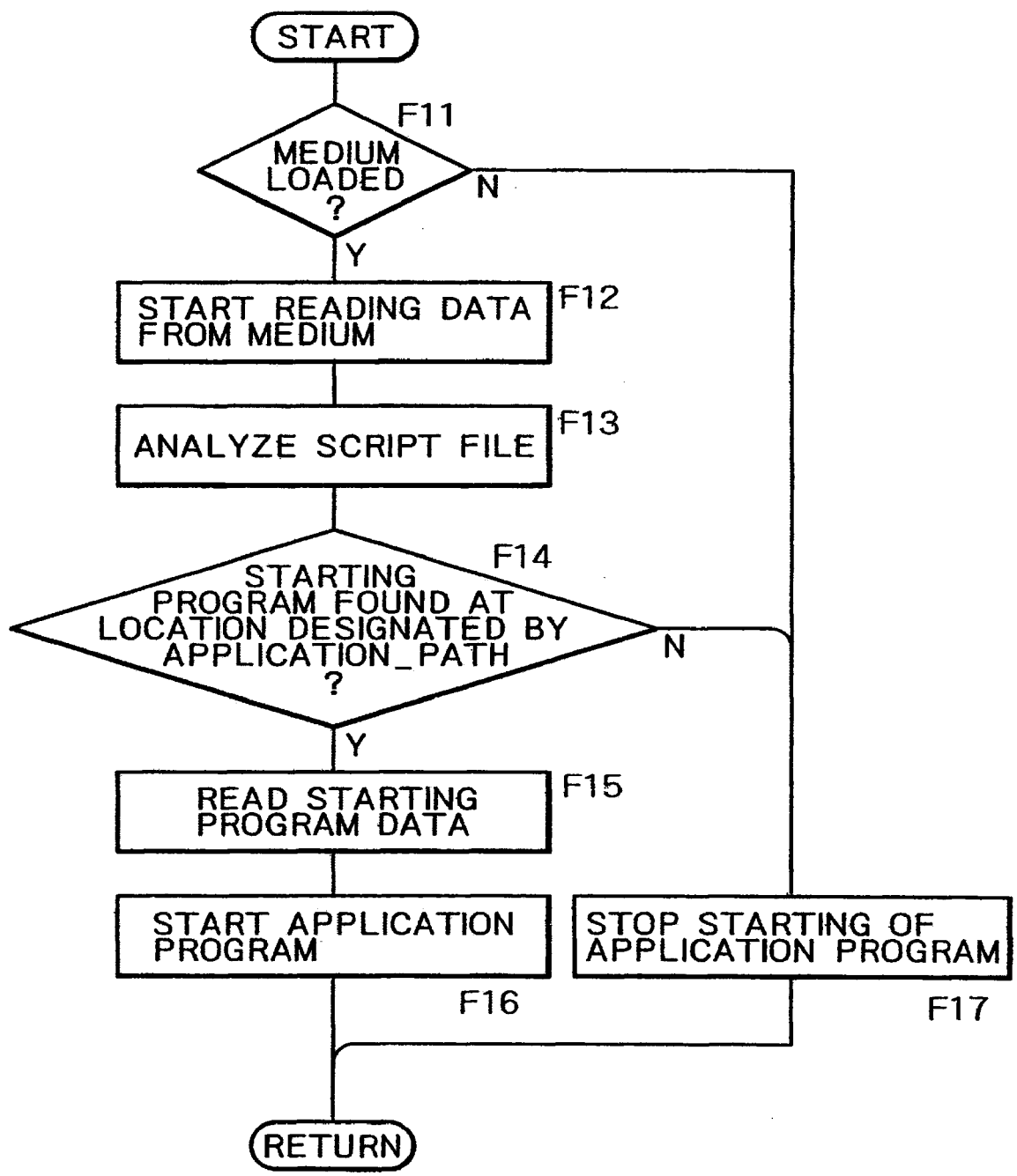
FIG. 23 is a flowchart of steps constituting an application program starting process performed by the inventive user terminal device.

In step F11 of FIG. 23, the video controller 38 checks to see if the package medium 51 is loaded in the disk loading/unloading unit 210 (see FIG. 12B). If the package medium 51 is judged loaded, step F12 is reached.

In step F12, the video controller 38 starts reading data from the package medium 51. In step F13, the video controller 38 analyzes a script file retrieved from the package medium 51. In step F14, a check is made to see a starting program for activating the application program is located on APPLICATION_PATH. If the starting program is judged to exist at the location designated by APPLICATION_PATH, then step F15 is reached.

In step F15, the video controller 38 reads the starting program from the package medium 51. In step F16, the video controller 38 starts up the application program. This terminates the starting process.

If in step F11 or F14 the result of the check turns out to be negative, step F17 is reached in which startup of the application program is halted, and the starting process is aborted. That is, if the package medium 51 is not loaded or if the loaded package medium 51 does not have a starting program recorded thereon, then the starting process is brought to an end.

8.2 Connecting Processes

With the application program started as described above, the user performs suitable operations causing the user terminal device 503 to connect with the service provider 504 using a connection program recorded on the package medium 51. The service provider 504 in turn executes an authentication program to authenticate the package medium 51, before automatically establishing connection with the user terminal device 503. How the connection is established between the user terminal device 503 and the service provider 504 will now be described by referring to FIGS. 24 and 25.

8.2.1 Connecting Process by User Terminal Device

Figure 24:
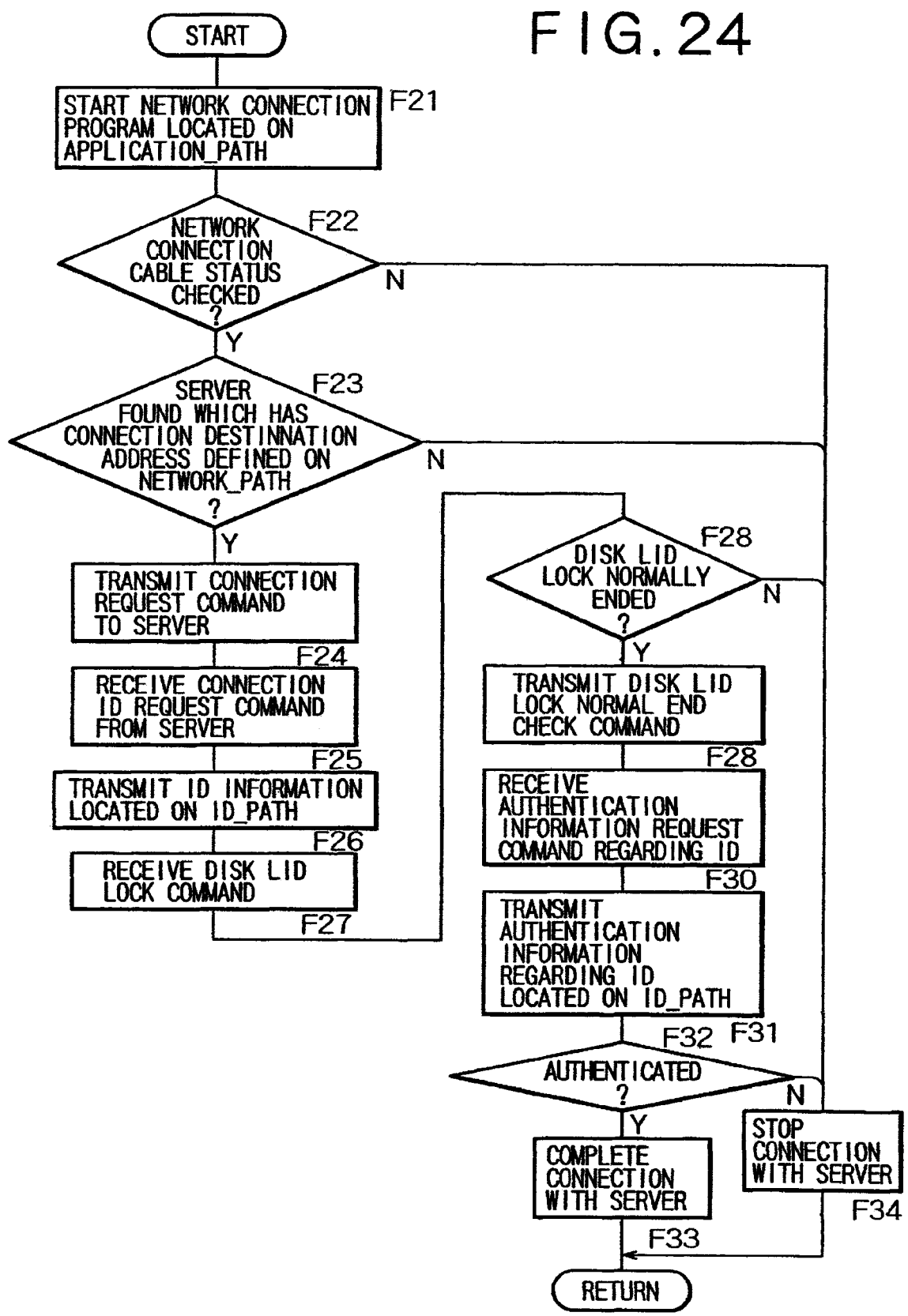
FIG. 24 is a flowchart of steps constituting a network connecting process performed by the inventive user terminal device.

The connecting process carried out by the user terminal device 503 is described first with reference to FIG. 24. At the user terminal device 503, the user performs a suitable operation to request connection to the network. The request causes the video controller 38 to perform a network connection process. The user's operation for connecting to the network illustratively involves calling up on the display panel screen 67 an operation display for connection to the network. With the operation display on the display panel screen 67, the user points to and clicks on the screen. This causes the video controller 38 to reach step F21 of FIG. 24.

In step F21, the video controller 38 starts a network connection program located on APPLICATION_PATH. In step F22, the video controller 38 checks the status of the attached cable for network connection. If the cable status is judged normal, step F23 is reached. In step F23, a check is made to see if there exists a service provider 504 whose connection destination address is defined on NETWORK_PATH.

If the result of the check in step F23 is affirmative, then step F24 is reached. In step F24, the video controller 38 transmits a connection request command to the service provider 504. In step F25, a connection ID request command is received from the service provider 504. In turn, the video controller 38 reaches step F26 and transmits to the service provider 504 ID information located on ID_PATH. In step F27, the video controller 38 receives a disk lid lock command from the service provider 504. Step F27 is followed by step F28.

In step F28, a check is made to see whether the disk lid of the disk loading/unloading unit 210, now loaded with the package medium 51, is normally locked. If the disk lid is judged normally locked, step F29 is reached. In step F29, the video controller 38 transmits a disk lid lock normal end check command to the service provider 504.

The reason the video controller 38 of the video camera receives the disk lid lock command from the service provider 504 is as follows: with this embodiment, it is the package medium 51 that can receive a service over the network as long as the medium 51 has a valid medium ID recorded thereon. However, after the network connection program is read from the package medium 51 into the video camera, the package medium 51 could be switched fraudulently in the disk loading/unloading unit 210. If that happens, an illegitimate package medium 51 could receive the service from the service provider 504.

That unscrupulous disk switch is prevented by keeping the disk lid locked when the network-based connection is established between the video camera loaded with the package medium 51 and the service provider 504. In practice, if the service provider 504 again locks the disk lid upon offering the service to the package medium 51, as will be described later, then it is not mandatory to lock the disk lid at the time of establishing the network connection.

In step F30, the video controller 38 receives an authentication information request command requesting transmission of authentication information such as a password of the package medium 51. In step F31, the video controller 38 transmits in response the authentication information regarding the package medium 51 from ID_PATH. In step F32, a check is made to see whether the package medium 51 is authenticated by the service provider 504. If the package medium 51 is authenticated, then step F33 is reached in which the connection to the service provider 504 is severed and the process is terminated.

If the result of the check in any one of steps F22, F23, F28 and F32 turns out to be negative, then step F34 is reached in which the connection to the service provider 504 is stopped and the connecting process is aborted. Specifically, if the cable is not connected or if no server is found at the destination address, there can be no connection between the user terminal device 503 and the service provider 504; if the disk lid cannot be locked or if the package medium 51 is not authenticated, the currently loaded package medium 51 is judged invalid and the connecting process is terminated.

8.2.2 Process by Management Server

Figure 25:
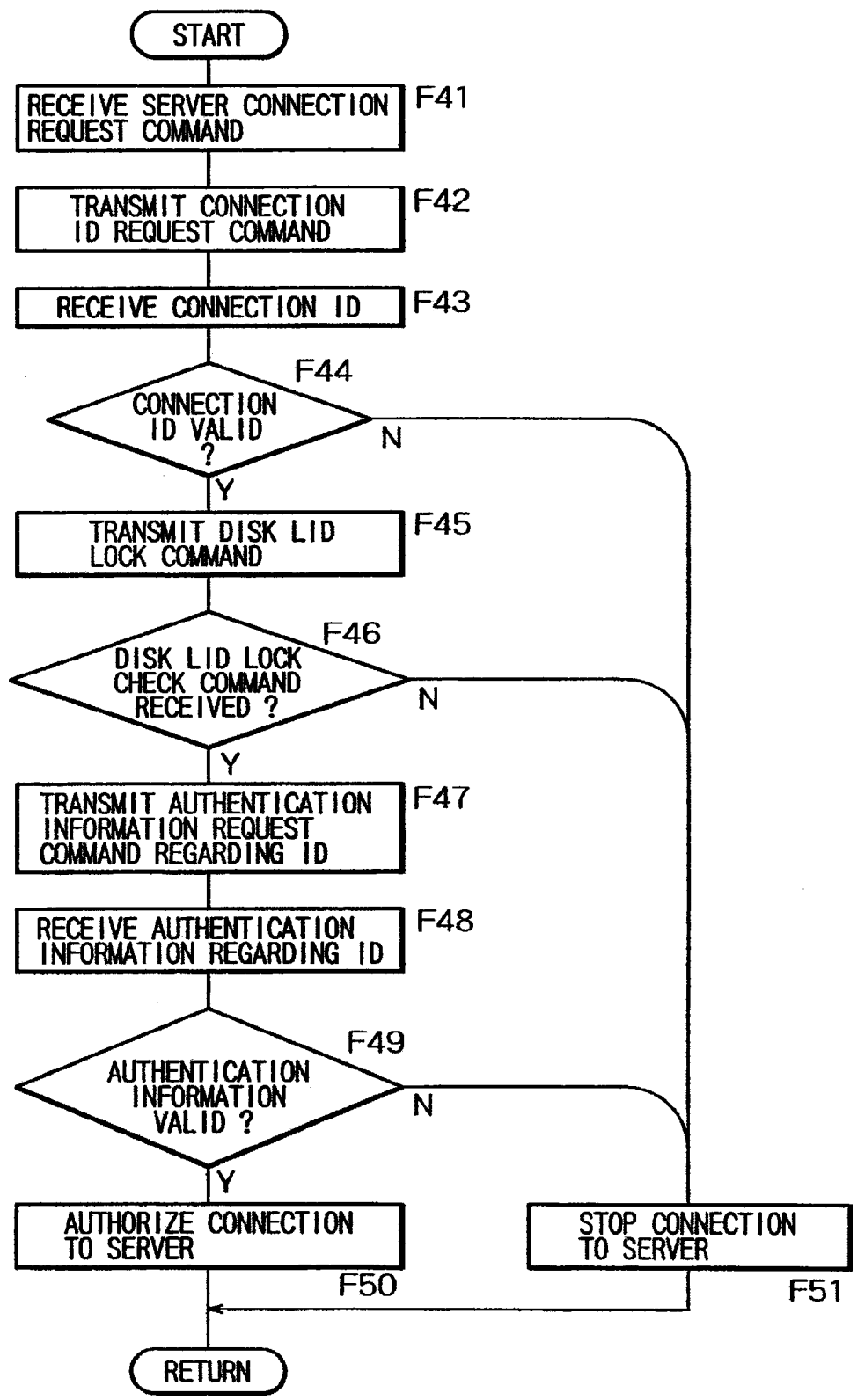
FIG. 25 is a flowchart of steps constituting a network connecting process performed by the inventive service provider.

Described below with reference to FIG. 25 is how a connecting process is performed by the server in response to the connecting process carried out by the user terminal device 503 as outlined above. In practice, the process on the server side takes place while the management unit 522 of the service provider 504 is communicating with the medium ID management server 505.

In step F41 of FIG. 25, the management unit 522 receives a server connection request command from the user terminal device 503. In step F42, the management unit 522 transmits a connection ID request command to the user terminal device 503. On receiving a connection ID in step F43, the management unit 522 reaches step F44 and checks to see if the received connection ID is valid.

The check in step F44 is carried out by the checking unit 513. More specifically, the checking unit 513 checks the connection ID received from the user terminal device 503 against the connection IDs stored in the medium ID database 505a, to see whether the received connection ID is valid. That is, the check in step F44 is performed to see whether the package medium 51 loaded in the user terminal device 503 is one of the package media registered with the medium ID management server 505.

If the connection ID is judged valid in step F44, step F45 is reached in which a disk lid lock command is transmitted to the user terminal device 503. In step F46, a check is made to see if a disk lid lock check command is received from the user terminal device 503. If the command is judged received in step F46, then step F47 is reached.

In step F47, the management unit 522 transmits an authentication information request command to the user terminal device 503 requesting the latter to send authentication information such as the password recorded along with the ID on the package medium 51 loaded in the terminal device 503. When the authentication information is received in step F48, step F49 is reached in which a check is made to see if the received authentication information is valid.

The check in step F49 is also performed by the checking unit 513, to see whether the connection ID received from the user terminal device 503 is valid.

If in step F49 the authentication information from the user terminal device 503 is judged valid, then the authentication is complete and step F50 is reached. In step F50, the user terminal device 503 is granted connection to the service provider 504, and the process is terminated.

If the result of the check in any one of steps F44, F46 and F49 is negative, then the process of the user terminal device 503 to establish connection with the management server is stopped, and the connecting process is aborted. In particular, if the disk lid lock check command is not received in step F46, the attempt of the user terminal device 504 to connect with the service provider 504 is halted, and the process is brought to an end. In other words, if the package medium 51 loaded in the user terminal device 503 is not judged registered with the medium ID management server 505 or if the package medium 51 is judged illegally switched by the user halfway through the process, then a fraudulent disk use is suspected and the connecting process is aborted accordingly.

As described, when the user at the user terminal device 503 is to establish connection with the service provider 504 over the network, typically the user need only point to and click on a network connection button displayed on the operation screen. Since the package medium 51 contains in advance the connection program for setting up connection with the service provider 504, there is no need for the user to make various settings conventionally required for establishing a network connection.

8.3 Download Processes

With the network connection established as described between the user terminal device 503 and the service provider 504, the package medium 51 loaded in the terminal device 503 may receive an appropriate service depending on the access right given to the medium 51. Described below is a process performed by the user terminal device 503 in receiving a content download service from the service provider 504, as well as a process carried out by the management server of the service provider 504 offering the download service to the user at the user terminal device 503. The download processes conducted by the user terminal device 503 and the management server with access right information held by the package medium 51 differ from the processes executed with the access right information retained by the service provider 504. First to be described below with reference to FIGS. 26 and 27 are thus the processes performed by the user terminal device and management server with the access right held by the package medium 51.

8.3.1 Process by User Terminal Device (with Access Right Held by Disk)

Figure 26:
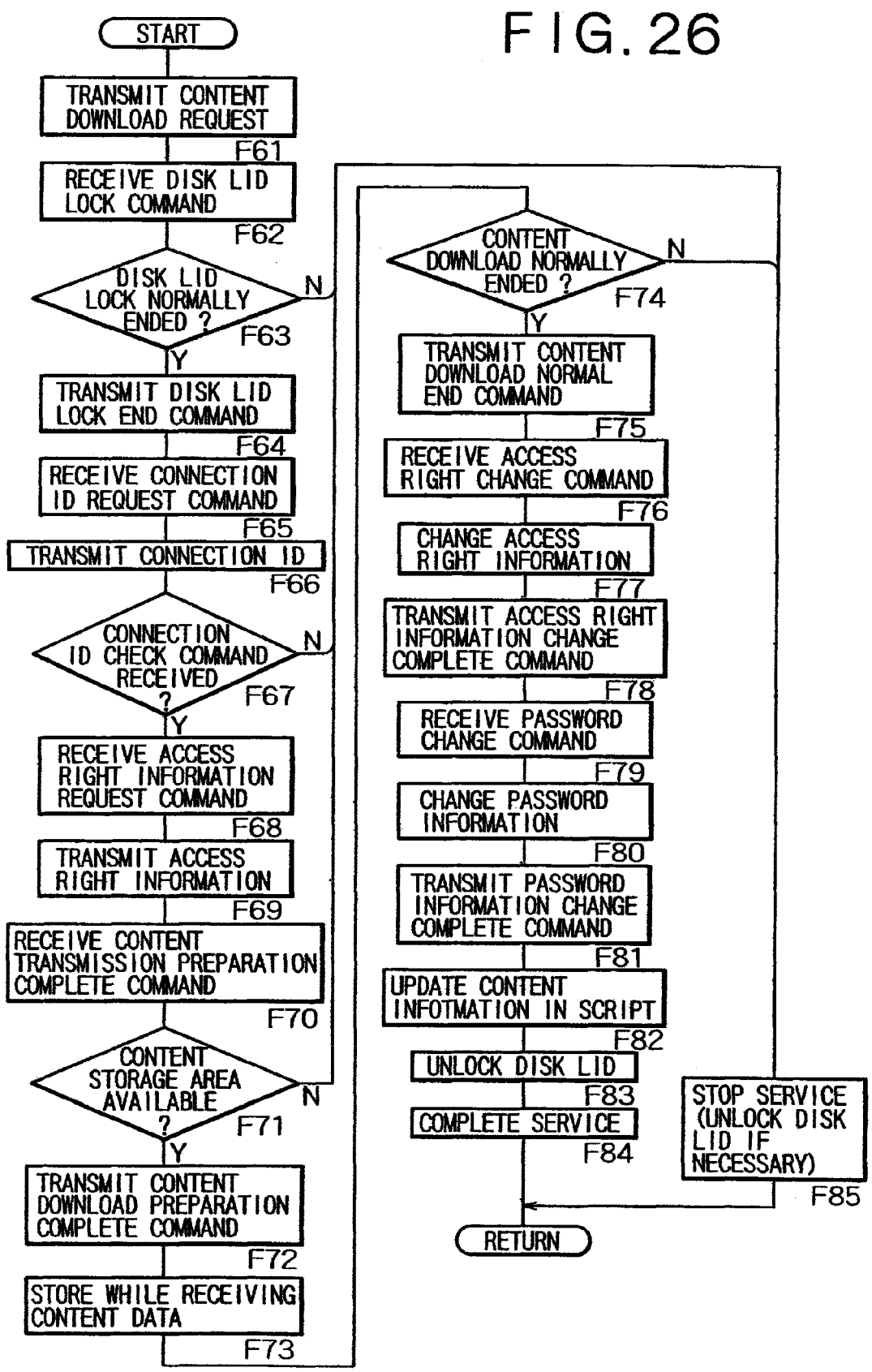
FIG. 26 is a flowchart of steps performed by the inventive user terminal device upon downloading.
Figure 27:
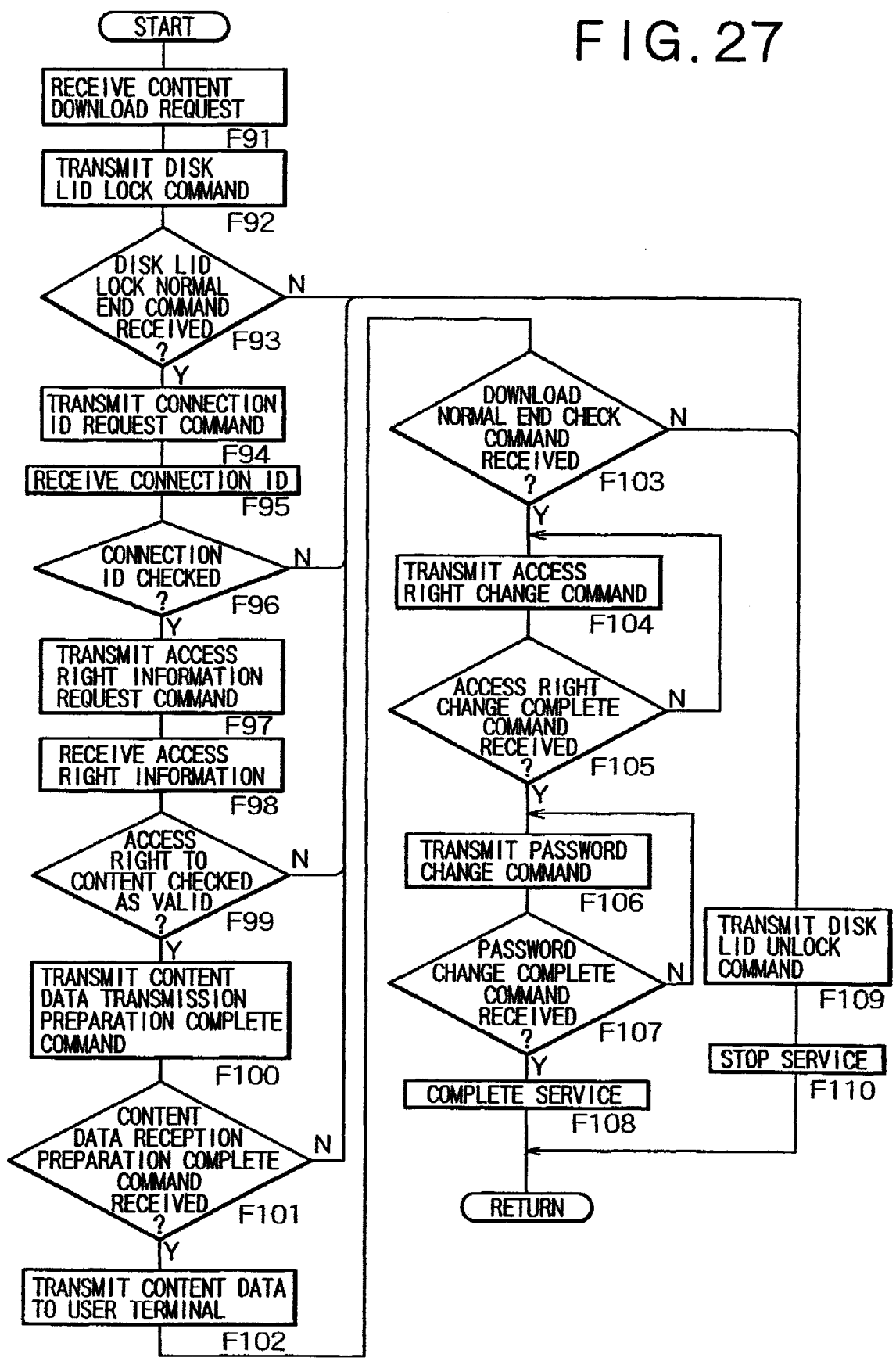
FIG. 27 is a flowchart of steps performed by the inventive service provider upon downloading.

Described below with reference to FIG. 26 is how the download process is performed by the user terminal device 503 with the access right information recorded on the package medium 51.

Once the connection with the service provider 504 is established over the network, the video controller 38 goes to step F61. In step F61, the video controller 38 transmits a content download request to the service provider 504. In step F62 the video controller 38 receives a disk lid lock command from the service provider 504, before reaching step F63. In step F63, the video controller 38 checks to see whether the disk lid of the disk loading/unloading unit 210 loaded with the package medium 51 is normally locked. If the disk lid is judged normally locked, step F64 is reached.

In step F64, the video controller 38 transmits a disk lid lock end command indicating that the disk lid is normally locked. In step F65, the video controller 38 receives an ID request command from the service provider 504. In response the video controller 38 transmits the ID of the package medium 51 from ID_PATH in step F66. The video controller 38 receives in step F67 an ID check command from the service provider 504, before reaching step F68.

In step F68, the video controller 38 receives an access right information request command. In step F69, the video controller 38 transmits to the service provider 504 access right information located illustratively on ACCESS_PATH. In step F70, the video controller 38 receives a content transmission preparation complete command indicating that the service provider 504 is now ready to transmit content data. In step F71, a check is made to see whether a sufficient area is available in which to accommodate the content data to be downloaded.

If in step F71 the sufficient content storage area is judged available, step F72 is reached in which the video controller 38 transmits a content download preparation complete command indicating that the user terminal device 503 is now ready to download the content data. In step F73, the content data are stored into the area while they are being downloaded from the service provider 504. In step F74, a check is made to see if the download of the content data is normally terminated. If the download is judged normally terminated, step F75 is reached in which the video controller 38 transmits a content download normal end command indicating that the content download has normally ended. Step F75 is followed by step F76 in which an access right change command is received. In step F77, the video controller 38 changes the access right information located on ACCESS_PATH. Upon completion of the change in the access right information, the video controller 38 reaches step F78 and transmits an access right information change complete command to the service provider 504.

In step F79, the video controller 38 receives a password change command from the service provider 504. In step F80, the video controller 38 changes the password located as the authentication information on ID_PATH. With the password changed, step F81 is reached in which the video controller 38 transmits a password information change complete command. In step F82, the video controller 38 updates content information in script. In step F83, the disk lid is unlocked. In step F84, the video controller 38 reaches the end of the download service and terminates the download process.

If the result of the check in any one of steps F63, F67, F71 and F74 is negative, then step F85 is reached in which, with the disk lid unlocked where necessary, the download service is stopped and the download process is aborted. That is, if the loaded package medium 51 is not judged valid or if the download of the content data is not judged normally executed, then the download service is brought to an end.

8.3.2 Process by Management Server (with Access Right Held by Disk)

Described below with reference to FIG. 27 is what the management server does in response to the download process carried out by the user terminal device 503 as discussed above. In practice, the download process by the management server takes place while the management unit 522 of the service provider 504 is communicating with the medium ID management server 505.

In step F91 of FIG. 27, the management unit 522 receives a content download request from the user terminal device 503. In step F92, the management unit 522 transmits a disk lid lock command to the user terminal device 503. In step F93, a check is made to see if a disk lid lock normal end command is received indicating that the disk lid is normally locked. If the disk lid lock normal end command is judged received, step F94 is reached in which the management unit 522 transmits an ID request command to the user terminal device 503 requesting the latter to return the ID of the package medium 51.

When the ID is received in step F95, a check is made in step F96 to see if the received ID is valid. As in the ID check of step F44 for network connection in FIG. 25, the checking unit 513 checks the connection ID received from the user terminal device 503 against the connection IDs stored in the medium ID database 505*a*, to see whether the received connection ID is valid. Alternatively, steps F95 and F96 may be skipped if the disk lid is judged normally locked in step F93.

If in step F96 the connection ID from the user terminal device 503 is judged valid, step F97 is reached. In step F97, the management unit 522 transmits an access right information request command requesting the user terminal to return access right information. In step F98, the management unit 522 receives the access right information. In step F99, a check is made to see if the access right information received in step F98 is valid regarding the content requested to be downloaded. At this point, the management unit 522 transfers the access right information to the checking unit 513. Given the result of the check by the checking unit 513, the management unit 522 determines whether the received access right information is valid with respect to the content in question. If in step F99 the access right information is judged valid, step F100 is reached. In step F100, the management unit 522 transmits to the user terminal a content data transmission preparation complete command indicating that the server is now ready to transmit the content data.

In step F101, a check is made to see if a content data reception preparation complete command is received from the user terminal device 503 indicating that the terminal device is now ready to receive the content data. If the reception preparation complete command is judged received in step F101, step F102 is reached in which the content data are transmitted to the user terminal device 503. In step F103, a check is made to see if a download normal end check command is received from the user terminal device 503 indicating that the download has normally ended. If the command is judged received in step F103, step F104 is reached. In step F104, the management unit 522 transmits an access right change command requiring the user terminal to change the access right information on the package medium following the content download.

In step F105, a check is made to see if an access right change complete command is received from the user terminal device 503 indicating that the change in the access right information is completed. If the change complete command is judged received in step F105, step F106 is reached. If the access right change complete command is not judged received in step F105, then step F104 is reached again and the same command is retransmitted to the user terminal.

In step F106, the management unit 522 transmits a password change command to the user terminal device 503. In step F107, a check is made to see if a password change complete command is received from the user terminal device 503. If the change complete command is judged received in step F107, step F108 is reached where the download service is considered complete and the download process is terminated. If the password change complete command is not judged received in step F107, then step F106 is again reached and the same command is retransmitted to the user terminal.

If the result of the check in any one of steps F93, F96, F99, F101 and F103 turns out to be negative, then steps F109 and F110 are reached where a disk lid unlock command is transmitted to the user terminal device 503, the download service is halted, and the process is aborted. That is, if the package medium 51 loaded in the user terminal device 503 is found invalid or if the content download fails to take place normally, the download service is terminated halfway.

8.3.3 Process by User Terminal Device (with Access Right Held by Medium ID Management Server)

Figure 28:
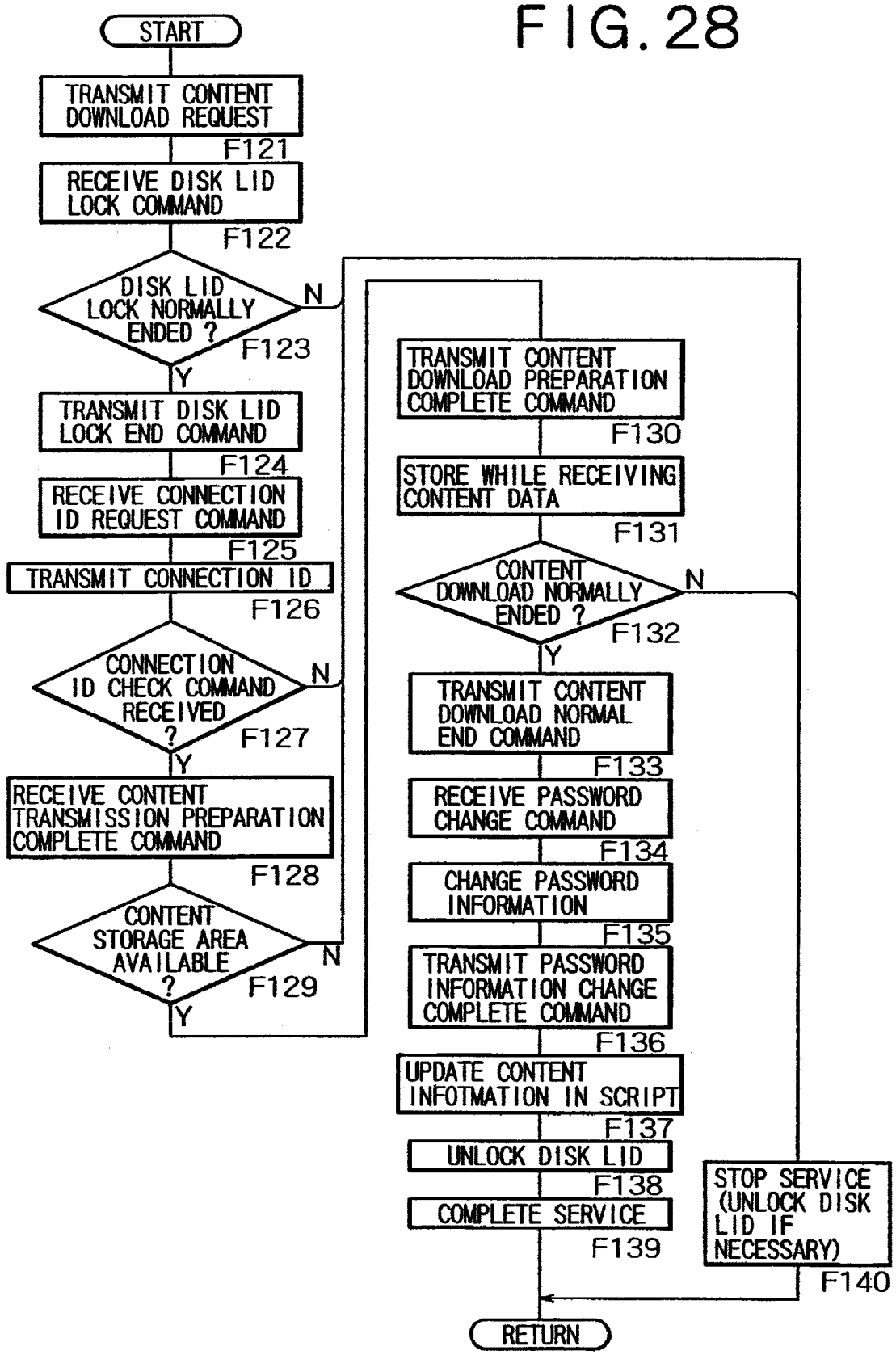
FIG. 28 is a flowchart of other steps performed by the inventive user terminal device upon downloading.

Outlined in FIG. 28 is how the user terminal device 503 performs its download process with the access right information stored in the medium ID database 505*a*. Steps F121 through F127 in FIG. 28 are the same as steps F61 through F67 in FIG. 26; steps F128 through F133 are the same as steps F70 through F75; and steps F134 through F140 are the same as steps F79 through F85. For these steps indicated in FIG. 28, their descriptions are omitted hereunder to avoid repetitiveness.

Where the access right information is stored in the medium ID database 505*a*, the access right accompanying any request to download content data is verified for validity by the management server. That is, when steps F68 and 69 as well as steps F76 through F79 dealing with the transmission and reception of access right information are removed from the steps in FIG. 26, the user terminal device 503 is allowed to carry out its download process.

8.3.4 Process by Management Server (with Access Right Held by Medium ID Management Server)

Figure 29:
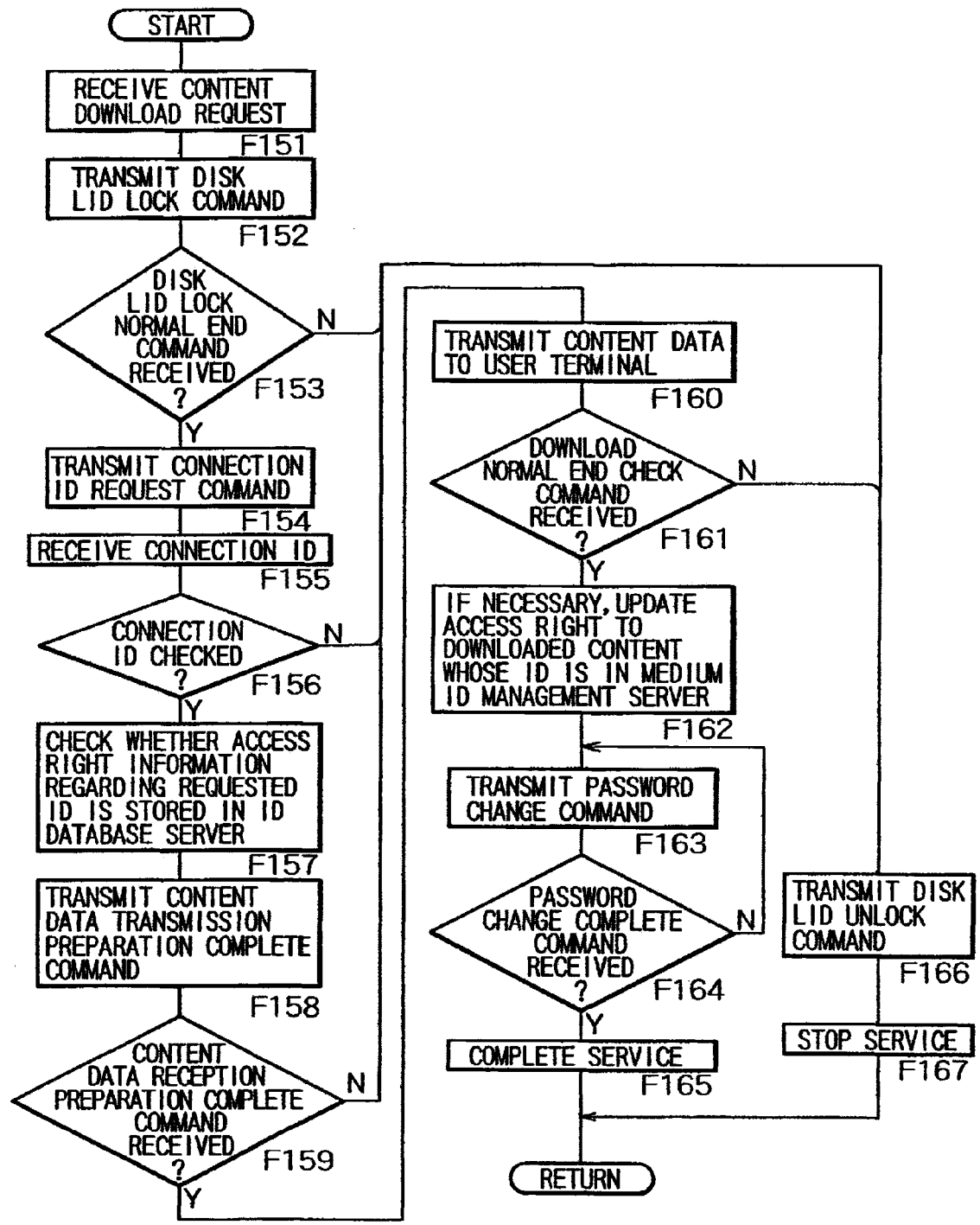
FIG. 29 is a flowchart of other steps performed by the inventive service provider upon downloading.

Outlined in FIG. 29 is what the management server does in response to the download process performed by the user terminal device 503 as shown in FIG. 28. In this case, steps F151 through F156 in FIG. 29 are the same as step F91 through F96 in FIG. 27 and their descriptions are omitted. Steps leading up to F156 in FIG. 29 are carried out to determine whether the package medium 51 loaded in the user terminal device 503 having issued a download request is one of the package media registered beforehand with the medium ID database 505*a*.

When access right information from the loaded package medium 51 is judged stored in the medium ID database 505*a* in step F156, step F157 is reached. In step F157, a check is made to see if the access right information associated with the connection ID verified for the download request is found in the medium ID database 505*a*.

In subsequent steps F158 through F161, as in steps F100 through F103 of FIG. 27, the requested content data are downloaded to the user terminal device 503.

In step F162, the management server updates if necessary the access right information in the medium ID database 505*a* regarding the downloaded content.

Steps F163 through F165, F166 and F167 in FIG. 29 are the same as steps F106 through F108, F109 and F110 in FIG. 27 respectively. The download process is terminated after a change is made in the password recorded on the package medium 51 in the user terminal device 503 having requested the download or after the download service is halted.

8.4 Upload Processes

Figure 30:
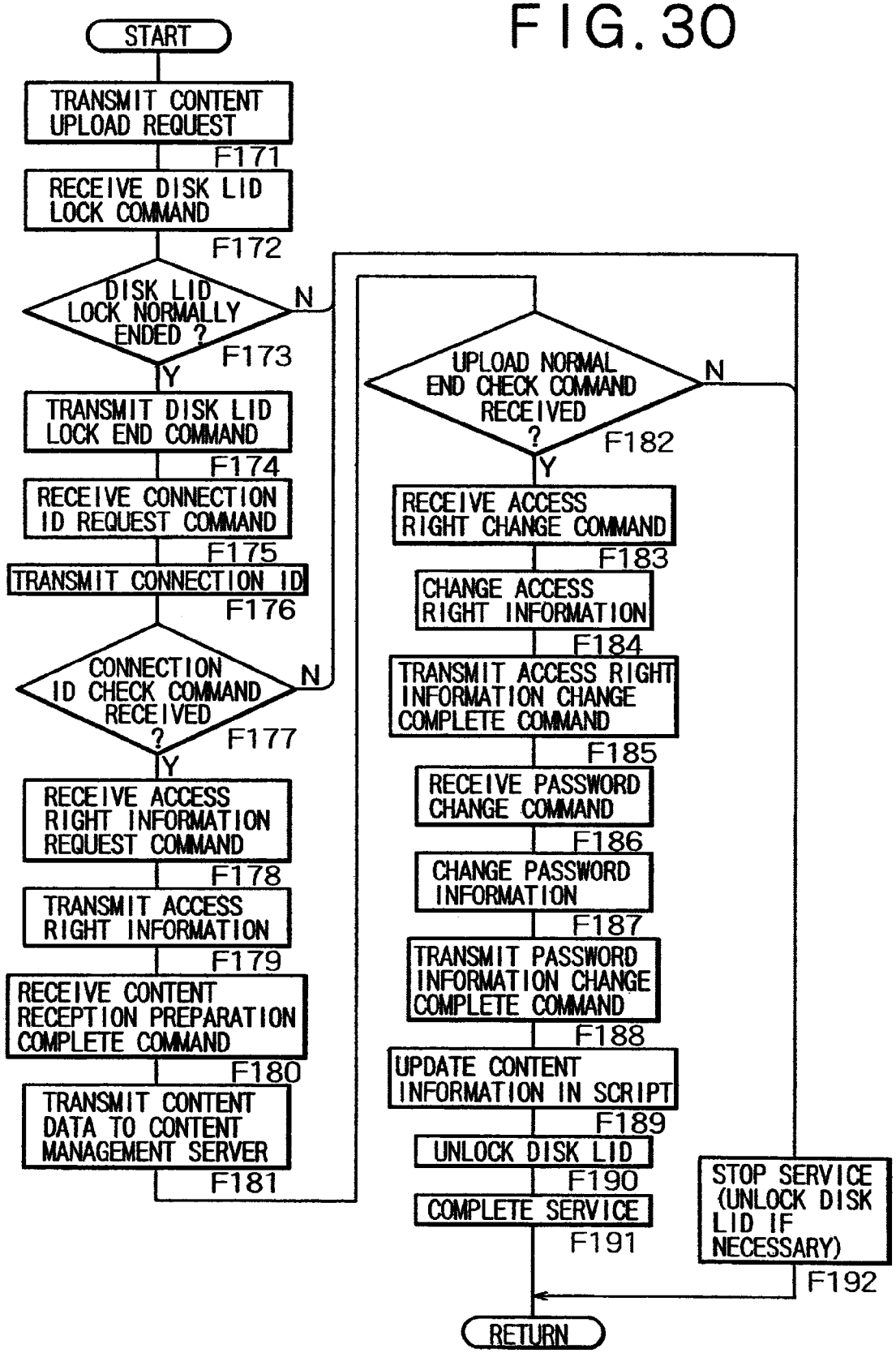
FIG. 30 is a flowchart of steps performed by the inventive user terminal device upon uploading.
Figure 31:
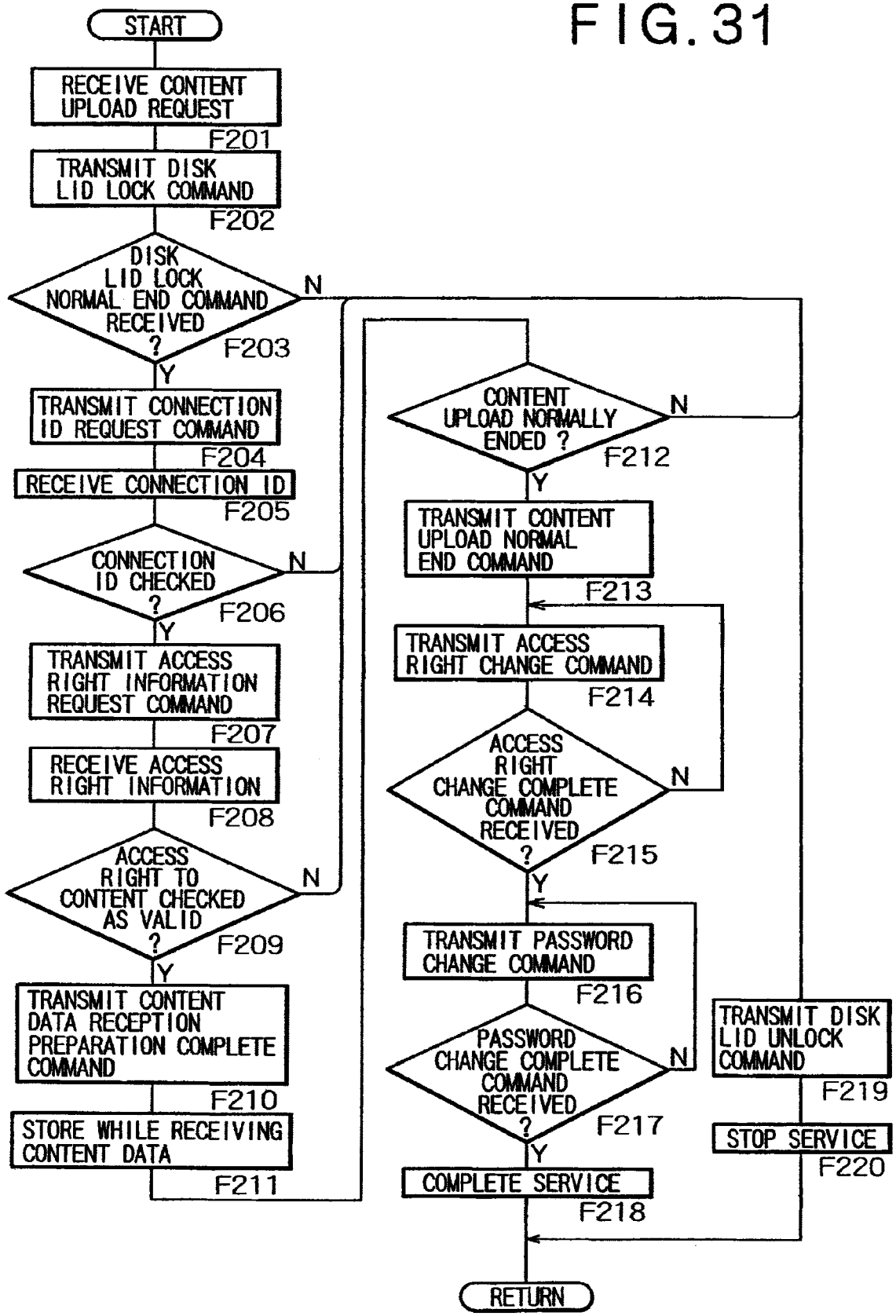
FIG. 31 is a flowchart of steps performed by the inventive service provider upon uploading.

The service offering system of this invention may in advance provide the package medium 51 with an access right to upload content data to a specific website via the service provider 504. Described below with reference to FIGS. 30 and 31 are typical upload processes performed by the user terminal device 503 and by the management server when the user who purchased the package medium 51 is to upload content data to a particular website by way of the service provider 504.

As a content (which can be of diverse kinds) to be uploaded from the user terminal device 503, the example here presupposes a magazine article that is prepared by the user on the package medium 51 and uploaded to the website run by the service provider 504.

8.4.1 Process by User Terminal Device

The upload process performed by the user terminal device 503 will now be described by referring to FIG. 30. In this case, as discussed earlier with reference to FIGS. 24 and 25, a network connection is first established between the user terminal device 503 and the service provider 504. The video controller 38 of the user terminal device 503 then proceeds to step F171.

In step F171, the video controller 38 transmits a content upload request command to the service provider 504. The video controller 38 receives a disk lid lock command from the service provider 504 in step F172, before reaching step F173. In step F173, the video controller 38 checks to see if the disk lid of the disk loading/unloading unit 210 loaded with the package medium 51 is locked. If the disk lid is judged normally locked, step F174 is reached.

In step F174, the video controller 38 transmits a disk lock end command indicating that the disk lid is normally locked. In step F175, an ID request command is received. In step F176, the video controller 38 transmits the ID of the package medium 51 illustratively from ID_PATH. After receiving an ID check command in step F177, the video controller 38 goes to step F178.

In step F178, the video controller 38 receives an access right information request command. In step F179, the video controller 38 reads access right information illustratively from ACCESS_PATH and transmits the information to the service provider 504. In step F180, the video controller 38 receives a content reception preparation complete command from the service provider 504 indicating that the service provider is now ready to receive content data. In step F181, the video controller 38 transmits the content data to the service provider 504. In step F182, a check is made to see if an upload normal end check command is received indicating that the upload has normally ended. If the command is judged received in step F182, step F183 is reached. After receiving an access right change command in step F183, the video controller 38 reaches step F184 and changes the access right information located on ACCESS_PATH. With the access right information changed, the video controller 38 goes to step F185 and transmits an access right information change complete command indicating that the information has now been changed.

In step F186, a password change command is received. In step F187, the video controller 38 changes the password located illustratively on ID_PATH as authentication information. With the password changed, step F188 is reached in which the video controller 38 transmits a password information change complete command indicating that the change in the password is now complete. After changing content information in script in step F189, the video controller 38 reaches step F190 to unlock the disk lid. In step F191, the upload service is considered complete and the upload process is terminated.

If the result of the check in any one of steps F173, F177 and F182 turns out to be negative, step F192 is reached where the disk lid is unlocked as needed, the upload service is halted, and the process is aborted.

8.4.2 Process by Management Server

Described below with reference to FIG. 31 is what the management server does in response to the upload process carried out by the user terminal device 503 as discussed above. As in earlier examples, the upload process by the management server takes place while the management unit 522 of the service provider 504 is communicating with the medium ID management server 505.

In step F201 of FIG. 31, the management unit 522 receives a content upload request command from the user terminal device 503. In step F202, the management unit 522 transmits a disk lid lock command to the user terminal device 503. In step F203, a check is made to see if a disk lid lock normal end command is received. If the command is judged received in step F203, the management unit 522 reaches step F204 and transmits an ID request command to the user terminal device 503 requesting the user terminal to return the ID of the package medium 51.

After receiving the ID in step F205, the management unit 522 goes to step F206. In step F206, a check is made to see if the received ID is valid. The check in step F206 is carried out by the medium ID management server 505 in the same manner as the check on the ID for network connection in step F44 of FIG. 25. Whether or not the connection ID from the user terminal device 503 is valid is determined based on the result of the check returned from the medium ID management server 505.

If in step F206 the connection ID from the user terminal device 503 is judged valid, step F207 is reached. In step F207, the management unit 522 transmits an access right information request command requesting the user terminal to return access right information. After receiving the access right information in step F208, the management unit 522 reaches step F209 in which a check is made to see if the access right is valid regarding the content requested to be uploaded.

At this point, the management unit 522 transfers the access right information to the checking unit 513 as in earlier examples. On receiving the result of the check from the checking unit 513, the management unit 522 determines whether the received access right information is valid with respect to the content in question. If in step F209 the access right information is found valid based on the judgment by the checking unit 513, then step F210 is reached. In step F210, the management unit 522 transmits a content data reception preparation complete command indicating that the server is now ready to receive the content data.

In step F211, the content data are stored while they are being uploaded from the user terminal device 503. In step F212, a check is made to see if the upload of the content data is normally terminated. If the upload is judged to have normally ended, step F213 is reached and a content upload normal end command is transmitted indicating that the content upload has normally ended. Step F213 is followed by step F214 in which an access right change command is transmitted so as to get the access right of the package medium 51 changed.

In step F215, a check is made to see if an access right change complete command is received indicating that the change in the access right is now complete. If the command is judged received in step F215, step F216 is reached. If the access right change complete command is not judged received in step F215, step F214 is again reached and the same command is retransmitted.

In step F216, the management unit 522 transmits a password change command requesting the user terminal to change the password of the package medium 51. In step F217, a check is made to see if a password change complete command is received. If the command is judged received in step F217, then step F218 is reached where the upload service is considered complete and the upload process is terminated. If the password change complete command is not judged received in step F217, then step F216 is again reached and the same command is retransmitted to the user terminal.

If the result of the check in any one of steps F203, F206, F209 and F212 turns out to be negative, then steps F219 and F220 are reached where a disk lid unlock command is transmitted to the user terminal device 503, the upload service is halted, and the process is aborted.

9. Replay Process

Figure 32:
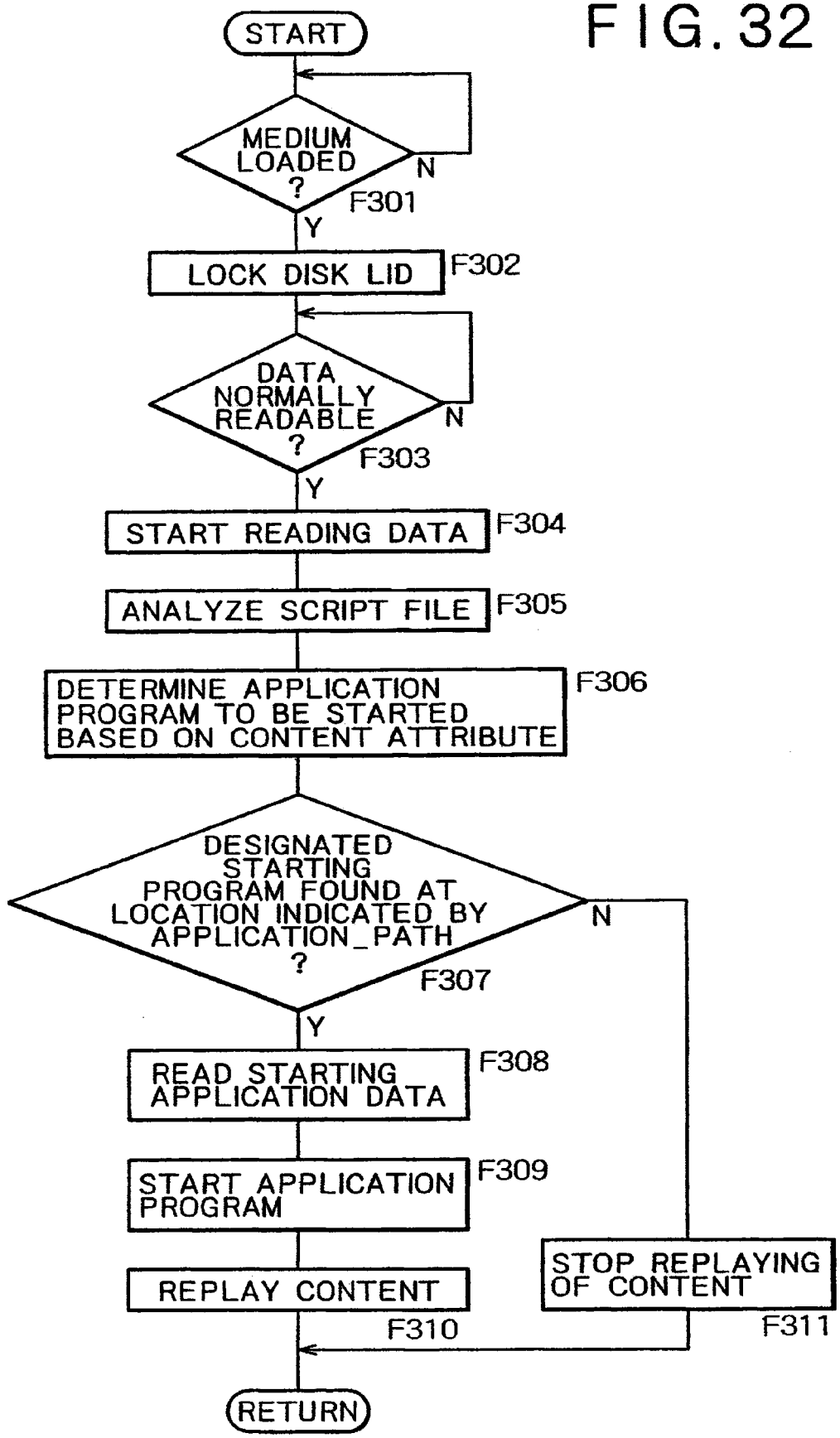
FIG. 32 is a flowchart of steps constituting a replay process performed by the inventive user terminal device.

Content data downloaded and recorded to the package medium 51 are typically replayed as described below with reference to FIG. 32. In step F301 of FIG. 32, the video controller 38 checks to see if the package medium 51 is loaded into the disk loading/unloading unit 210 (see FIG. 12B). If the package medium 51 is judged loaded in step F301, step F302 is reached in which the disk lid is locked to keep the medium securely in place.

In step F303, a check is made to see if the content data are normally readable from the package medium 51. If the data recorded on the package medium 51 are judged normally readable therefrom in step F303, then step F304 is reached in which the video controller 38 starts reading the data.

In step F305, the video controller 38 analyzes a script file recorded on the package medium 51. In step F306, the video controller 38 determines an application program to be started based on the attributes of the retrieved content data. In step F307, a check is made to see if the designated starting program is located on APPLICATION_PATH. If the program in question is judged located on APPLICATION_PATH in step F307, then step F308 is reached.

In step F308, the video controller 38 reads the application program data from the package medium 51. In step F309, the application program is started. After the content data are replayed in step F310, the replay process is terminated.

If the result of the check in step F307 is negative, i.e., if the designated starting program is not located on APPLICATION_PATH, then the content replay is halted and the process is aborted.

10. Typical Configuration of Management Server According to the Invention

Examples of the processing by the inventive system have been discussed above. What follows is a description of a typical configuration of the management server as a component for carrying out the invention.

In this connection, the series of steps performed as described by the service provider 504, the medium ID management server 505, and the medium issuing apparatus of the package medium issuing party 501 may be implemented either by hardware or by software. For the software-based processing to take place, programs constituting the software may be either incorporated beforehand in such dedicated hardware as transmitting-receiving apparatus and recording-reproducing apparatus or installed upon use from a suitable storage medium into a general-purpose personal computer or like equipment.

FIG. 33 outlines a typical configuration of a computer in which the programs making up the above-mentioned steps are installed. The programs may be recorded beforehand on a suitable storage medium such as a hard disk 405 or a ROM 403.

The programs designed to perform the above-described processes may be retained (recorded) temporarily or permanently on such removable storage media 411 as floppy disks, CD-ROMs (compact disk read only memories), MO (magneto-optical) disks, DVDs (digital versatile disks), magnetic disks, and semiconductor memories. Such removable storage media 411 may be offered as so-called package software.

The programs are installed upon use into the computer for execution from the removable storage medium 411. Alternatively, the programs may be downloaded from a website to the computer through wired or wireless communication means such as digital satellite broadcast links, LANs (local area networks), and the Internet. The computer receives the downloaded programs through a communication unit 408 and installs what is received onto the internal hard disk 405.

The computer incorporates a CPU (central processing unit) 402. The CPU 402 is connected to an I/O interface 410 via a bus 401. Through the I/O interface 410, the CPU 402 receives commands from the user who operates an operation unit 407 comprising a keyboard, a mouse and a microphone. In response to the commands, the CPU 402 carries out relevant programs held in the ROM (read only memory) 403. Alternatively, the CPU 402 may load necessary programs into a RAM (random access memory) 404 for program execution, the programs being retrieved from the hard disk 405, transferred via satellite or over the network and installed onto the hard disk 405 for retrieval, or read from the removable storage medium 411 loaded in a drive 409. The programs thus executed allow the CPU to carry out the processes shown in the accompanying flowcharts.

The CPU 402 outputs the results of the processes illustratively through the I/O interface 410 to an output unit 406 made of an LCD (liquid crystal display) and speakers. Alternatively the results may be transmitted from the communication unit 408 or recorded onto the hard disk 405 or like means.

In this specification, the steps describing the programs to be executed by the computer represent not only the processes that are carried out in the depicted flowchart sequence (i.e., on a time series basis) but also the processes that are conducted parallelly or individually (e.g., in parallel or object-oriented fashion).

The programs may be carried out either by a single computer or by a plurality of computers in a distributed manner. The programs may also be transferred to and executed by a remotely located computer or computers.

To sum up, the invention allows a unique identifier to be recorded on each of the storage media issued while having all such identifiers stored in database format at the management server. When some service is requested for a given storage medium, the identifier of the medium in question is checked against the identifiers held in the management server for a match. The applicable service is then offered or withheld depending on the result of the check.

The amount of the service available to each storage medium is uniquely determined by the identifier of the medium in question. That means illegal duplication of any storage medium does not alter the total amount of the service that may be offered by the service provider to each storage medium.

The number of storage media already issued is grasped by checking their identifiers registered with the management server. This makes it possible to estimate the total amount of the services to be offered by the service provider. If the identifiers recorded on the storage media are varied by country or by region in which they are marketed, it is possible to find out the quantities and the types of services provided to users in each of different countries or regions.

According to the invention, services from the service provider are destined specifically for each storage medium. That means there is no need for users to enter personal information before receiving the services. Hence the absence of the possibility of such personal information being diverted off the network or otherwise abused over the network.

The invention allows each storage medium (i.e., package medium) to carry data constituting a processing program for establishing connection with a suitable service provider. That means there is no need for the user at the user terminal device to make bothersome input operations to contract with a specific service provider for receiving the services.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow.

What is claimed is:

1. A system comprising a management server, a medium issuing apparatus, and a service provider, wherein:
   the medium issuing apparatus comprises recording means for recording right information and unique identifiers on a package storage medium, the right information denoting services available to the package storage medium, and comprising a download authorization bit and an upload authorization bit; and
   the management server comprises:
   receiving means for receiving the right information and the identifiers from the package storage medium;
   storing means for storing the right information corresponding to each of the identifiers and the identifiers in a database; and
   checking means for checking an identifier transmitted from a terminal device by way of the service provider against the identifiers stored in the database.

2. The system according to claim 1, wherein the storing means stores, in correspondence with the identifiers sent from the medium issuing apparatus, the right information.

3. The system according to claim 2, wherein the management server comprises update information creating means for creating update information for updating the right information stored in the database in correspondence with the identifier and the right information recorded on the package storage medium.

4. The system according to claim 1, wherein the management server comprises update information creating means for creating update information for updating the right information stored in the database and the right information recorded on the package storage medium.

* * * * *